United States Patent
Hanebeck

(10) Patent No.: US 12,340,327 B2
(45) Date of Patent: Jun. 24, 2025

(54) SYSTEMS FOR SUPPLY CHAIN EVENT MANAGEMENT

(71) Applicant: TRUCKL LLC, Dallas, TX (US)

(72) Inventor: Hanns-Christian Leemon Hanebeck, Dallas, TX (US)

(73) Assignee: TRUCKL LLC, Dallas, TX (US)

( * ) Notice: Subject to any disclaimer, the term of this patent is extended or adjusted under 35 U.S.C. 154(b) by 0 days.

(21) Appl. No.: 17/262,305

(22) PCT Filed: Jul. 23, 2019

(86) PCT No.: PCT/US2019/042924
§ 371 (c)(1),
(2) Date: Jan. 22, 2021

(87) PCT Pub. No.: WO2020/023441
PCT Pub. Date: Jan. 30, 2020

(65) Prior Publication Data
US 2021/0272037 A1    Sep. 2, 2021

Related U.S. Application Data

(60) Provisional application No. 62/730,531, filed on Sep. 12, 2018, provisional application No. 62/714,700, (Continued)

(51) Int. Cl.
*G06Q 10/08* (2024.01)
*G06Q 10/0631* (2023.01)
(Continued)

(52) U.S. Cl.
CPC ... *G06Q 10/06315* (2013.01); *G06Q 10/0833* (2013.01); *G06Q 10/0835* (2013.01); *G06Q 2220/00* (2013.01)

(58) Field of Classification Search
CPC ......... G06Q 10/06315; G06Q 10/0833; G06Q 2220/00; G06Q 10/0835
See application file for complete search history.

(56) References Cited

U.S. PATENT DOCUMENTS 9,147,171 B2 * 9/2015 Sitarski .............. G06Q 10/0635
9,430,494 B2 * 8/2016 Park ........................ G06F 16/29
(Continued)

FOREIGN PATENT DOCUMENTS

EP          3454272 A1      3/2019
KR     20210149427 A  * 12/2021  ......... H04L 67/1097
WO    WO 2005/033849 A2    4/2005

OTHER PUBLICATIONS

L. Xu, L. Chen, Z. Gao, Y. Lu and W. Shi, "CoC: Secure Supply Chain Management System Based on Public Ledger," 2017 26th International Conference on Computer Communication and Networks (ICCCN), Vancouver, BC, Canada, 2017 (Year: 2017).*
(Continued)

*Primary Examiner* — Jerry O'Connor
*Assistant Examiner* — Philip N Warner
(74) *Attorney, Agent, or Firm* — MARSHALL GERSTEIN & BORUN LLP

(57) ABSTRACT

Systems for supply chain management are provided. The systems perform capturing, formatting, processing, analysis, storage, and sharing of supply chain event data. The systems store the supply chain event data relating to an execution of a supply chain process therein and on a distributed ledger.

16 Claims, 25 Drawing Sheets

Related U.S. Application Data filed on Aug. 5, 2018, provisional application No. 62/702,890, filed on Jul. 24, 2018.

(51) Int. Cl.
*G06Q 10/083* (2024.01)
*G06Q 10/0833* (2023.01)
*G06Q 10/0835* (2023.01)
*G06Q 50/04* (2012.01)

(56) References Cited

U.S. PATENT DOCUMENTS

| | | | |
|---|---|---|---|
| 9,886,486 B2* | 2/2018 | de Castro Alves | G06F 16/2282 |
| 10,671,515 B1* | 6/2020 | Sanghvi | G06F 11/3684 |
| 11,037,095 B2* | 6/2021 | Kim | G06Q 10/0833 |
| 11,176,519 B2* | 11/2021 | Batra | H04L 67/104 |
| 2005/0060245 A1* | 3/2005 | Hoffman | G06Q 30/02 705/28 |
| 2013/0311441 A1* | 11/2013 | Erdogan | G06F 16/245 707/769 |
| 2014/0136291 A1* | 5/2014 | Bolene | G06Q 10/0832 705/7.36 |
| 2015/0170099 A1 | 6/2015 | Beach-Drummond | |
| 2016/0342977 A1* | 11/2016 | Lam | G06Q 20/0658 |
| 2017/0046651 A1 | 2/2017 | Lin et al. | |
| 2017/0046694 A1 | 2/2017 | Chow et al. | |
| 2017/0244757 A1 | 8/2017 | Castinado et al. | |
| 2017/0331896 A1 | 11/2017 | Holloway et al. | |
| 2018/0096175 A1* | 4/2018 | Schmeling | G06F 1/3206 |
| 2018/0130034 A1 | 5/2018 | Taylor et al. | |
| 2018/0144298 A1 | 5/2018 | Rankin | |
| 2018/0157481 A1* | 6/2018 | Zessin | H04W 4/38 |
| 2018/0174097 A1 | 6/2018 | Liu et al. | |
| 2018/0181909 A1 | 6/2018 | Wilkinson et al. | |
| 2018/0232693 A1 | 8/2018 | Gillen et al. | |
| 2018/0259976 A1* | 9/2018 | Williams | G05D 1/223 |
| 2018/0285810 A1 | 10/2018 | Ramachandran et al. | |
| 2018/0329693 A1* | 11/2018 | Eksten | G06F 8/65 |
| 2018/0365633 A1 | 12/2018 | Hanis et al. | |
| 2019/0012637 A1* | 1/2019 | Gillen | G06Q 10/0833 |
| 2019/0026146 A1* | 1/2019 | Peffers | G06F 9/5044 |
| 2019/0043010 A1* | 2/2019 | Smith | G06Q 10/0833 |
| 2019/0050810 A1 | 2/2019 | Nagalla et al. | |
| 2019/0066041 A1* | 2/2019 | Hance | B65G 1/137 |
| 2019/0080284 A1 | 3/2019 | Kim et al. | |
| 2019/0266553 A1* | 8/2019 | Jacobson | G06Q 10/087 |
| 2019/0268162 A1* | 8/2019 | Sahagun | G06F 16/2455 |
| 2019/0340588 A1* | 11/2019 | Haldenby | G06Q 10/063114 |
| 2019/0355076 A1* | 11/2019 | Marcinkowski | H04W 4/021 |
| 2020/0057565 A1* | 2/2020 | Sanghvi | G06F 3/0619 |
| 2020/0133841 A1* | 4/2020 | Davis | G06F 12/0253 |
| 2020/0134530 A1* | 4/2020 | Clevenger | H04W 4/80 |
| 2020/0311845 A1* | 10/2020 | Steketee | G06Q 10/087 |
| 2021/0234702 A1* | 7/2021 | Bekiyants | A43B 1/0063 |
| 2022/0012780 A1* | 1/2022 | Leise | G07C 5/008 |

OTHER PUBLICATIONS

International Search Report and Written Opinion for International Application No. PCT/US2019/042924 mailed Oct. 2, 2019.

* cited by examiner

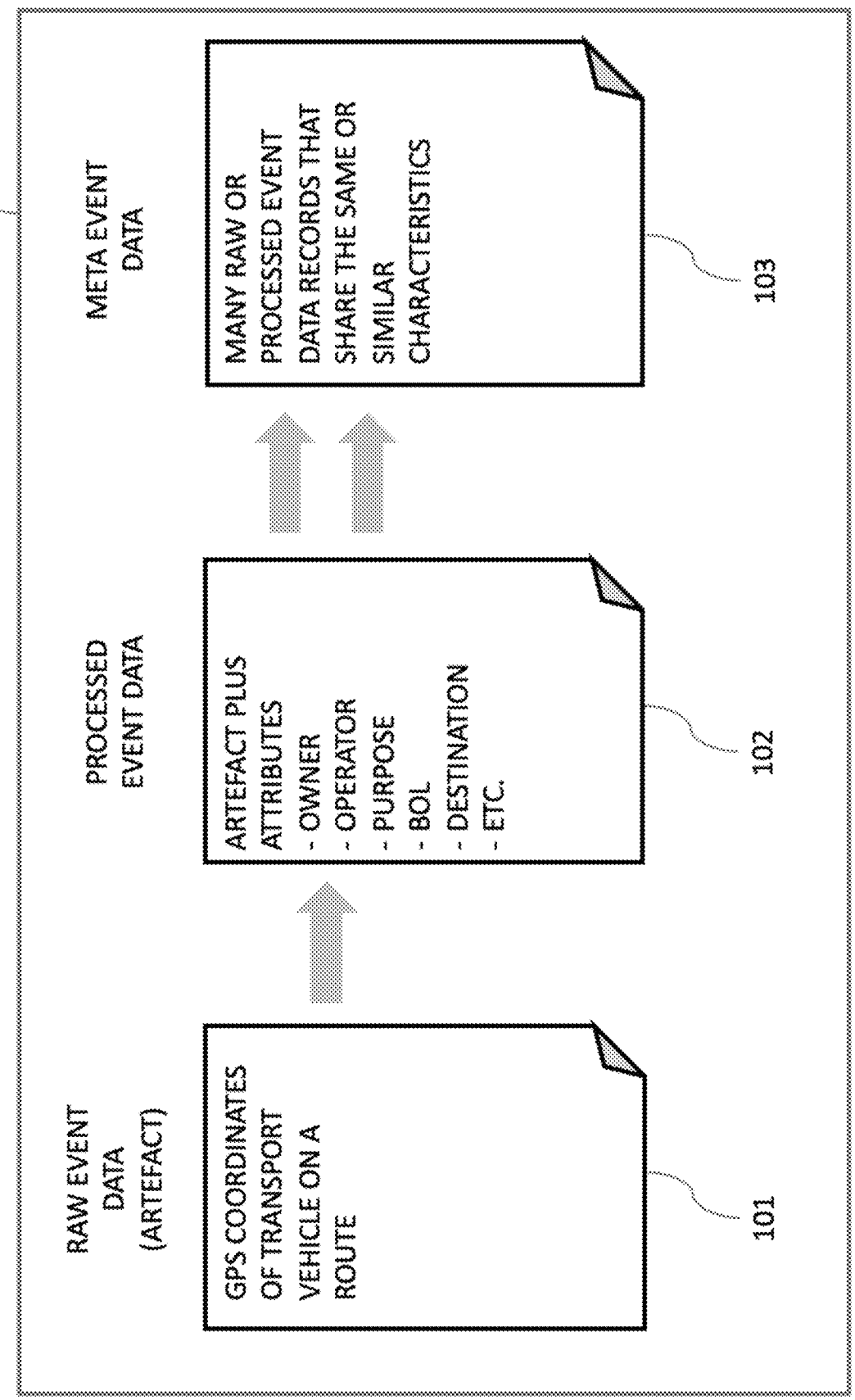
FIG. 1: CLASSIFICATION OF SUPPLY CHAIN EVENT DATA TYPES AND A PRACTICAL EXAMPLE

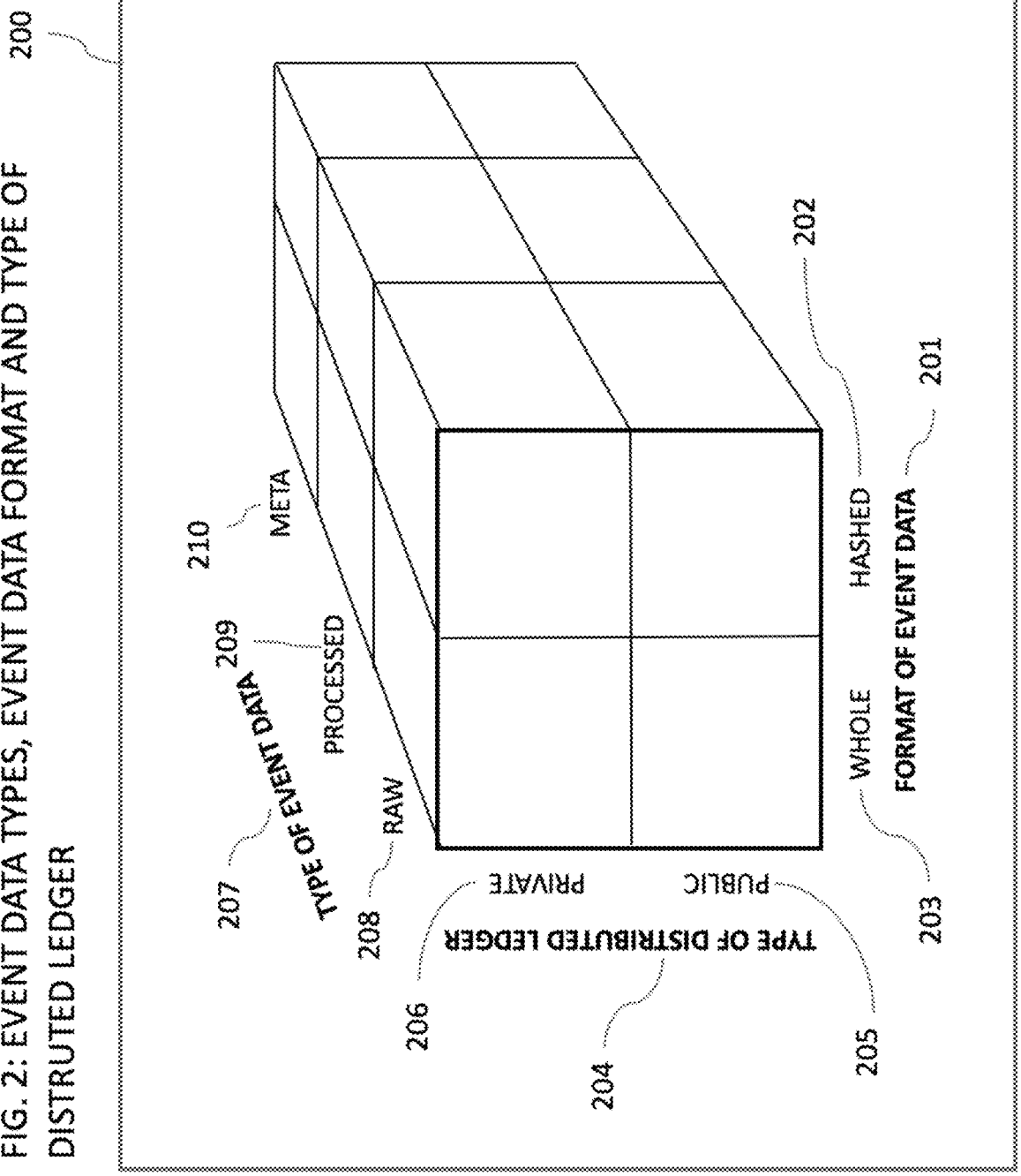

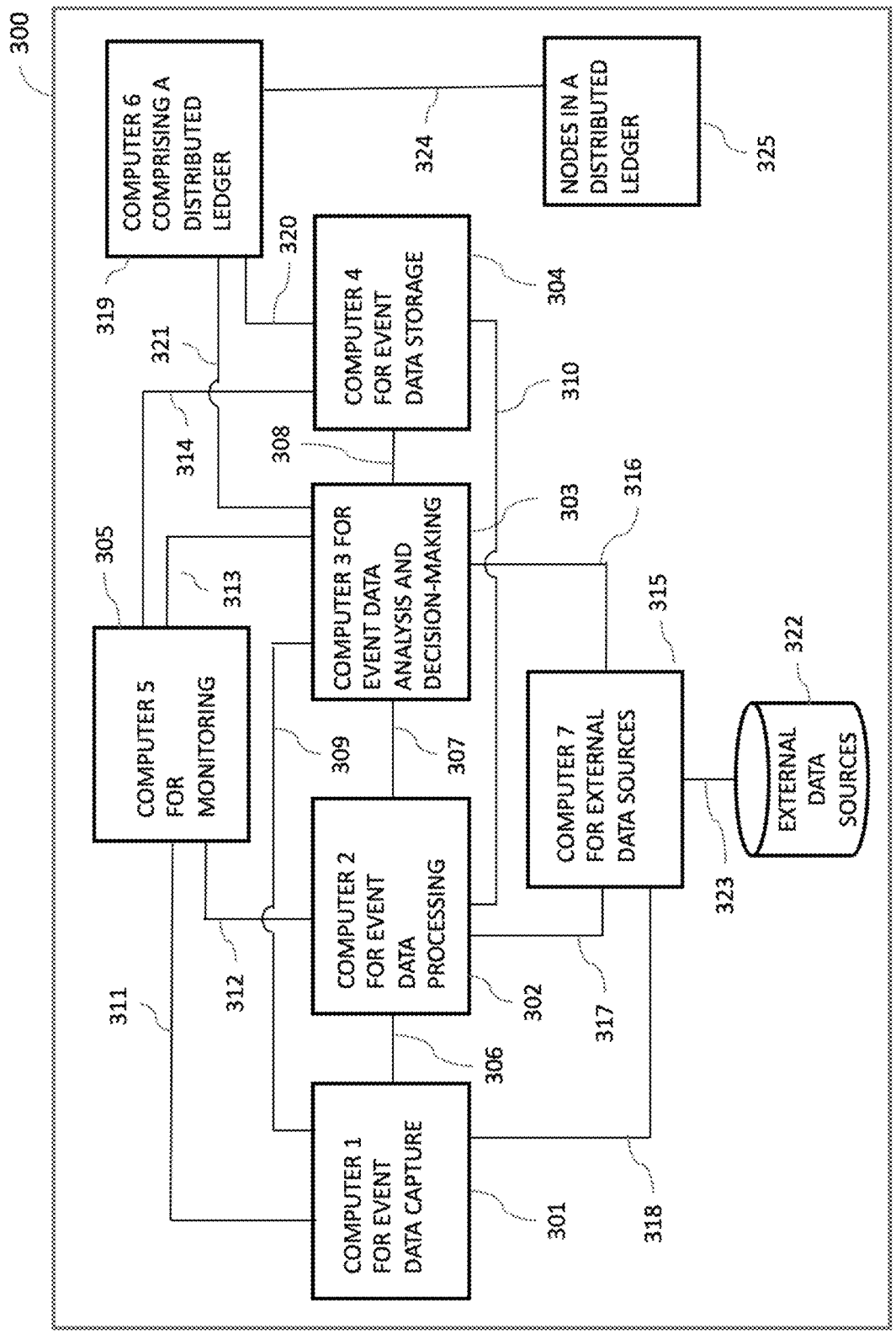
FIG. 3: ONE EMBODIMENT OF A SYSTEM TO CAPTURE, FORMAT, PROCESS, ANALYZE, MONITOR, SHARE, AND STORE EVENT DATA ON A DISTRIBUTED LEDGER

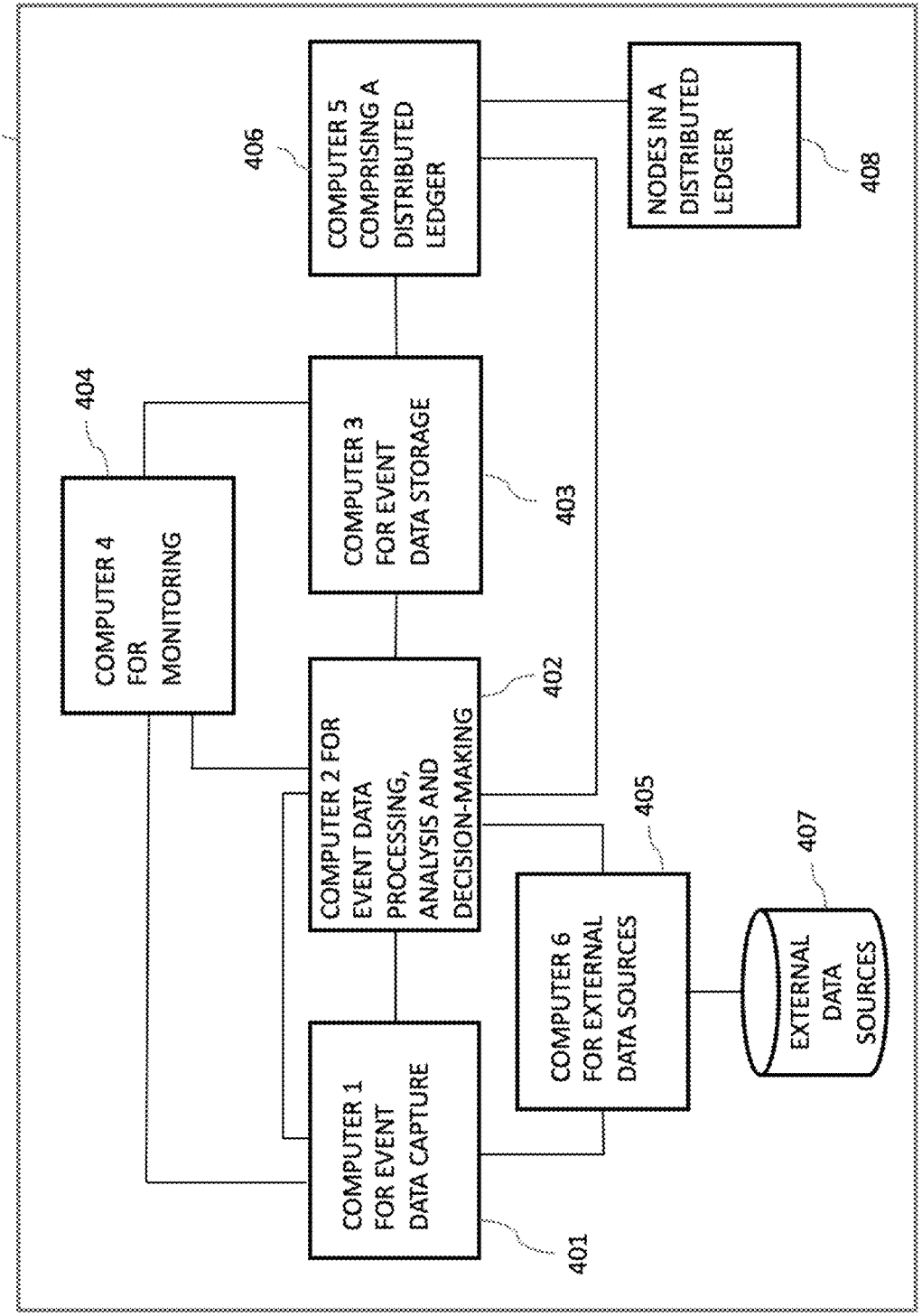
FIG. 4: ANOTHER EMBODIMENT OF A SYSTEM TO CAPTURE, FORMAT, PROCESS, ANALYZE, MONITOR, SHARE AND STORE EVENT DATA ON A DISTRIBUTED LEDGER

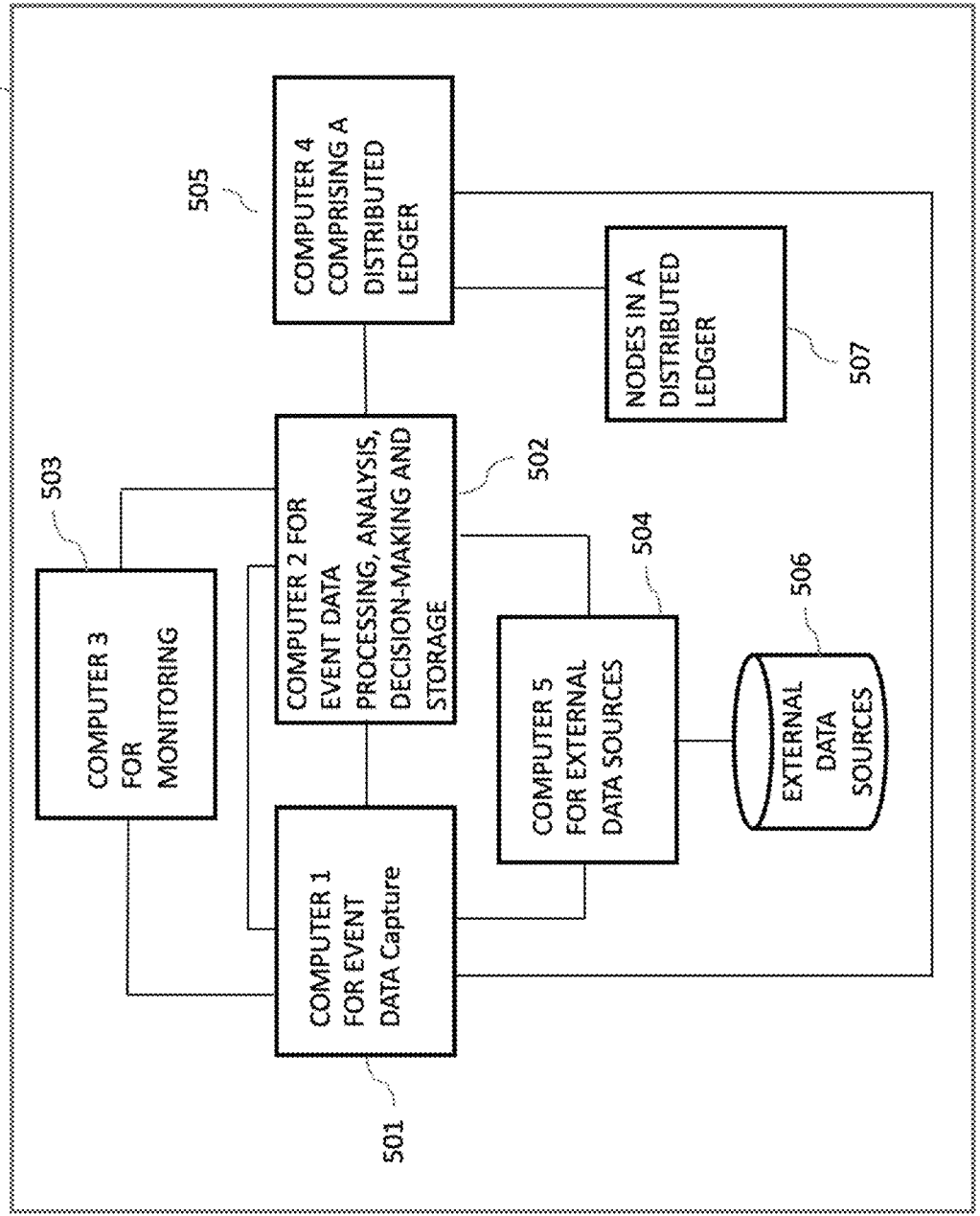
FIG. 5: ANOTHER EMBODIMENT OF A SYSTEM TO CAPTURE, FORMAT, PROCESS, ANALYZE, MONITOR, SHARE AND STORE EVENT DATA ON A DISTRIBUTED LEDGER

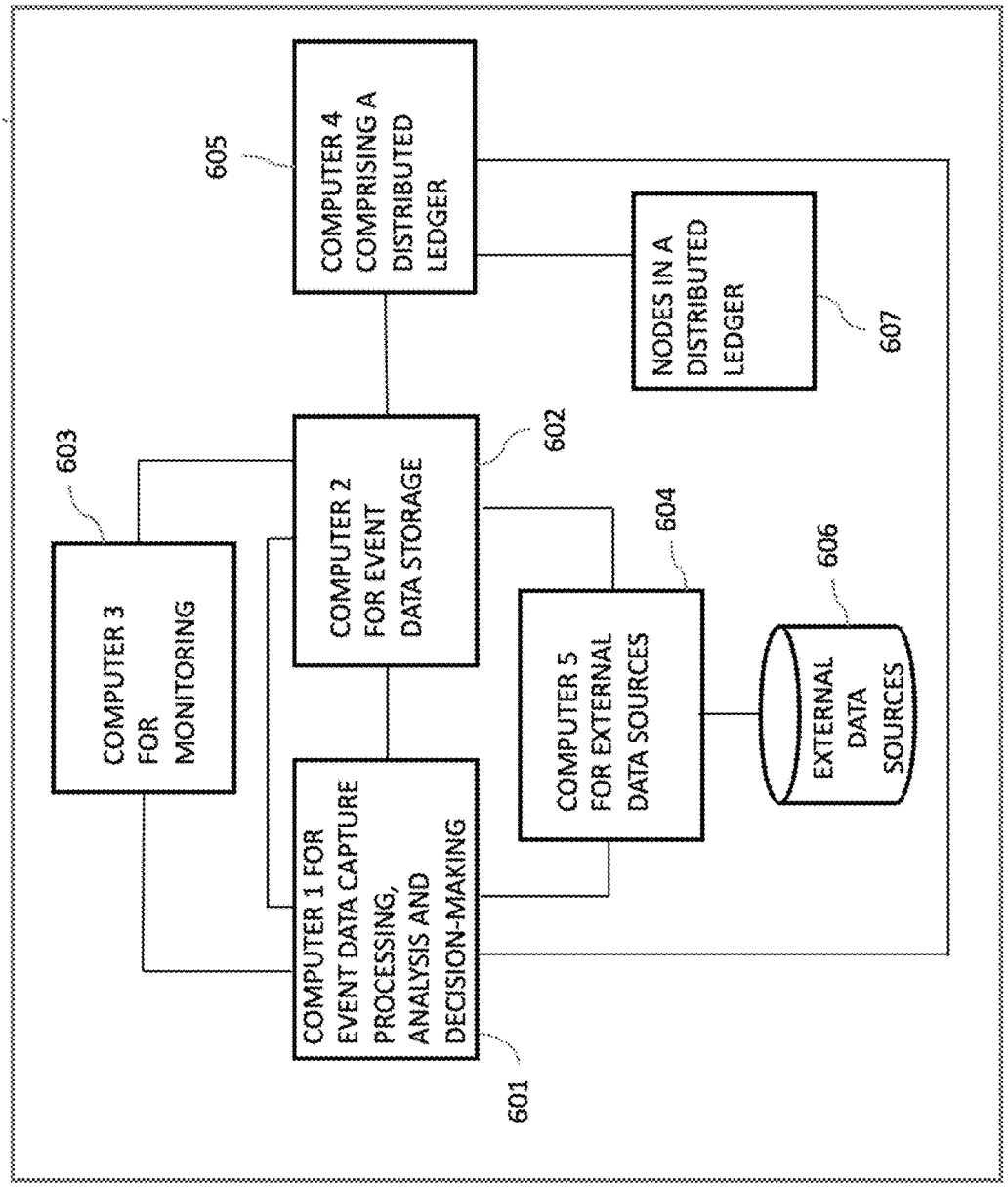
FIG. 6: ANOTHER EMBODIMENT OF A SYSTEM TO CAPTURE, FORMAT, PROCESS, ANALYZE, MONITOR, SHARE AND STORE EVENT DATA ON A DISTRIBUTED LEDGER

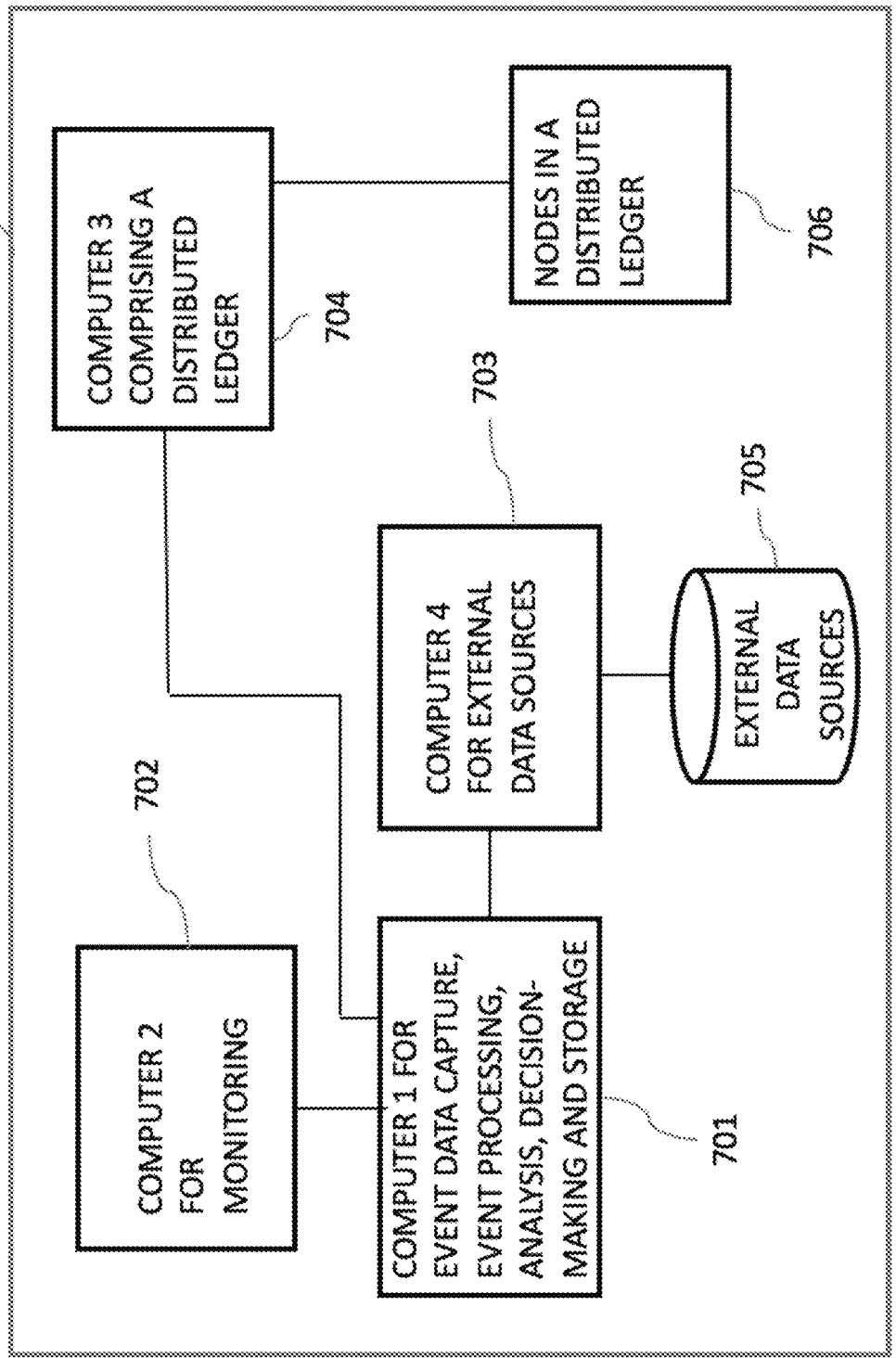
FIG. 7: ANOTHER EMBODIMENT OF A SYSTEM TO CAPTURE, FORMAT, PROCESS, ANALYZE, MONITOR, SHARE AND STORE EVENT DATA ON A DISTRIBUTED LEDGER

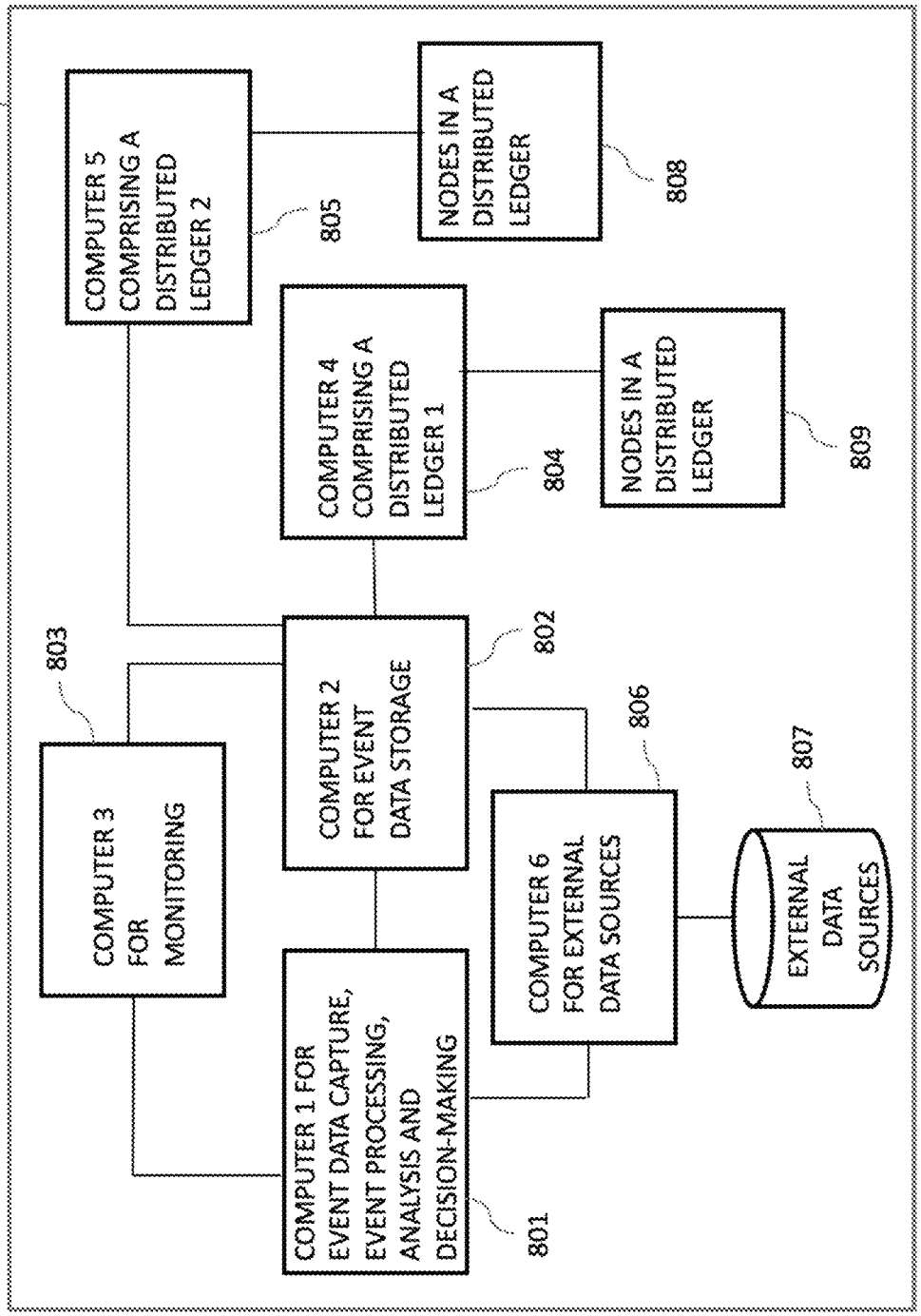
FIG. 8: ANOTHER EMBODIMENT OF A SYSTEM TO CAPTURE, FORMAT, PROCESS, ANALYZE, MONITOR, SHARE AND STORE EVENT DATA USING TWO OR MORE DISTRIBUTED LEDGERS (IN REFERRENCE TO SYSTEM 600)

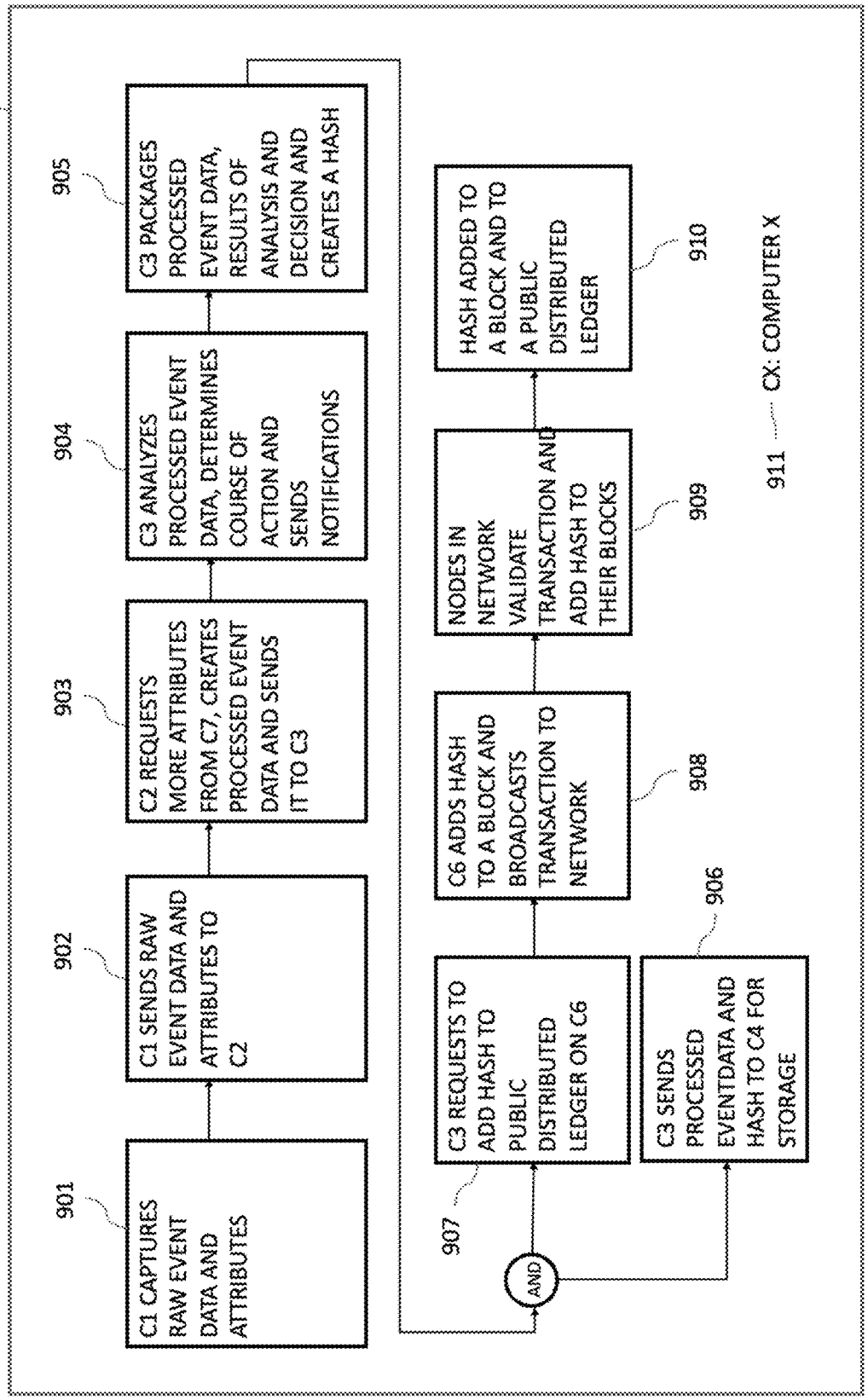
FIG. 9: ONE EMBODIMENT OF STORAGE OF HASHED SUPPLY CHAIN EVENT DATA ON A PUBLIC DISTRIBUTED LEDGER (IN REFERRENCE TO SYSTEM 300)

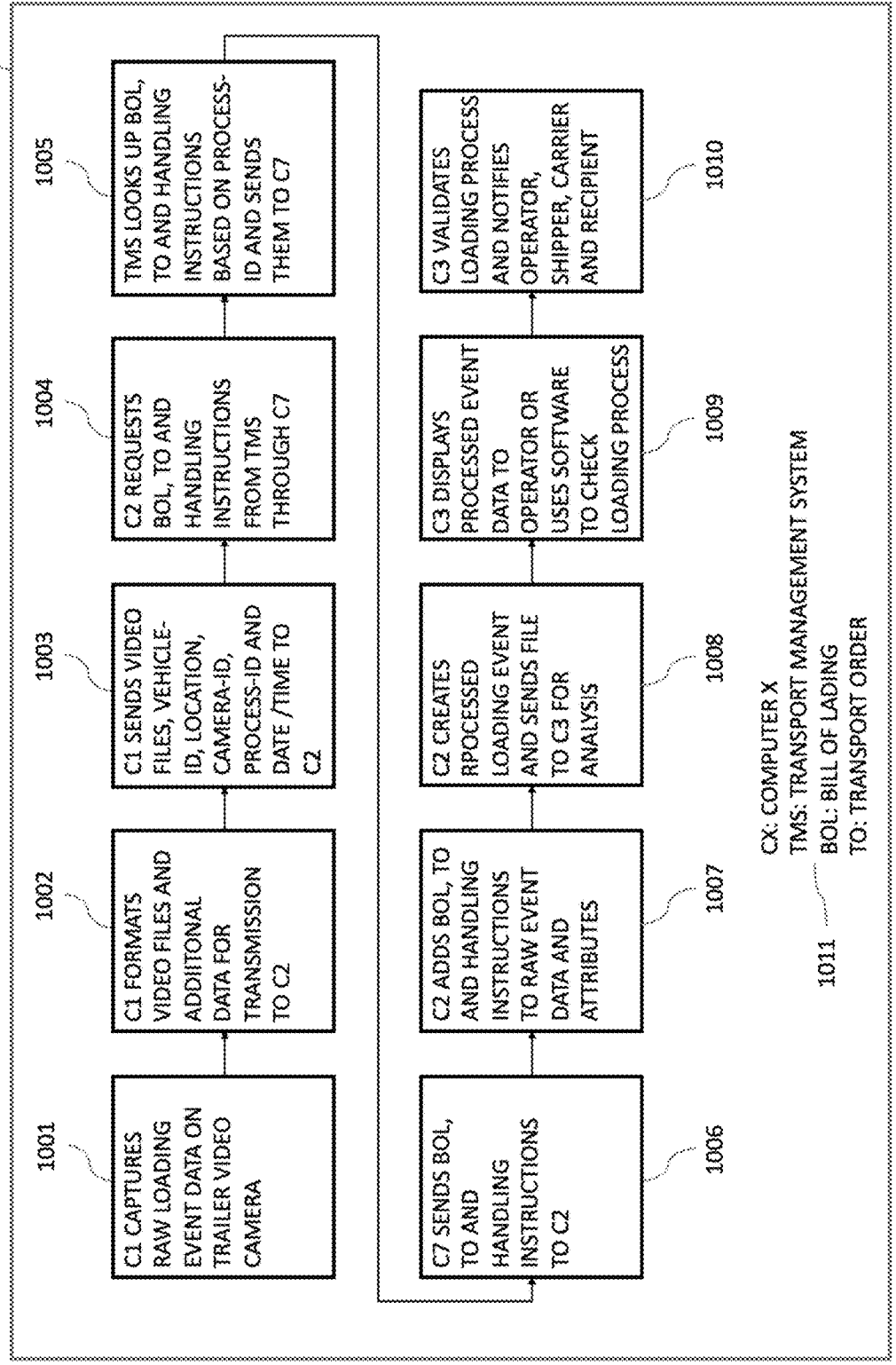
FIG. 10: A PRACTICAL EXAMPLE OF A SYSTEM AND METHOD TO CAPTURE, PROCESS, FORMAT, ANALYZE AND SHARE EVENTS ON A SUPPLY CHAIN ASSET (IN REFERRENCE TO SYSTEM 300)

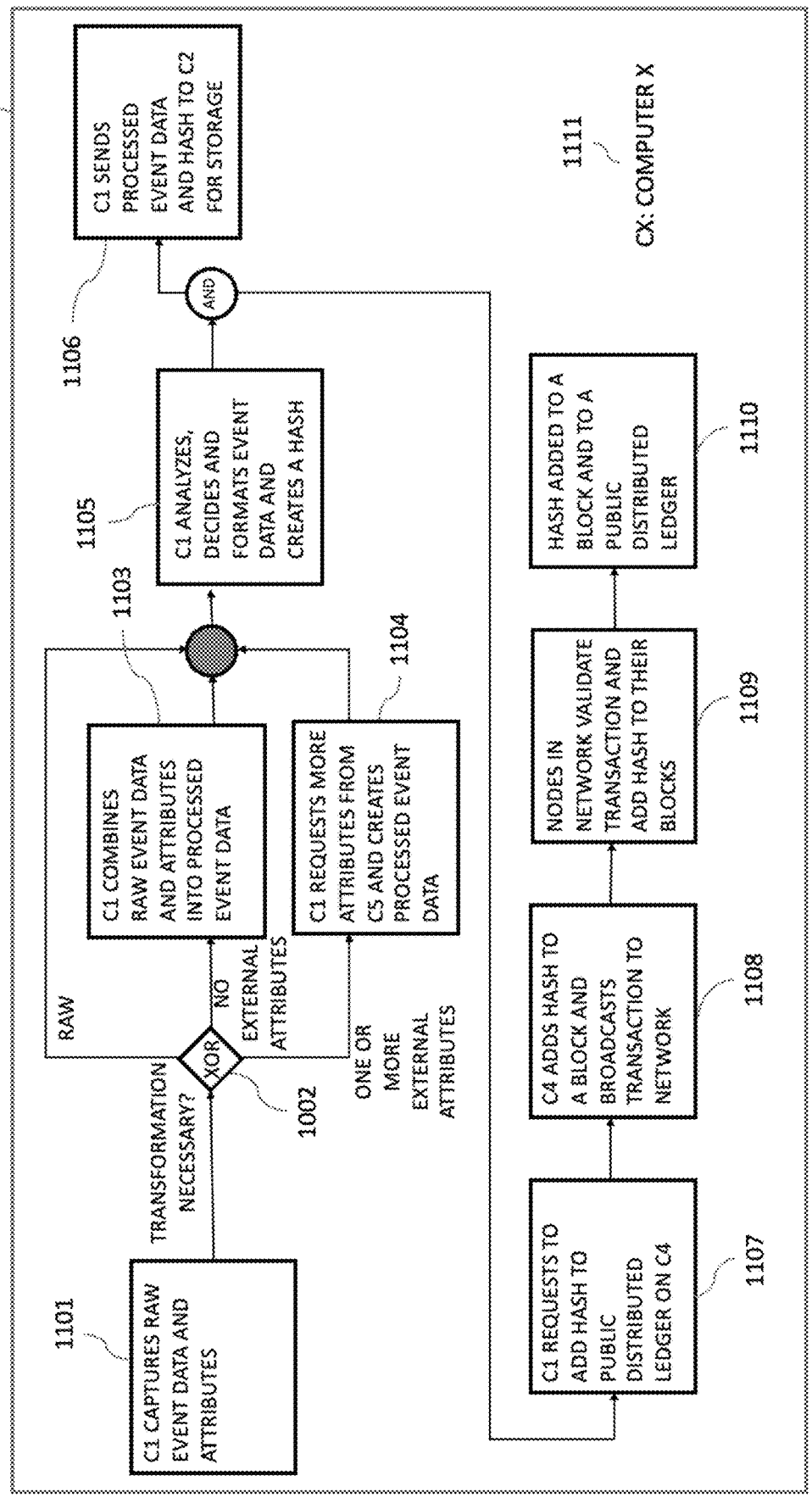
FIG. 11: Another Embodiment of Storage of Hashed Supply Chain Event Data on a Public Distributed Ledger (in reference to System 600)

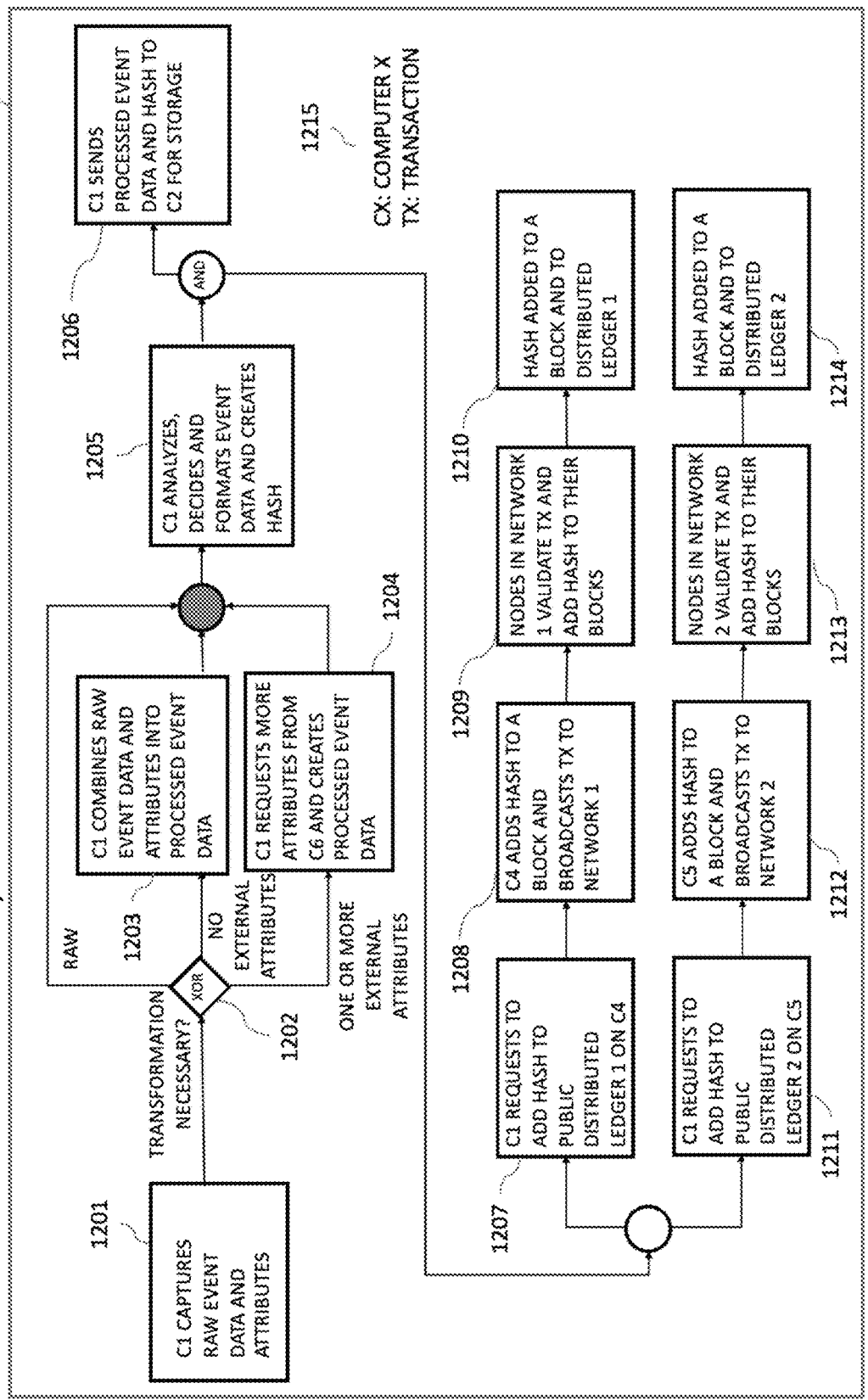
FIG. 12: ANOTHER EMBODIMENT OF STORAGE OF HASHED SUPPLY CHAIN EVENT DATA ON TWO OR MORE PUBLIC DISTRIBUTED LEGDERS IN REFERRENCE TO SYSTEM 800)

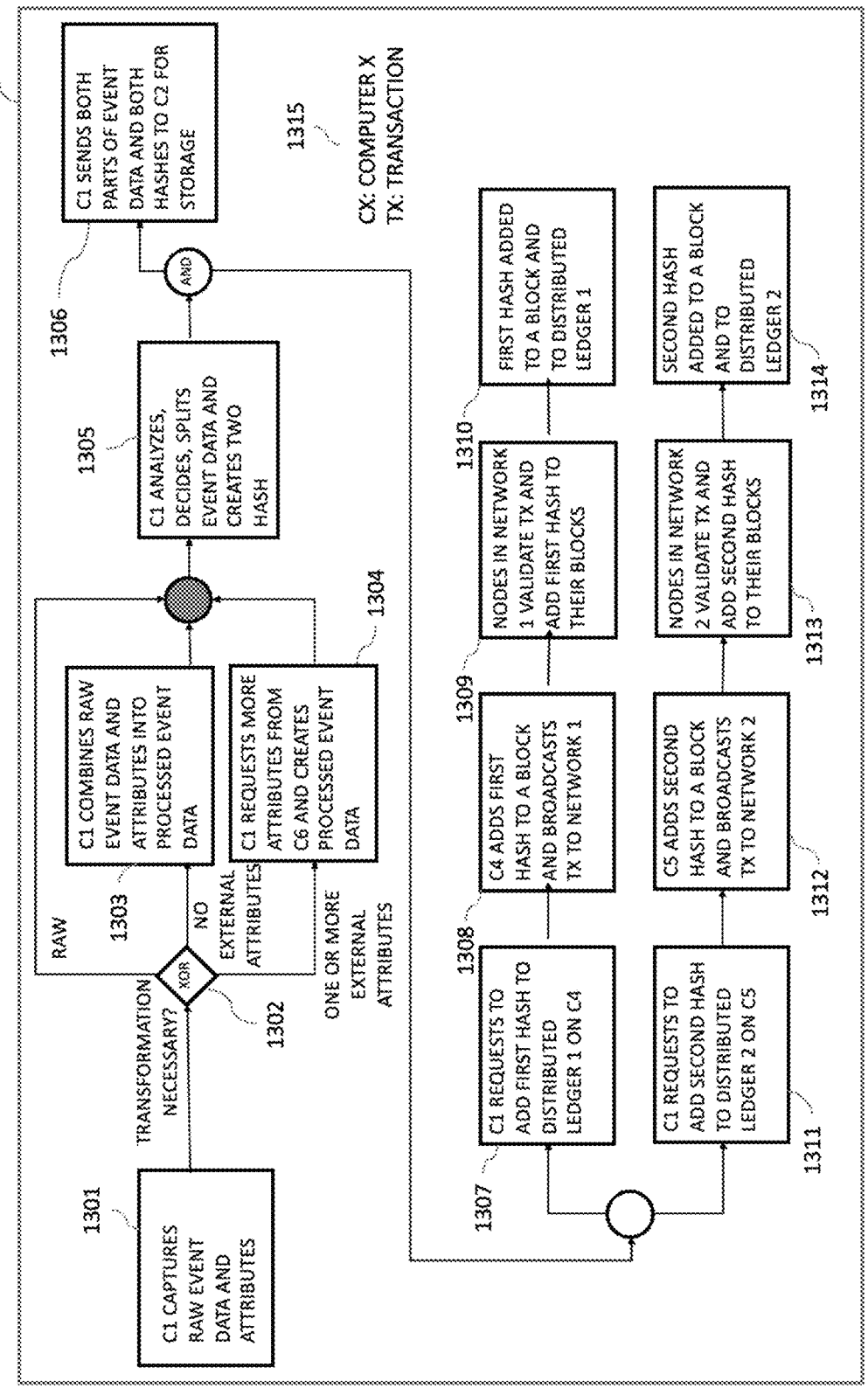
FIG. 13: ANOTHER EMBODIMENT OF STORAGE OF SPLIT AND HASHED SUPPLY CHAIN EVENT DATA ON TWO OR MORE DISTRIBUTED LEDGERS (IN REFERRENCE TO SYSTEM 800)

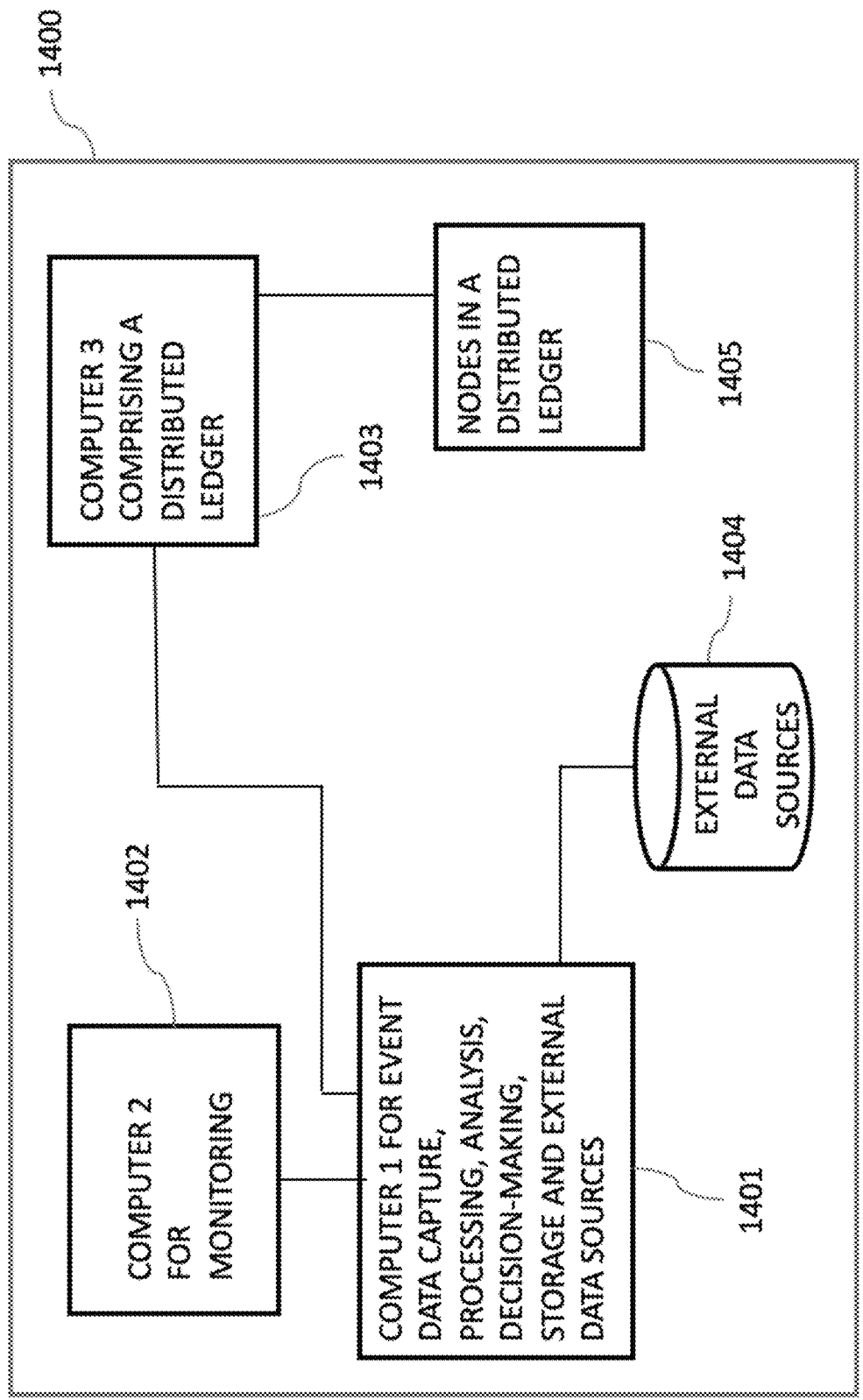
FIG. 14: ANOTHER EMBODIMENT OF A SYSTEM TO CAPTURE, FORMAT, PROCESS, ANALYZE, MONITOR, SHARE AND STORE EVENT DATA ON A DISTRIBUTED LEDGER

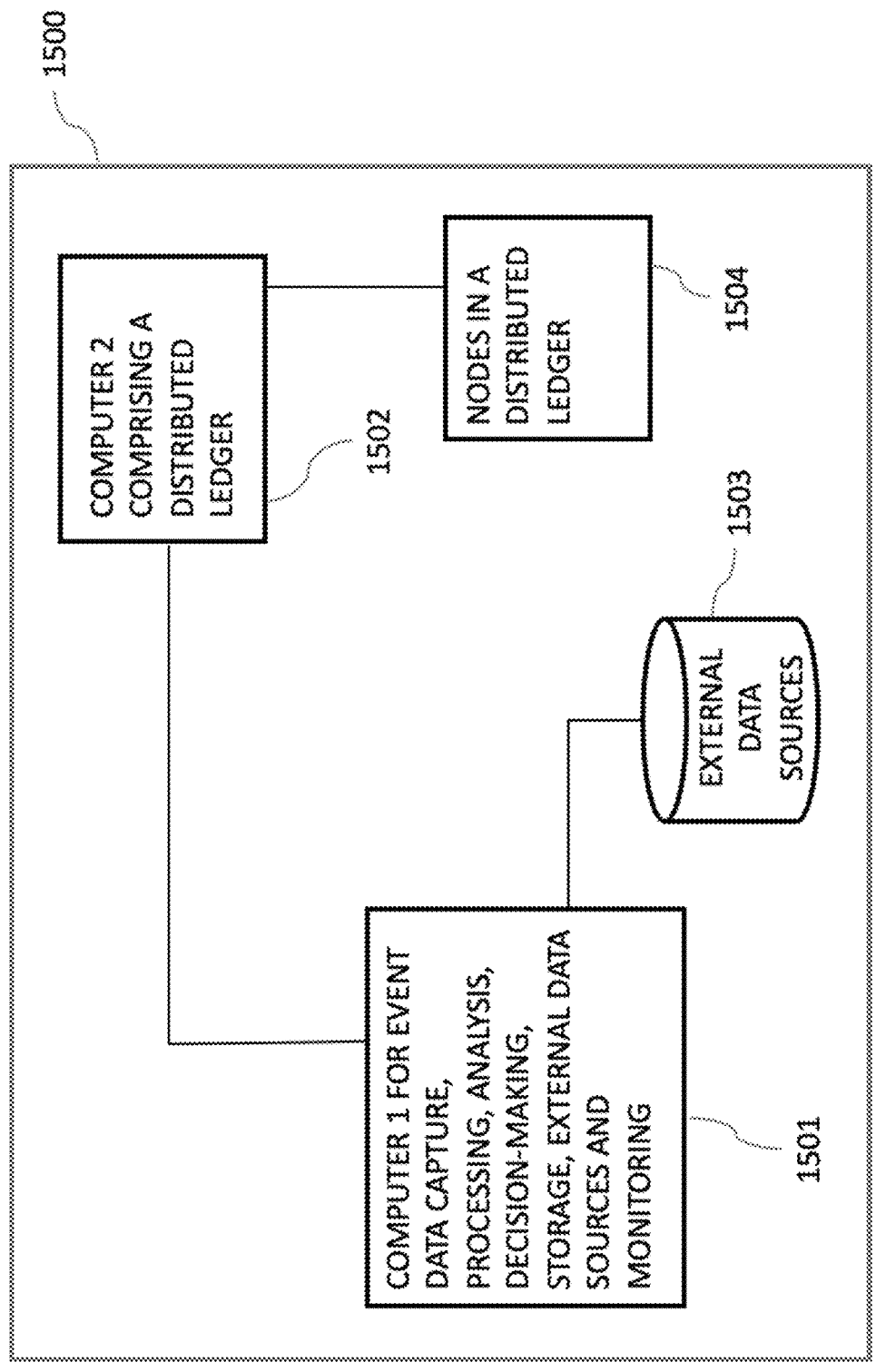
FIG. 15: ANOTHER EMBODIMENT OF A SYSTEM TO CAPTURE, FORMAT, PROCESS, ANALYZE, MONITOR, SHARE AND STORE EVENT DATA ON A DISTRIBUTED LEDGER

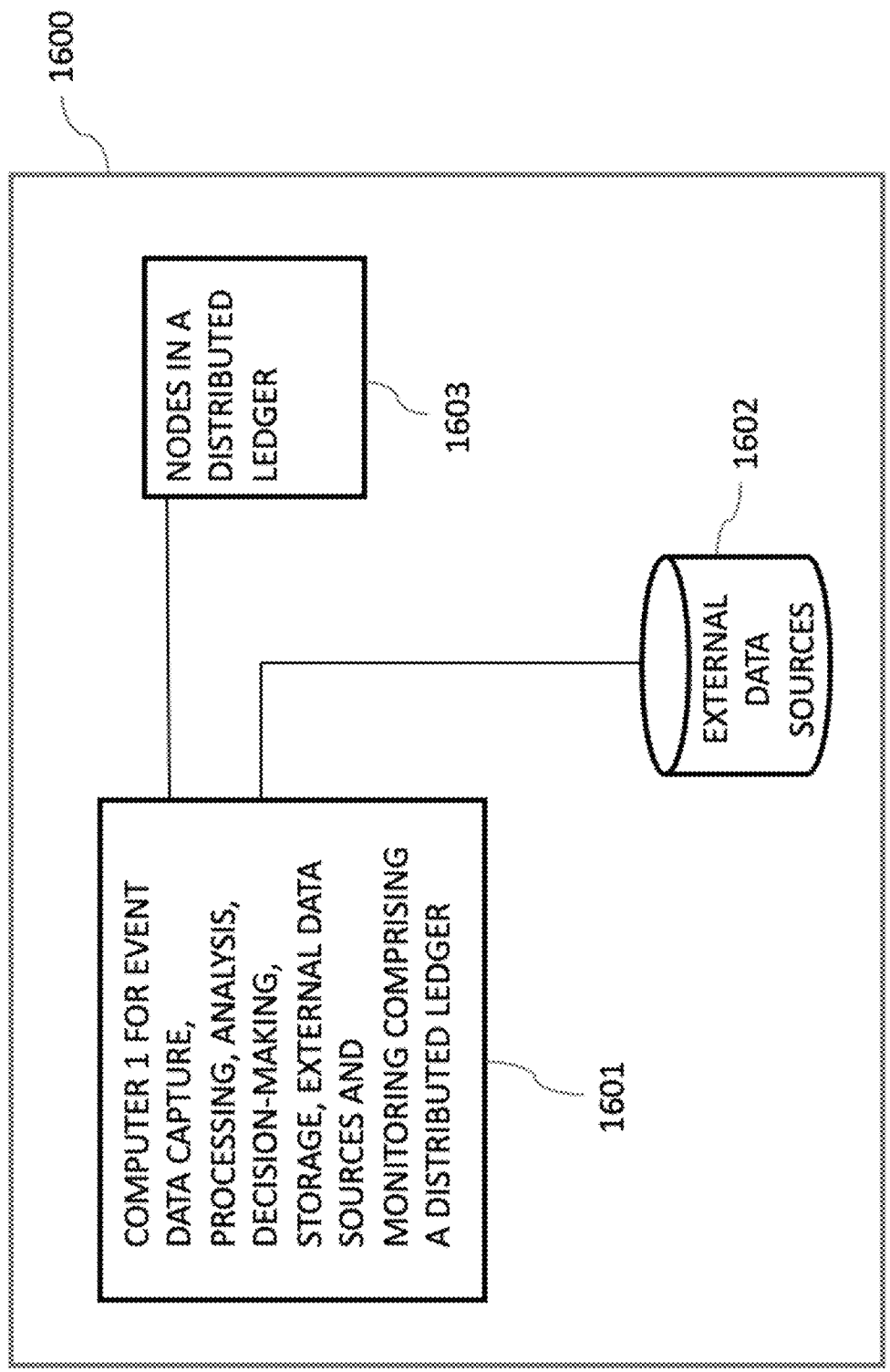
FIG. 16: ANOTHER EMBODIMENT OF A SYSTEM TO CAPTURE, FORMAT, PROCESS, ANALYZE, MONITOR, SHARE AND STORE EVENT DATA ON A DISTRIBUTED LEDGER

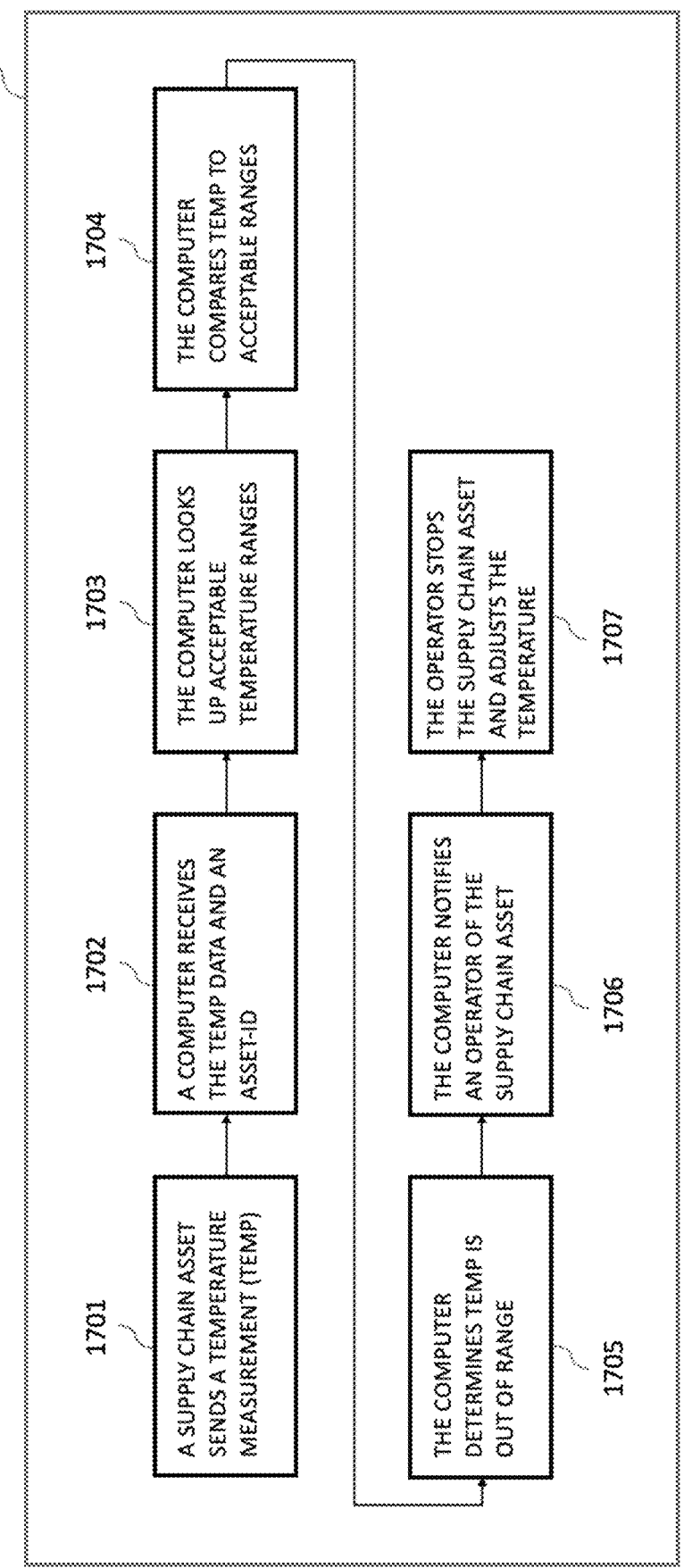
FIG. 17: A PRACTICAL EXAMPLE OF CONVERTING RAW EVENT DATA INTO PROCESSED EVENT DATA AND ITS USE FOR DECISION-MAKING

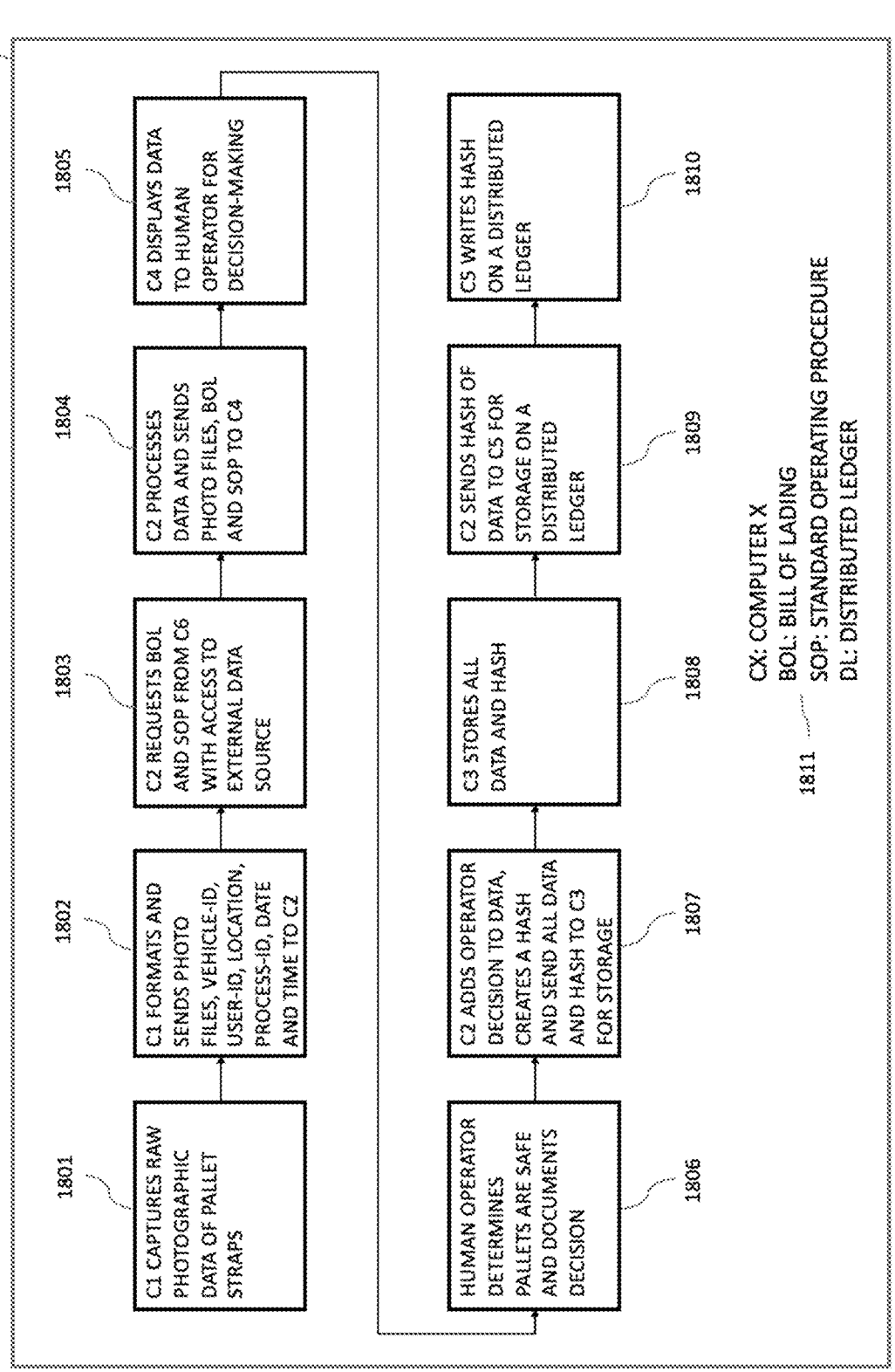

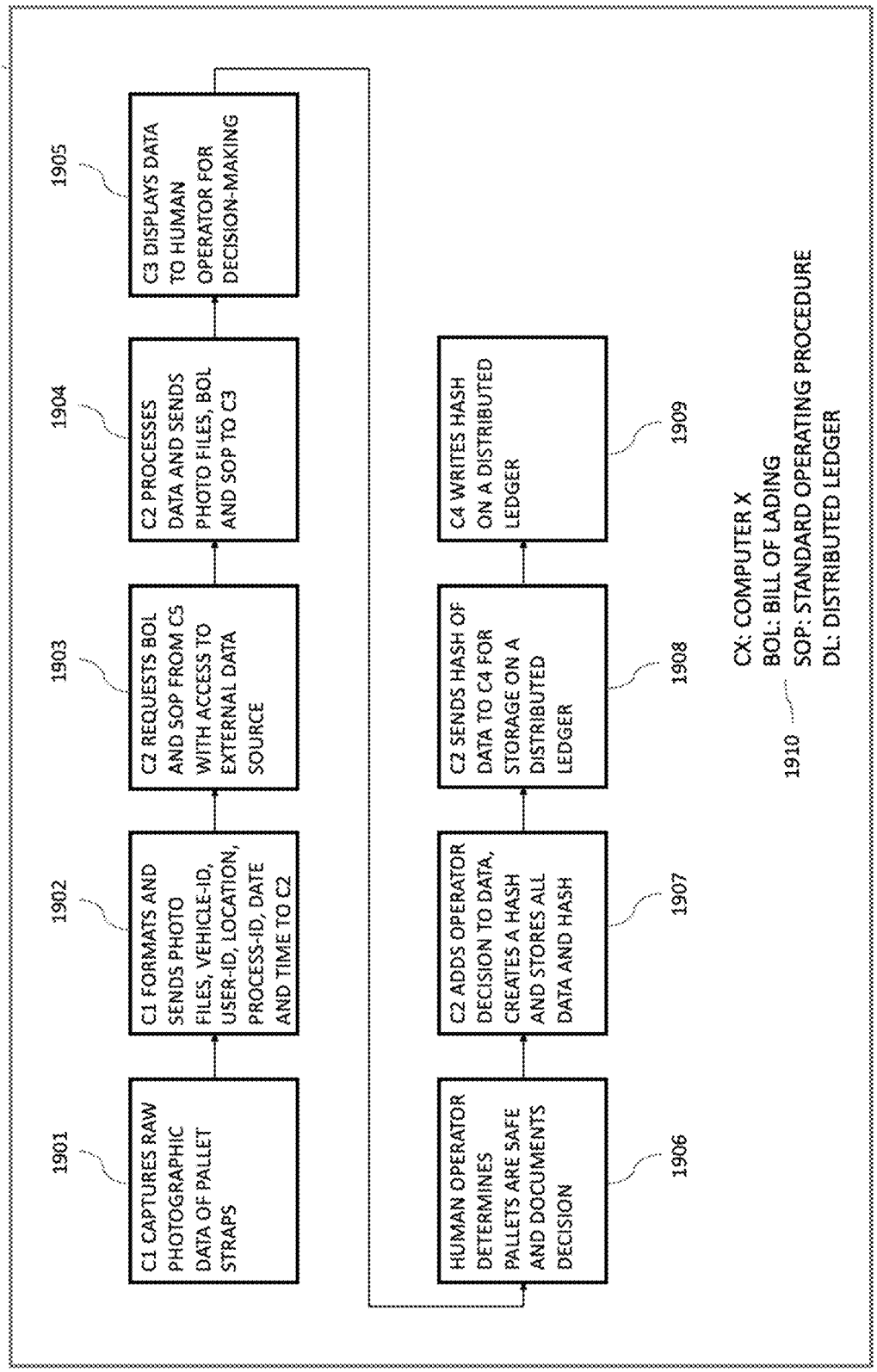

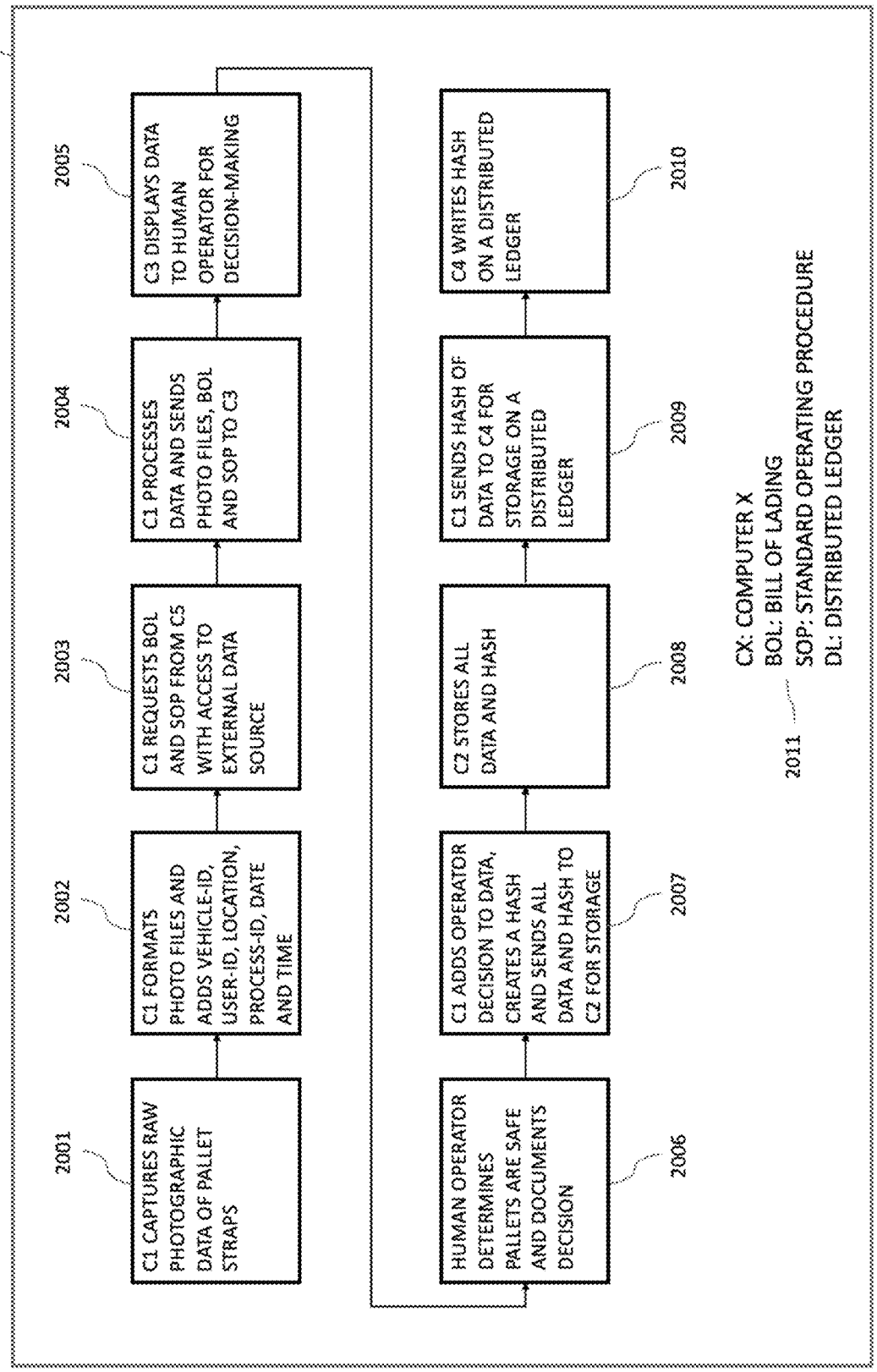

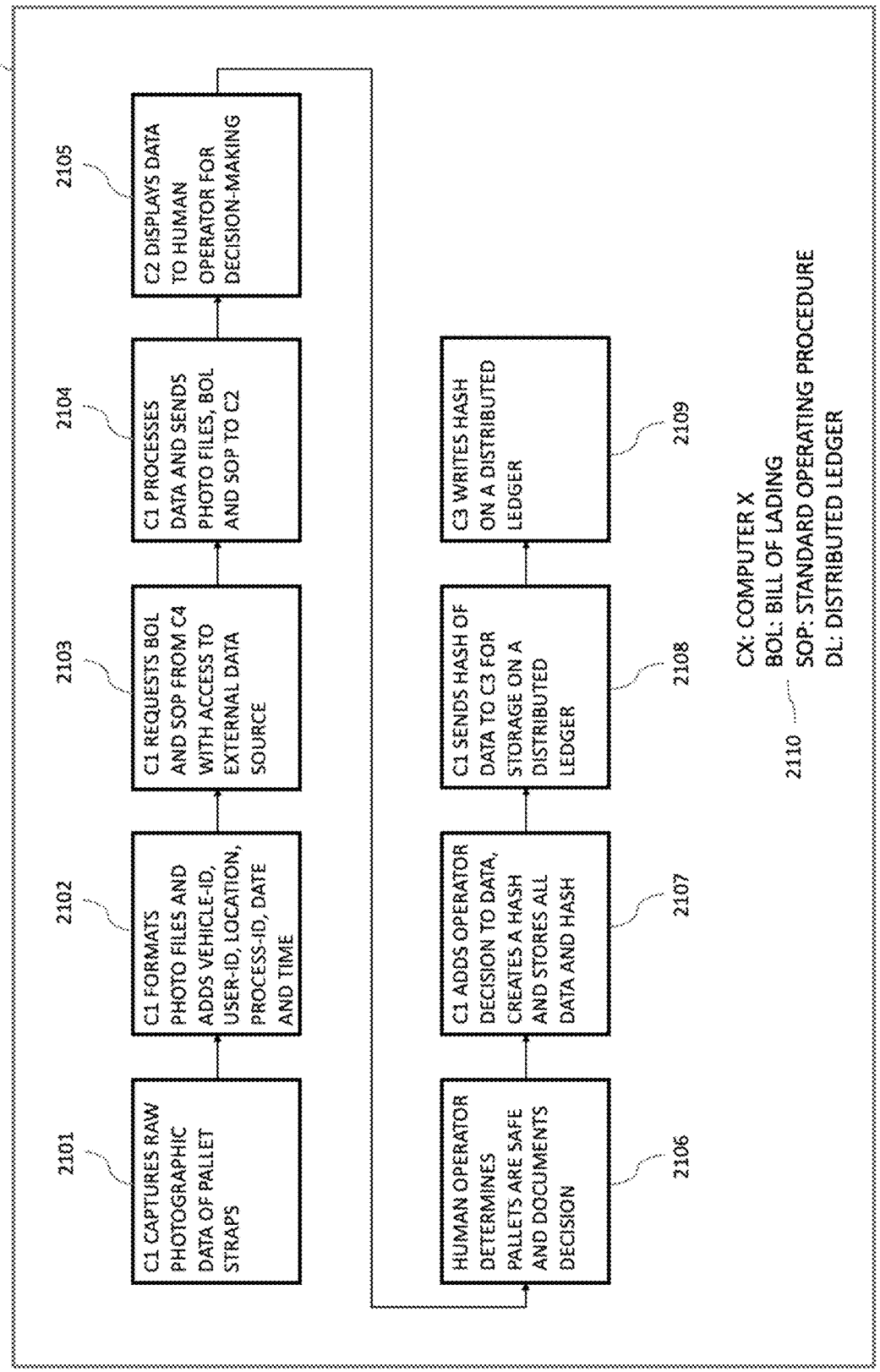

FIG. 22: A PRACTICAL EXAMPLE FOR A SYSTEM AND METHOD TO CAPTURE, PROCESS, FORMAT, ANALYZE AND SHARE EVENTS FROM A SUPPLY CHAIN ASSET (IN REFERRENCE TO SYSTEM 1400) USING A HASH

- 2201: C1 CAPTURES RAW PHOTOGRAPHIC DATA OF PALLET STRAPS
- 2202: C1 FORMATS PHOTO FILES AND ADDS VEHICLE-ID, USER-ID, LOCATION, PROCESS-ID, DATE AND TIME
- 2203: C1 REQUESTS BOL AND SOP FROM AN EXTERNAL DATA SOURCE
- 2204: C1 PROCESSES DATA AND SENDS PHOTO FILES, BOL AND SOP TO C2
- 2205: C2 DISPLAYS DATA TO HUMAN OPERATOR FOR DECISION-MAKING
- 2206: HUMAN OPERATOR DETERMINES PALLETS ARE SAFE AND DOCUMENTS DECISION
- 2207: C1 ADDS OPERATOR DECISION TO DATA, CREATES A HASH AND STORES ALL DATA AND HASH
- 2208: C1 SENDS HASH OF DATA TO C3 FOR STORAGE ON A DISTRIBUTED LEDGER
- 2209: C3 WRITES HASH ON A DISTRIBUTED LEDGER

2200

2210

CX: COMPUTER X
BOL: BILL OF LADING
SOP: STANDARD OPERATING PROCEDURE
DL: DISTRIBUTED LEDGER

FIG. 23: A PRACTICAL EXAMPLE FOR A SYSTEM AND METHOD TO CAPTURE, PROCESS, FORMAT, ANALYZE AND SHARE EVENTS FROM A SUPPLY CHAIN ASSET (IN REFERRENCE TO SYSTEM 1500) USING A HASH

- 2301: C1 CAPTURES RAW PHOTOGRAPHIC DATA OF PALLET STRAPS
- 2302: C1 FORMATS PHOTO FILES AND ADDS VEHICLE-ID, USER-ID, LOCATION, PROCESS-ID, DATE AND TIME
- 2303: C1 REQUESTS BOL AND SOP FROM AN EXTERNAL DATA SOURCE
- 2304: C1 PROCESSES All DATA
- 2305: C1 DISPLAYS DATA TO HUMAN OPERATOR FOR DECISION-MAKING
- 2306: HUMAN OPERATOR DETERMINES PALLETS ARE SAFE AND DOCUMENTS DECISION
- 2307: C1 ADDS OPERATOR DECISION TO DATA, CREATES A HASH AND STORES ALL DATA AND HASH
- 2308: C1 SENDS HASH OF DATA TO C2 FOR STORAGE ON A DISTRIBUTED LEDGER
- 2309: C2 WRITES HASH ON A DISTRIBUTED LEDGER
- 2310

CX: COMPUTER X
BOL: BILL OF LADING
SOP: STANDARD OPERATING PROCEDURE
DL: DISTRIBUTED LEDGER

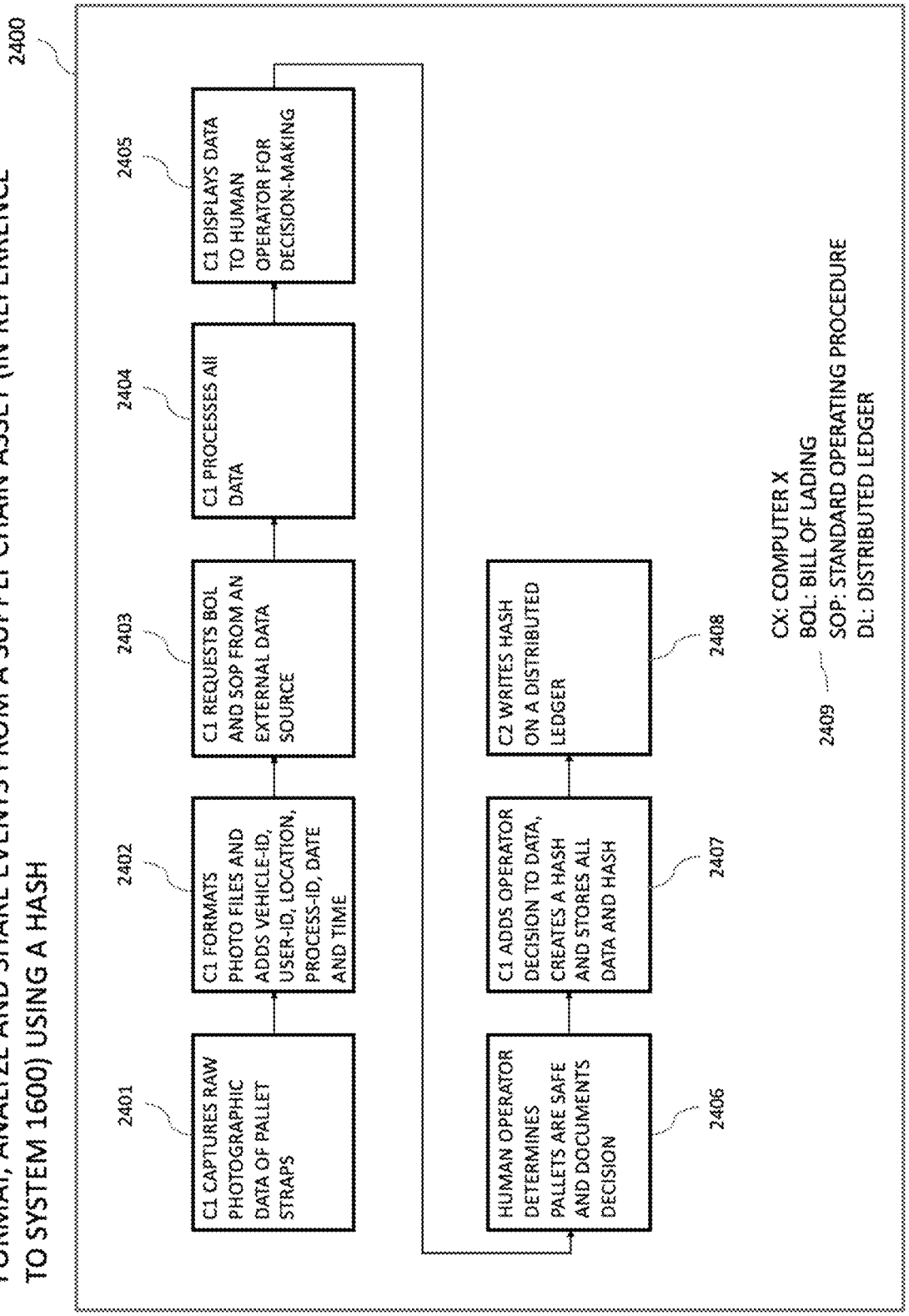
FIG. 24: A PRACTICAL EXAMPLE FOR A SYSTEM AND METHOD TO CAPTURE, PROCESS, FORMAT, ANALYZE AND SHARE EVENTS FROM A SUPPLY CHAIN ASSET (IN REFERRENCE TO SYSTEM 1600) USING A HASH

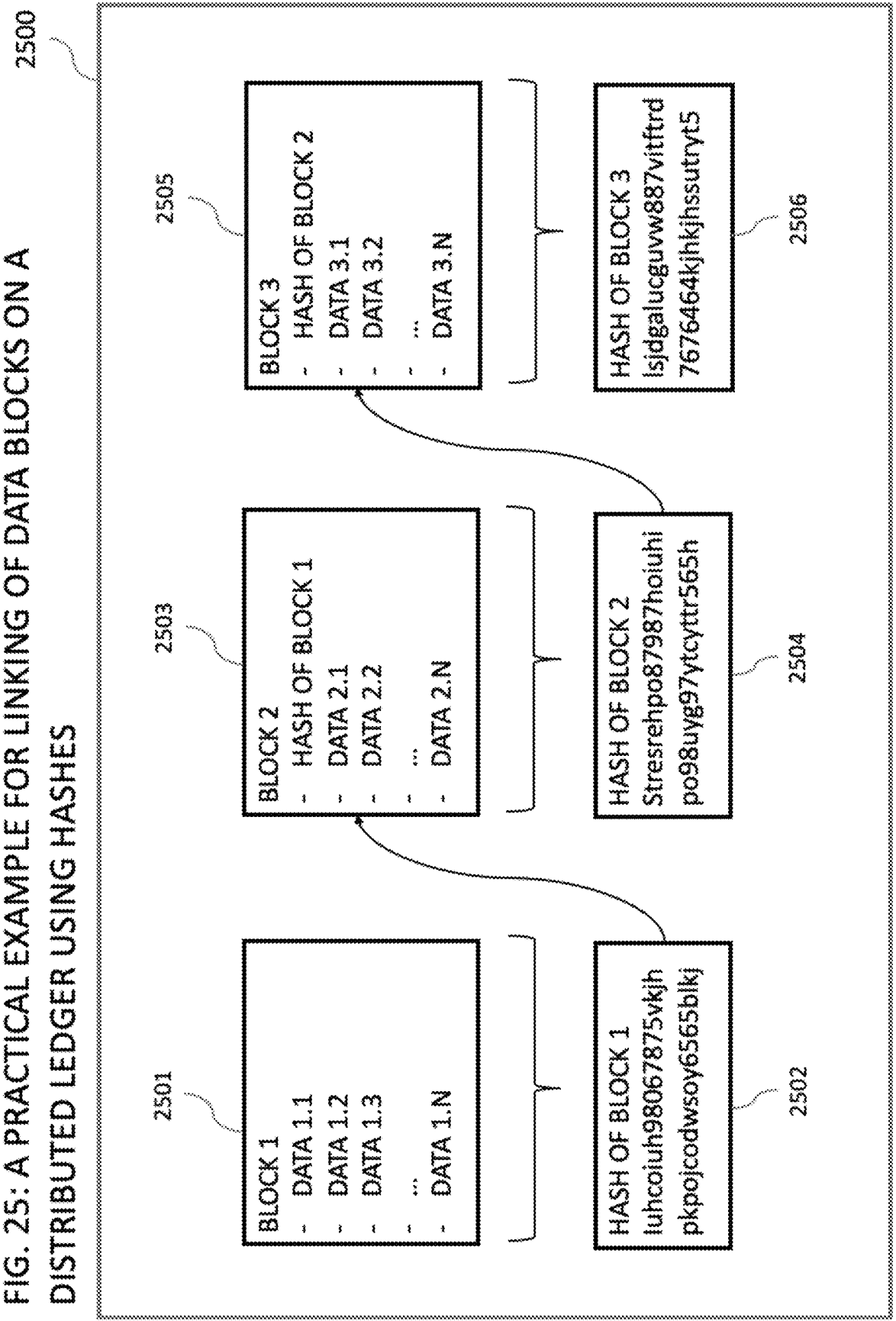
FIG. 25: A PRACTICAL EXAMPLE FOR LINKING OF DATA BLOCKS ON A DISTRIBUTED LEDGER USING HASHES

SYSTEMS FOR SUPPLY CHAIN EVENT MANAGEMENT

This application is a 371 National Stage application of International Application No. PCT/US2019/042924, filed Jul. 23, 2019, which claims the benefit of which claims the benefit of U.S. Provisional Application No. 62/702,890, filed Jul. 24, 2018, U.S. Provisional Application No. 62/714,700, filed Aug. 5, 2018, and U.S. Provisional Application No. 62/730,531, filed Sep. 12, 2018, each of which are hereby incorporated by reference in their entirety.

BACKGROUND ART

The inventor of the present invention has recognized problems unaddressed in the art regarding the recording of supply chain events in supply chain processes, especially as applied to the capture, formatting, processing, analysis, storage and sharing of supply chain event data. A supply chain event is the occurrence of a state and specifically the state of a person or an object relevant to the execution of a supply chain process. For example, the "arrival of a transportation vehicle" at a warehouse location or the "on-time delivery of materials" to a manufacturing location are supply chain events. Supply chain processes generate a wealth of data in regard to supply chain events that is often not shared among different parties involved in the execution of supply chain processes. Equally important, a lot of valuable supply chain event data is not captured at all. Specific supply chain event data may be known to personnel involved in the execution of a transaction, but it may never be properly documented or shared. Individual actors may not have a motivation to share this data, especially when exceptions occur such as a missed pick-up time or a late delivery. Further, the supply chain event data that is captured resides in central databases that are usually owned and operated by one of the parties involved in a given transaction with no or very limited access for all other involved parties. Still further, system interfaces that would allow wider sharing of supply chain event data between two or more central databases or systems are often prohibitively expensive, especially between parties that do not transact business with one another on a regular basis. Moreover, when supply chain event data is shared, there is seldom certainty about the validity or completeness of the data that is being shared. In current supply chain processes, it is entirely possible that only partial or wrong supply chain event data is shared. It is also possible for a party involved in the execution of a supply chain process to change or delete data after the fact. What is needed therefore are systems and methods for the capture, formatting, processing, analysis, storage, or sharing of supply chain event data in regard to the operation and execution of supply chain processes.

SUMMARY OF INVENTION

These and other problems in the art are overcome by the systems and related methods for the capture, formatting, processing, analysis, storage, or sharing of supply chain event data comprising a distributed ledger including, but not limited to, a Blockchain or Hashgraph in regard to the operation and execution of supply chain processes presented herein. Supply chain event data comprises of the occurrence of a state. For example, a transportation vehicle may need to be loaded with freight. The "arrival time" of the transportation vehicle, the "proper handling and loading" of the freight or the "securing of freight on a trailer" are examples of supply chain events. The resulting respective supply chain event data is "vehicle on-time arrival" versus an "early or late arrival", "handling and loading completed successfully" versus "handling and loading not completed successfully" or "freight secured correctly" versus "freight not secured correctly". When a supply chain event occurs, data about the event may be captured by one or more operators or one or more machines that are performing a task or activity during the supply chain process. The outcome of the supply chain task, activity, or process is data about one or more supply chain events as well. The supply chain event data that is collected, formatted, processed, analyzed, stored, or shared by one or more computers comprising a distributed ledger in regard to the execution of a supply chain transaction may be very valuable to operators of successive processes as well. For example, a delay in the delivery of freight may have consequences on a manufacturing process that requires the freight as input materials into the production of a product. With sufficient notice, for example, a manufacturing line may be set up to produce a different product until the needed input materials arrive at the manufacturing line.

The present invention stores supply chain event data on a distributed ledger, which makes it accessible to all parties with access to the distributed ledger, who are also involved in said supply chain transaction. A distributed ledger is an immutable record in the sense that it is cryptographically hard to change supply chain event data once it has been written to the distributed ledger. When a party in a supply chain or transportation transaction knows that its actions are recorded on an immutable ledger, it is much less likely that the party lightly misses a deliverable or does not communicate truthfully. Further, a distributed ledger has other advantages in supply chain and transportation applications. Supply chain event data that has been recorded on a distributed ledger can be audited by all parties with access to the distributed ledger. Indirect third-parties such as factoring businesses, money lenders, banks or insurance companies have the ability to obtain validated data from a distributed ledger that may be used to establish credit, the viability of a business or events that led to an insurance claim. It is also substantially easier to collect, process and report metrics on single transactions or a multitude of transactions, which in turn allows for process improvements and optimization by all parties involved. When supply chain event data is stored on a distributed ledger, it leads to a built-in redundancy and higher resiliency of the overall system. For example, when a central computer becomes unavailable or breaks down, the data stored on a distributed ledger is still available. Since distributed ledger technology relies on advanced cryptographic methods including, but not limited to, ECC, AES128, or AES256 encryption standards, private-public key cryptography, or hashing algorithms, their use can likely lead organizations to deploy them in other areas of the organization as well, thus making the overall information technology infrastructure more secure. Still further, it is conceivable that future information systems such as enterprise resource planning, warehouse management systems or transportation management systems may rely on distributed ledger technology as well. When that occurs, computer system interfaces between different systems are much easier to implement as companies with permission to access the data may just pull it from a distributed ledger of a different party, which is substantially easier and faster to accomplish than traditional system interfaces enabled through application programming interfaces, application binary interfaces, file grabbers, or direct access to external databases among others. In some embodiments of the present invention, it is conceivable that payments may be processed very efficiently through the use of distributed ledger and smart contract technology, which is another advantage of the technology. This may be true for financial transactions including, but not limited to, fees that a service provider may charge, the settlement and payment of entire transactions or the deduction of charges such as leasing fees for equipment from transaction revenue that the party leasing the equipment may earn.

The present disclosure provides a system for supply chain event management, comprising: (a) a computing system operably communicating with a distributed ledger computer, the distributed ledger computer being a node of a distributed ledger, (b) the computing system capturing first event data during the execution of a supply chain process, and obtaining first and second attributes of the supply chain process, (c) the computing system making a first determination to either maintain a first course of action in the supply chain process or to change the first course of action in the supply chain process utilizing the first event data and the first and second attributes, (d) the computing system generating a first record having the first event data, the first and second attributes, and the first determination, and storing the first record therein, (e) the computing system sending the first record to the distributed ledger computer, and (f) the distributed ledger computer adding the first record to a first block and broadcasting the first block to a plurality of nodes of the distributed ledger to validate and store the first block on the distributed ledger.

In one embodiment the computing system further calculating a hash value of the first record, the computing system sending the hash value to the distributed ledger computer, the distributed ledger computer adding the hash value to a second block and broadcasting the second block to the plurality of nodes of the distributed ledger to validate and store of the second block on the distributed ledger.

In another embodiment the computing system further displaying the first record, and receiving input data that indicates a second determination relating to the first course of action of the supply chain process, the computing system operably communicating with an external data source, the computing system obtaining a third attribute of the supply chain process from the external data source, the computing system generating a second record having the first event data, the first, second and third attributes, and the first and second determinations, and storing the second record therein, the computing system sending the second record to the distributed ledger computer, and the distributed ledger computer adding the second record to a second block and broadcasting the second block to the plurality of nodes of the distributed ledger to validate and store the second block on the distributed ledger.

In a further embodiment the distributed ledger is at least one of a private distributed ledger or a public distributed ledger. In another embodiment the execution of the supply chain process is performed by a supply chain asset that is self-operating or human-operable. In an additional embodiment, the supply chain asset that is self-operating is an autonomous vehicle. In yet another embodiment, the first event data comprises raw data, and the first record comprises processed data.

In certain embodiments the computing system capturing second event data during the execution of the supply chain process, and obtaining third and fourth attributes of the supply chain process, the computing system making a second determination to either maintain a second course of action in the supply chain process or to change the second course of action in the supply chain process utilizing the second event data and the third and fourth attributes, the computing system generating a second record having the second event data, the third and fourth attributes, and the second determination, and storing the second record therein, the computing system sending the second record to the distributed ledger computer, and the distributed ledger computer adding the second record to a second block and broadcasting the second block to the plurality of nodes of the distributed ledger to validate and store the second block on the distributed ledger. In other embodiments, the first event data comprises raw data, and the first record comprises processed data, and the first and second records comprise meta event data.

In particular embodiments the computing system comprises first, second, third, and fourth computers operably communicating with one another, the third and fourth computer operably communicating with the distributed ledger computer, the first computer capturing the first event data during the execution of the supply chain process, and obtaining the first attribute of the supply chain process that is stored therein, the first computer sending a first message to the second computer, the first message having the first event data and the first attribute of the supply chain process therein, the second computer sending a second message to the fourth computer in response to the first message, the second message having the first attribute and requesting the second attribute of the supply chain process from the fourth computer, the fourth computer obtaining the second attribute stored therein utilizing the first attribute in response to the second message, and sending a third message to the second computer having the second attribute therein in response to the second message, the second computer sending a fourth message to the third computer, the fourth message having the first event data and the first and second attributes of the supply chain process therein, the third computer making the first determination to either maintain the first course of action in the supply chain process or to change the first course of action in the supply chain process utilizing the first event data and the first and second attributes, the third computer generating the first record having the first event data, the first and second attributes, and the first determination, and sending a fifth message having the first record therein to the fourth computer, and sending a sixth message having the first record therein to the distributed ledger computer, the fourth computer storing the first record therein in response to the fifth message, and the distributed ledger computer adding the first record to the first block and broadcasting the first block to the plurality of nodes of the distributed ledger to validate and store the first block on the distributed ledger, in response to the sixth message.

In another embodiment the third computer further calculating a hash value of the first record, the third computer sending a seventh message having the hash value therein to the distributed ledger computer, and the distributed ledger computer adding the hash value to the second block and broadcasting the second block to the plurality of nodes of the distributed ledger to validate and store the second block on the distributed ledger, in response to the seventh message.

In a further embodiment the computing system further comprises fifth and sixth computers that operably communicate with the first, second, third, and fourth computers, the fifth computer displaying the first record, and receiving the input data that indicates the second determination relating to the first course of action of the supply chain process, and sending a seventh message having the second determination to the third computer, the sixth computer operably communicating with an external data source, the sixth computer obtaining a third attribute of the supply chain process from the external data source, the sixth computer sending an eighth message having the third attribute therein to the third computer, the third computer generating a second record having the first event data, the first, second and third attributes, and the first and second determinations, and storing the second record therein, the computing system sending a ninth message having the second record therein to the distributed ledger computer, and the distributed ledger computer adding the second record to a second block and broadcasting the second block to the plurality of nodes of the distributed ledger to validate and store the second block on the distributed ledger.

In a further embodiment the supply chain process is a transport of freight, the first event data is a digital photograph captured during the supply chain process, the first attribute is a process identifier of the supply chain process, the second attribute is a second record providing a description of the supply chain process, the first course of action is a transporting of freight by the supply chain process from a departure location to a destination location, and the third computer making the first determination to either maintain the first course of action or to change the first course of action based on the digital photograph of the supply chain process, the process identifier, and the description of the supply chain process.

In other embodiments the computing system comprises first, second, and third computers operably communicating with one another, the third computer operably communicating with the distributed ledger computer, the first computer capturing the first event data during the execution of the supply chain process, and obtaining the first attribute of the supply chain process that is stored therein, the first computer sending a first message to the second computer, the first message having the first event data and the first attribute of the supply chain process therein, the second computer sending a second message to the third computer in response to the first message, the second message having the first attribute and requesting the second attribute of the supply chain process from the third computer, the third computer obtaining the second attribute stored therein utilizing the first attribute in response to the second message, the third computer sending a third message to the second computer having the second attribute therein in response to the second message, the second computer making the first determination to either maintain the first course of action in the supply chain process or to change the first course of action in the supply chain process utilizing the first event data and the first and second attributes, the second computer generating a first record having the first event data, the first and second attributes, and the first determination, and sending a fourth message having the first record therein to the third computer, and sending a fifth message having the first record therein to the distributed ledger computer, the third computer storing the first record therein in response to the fourth message, and the distributed ledger computer adding the first record to the first block and broadcasting the first block to the plurality of nodes of the distributed ledger to validate and store the first block on the distributed ledger, in response to the fifth message.

In yet another embodiment the second computer further calculating a hash value of the first record the second computer sending a sixth message having the hash value therein to the distributed ledger computer, and the distributed ledger computer adding the hash value to a second block and broadcasting the second block to the plurality of nodes of the distributed ledger to validate and store the second block on the distributed ledger, in response to the sixth message.

In further embodiments the computing system further comprises fourth and fifth computers that operably communicate with the second computer, the fourth computer displaying the first record, and receiving the input data that indicates the second determination relating to the first course of action of the supply chain process, and sending a sixth message having the second determination to the second computer, the fifth computer operably communicating with an external data source, the fifth computer obtaining a third attribute of the supply chain process from the external data source, the fifth computer sending a seventh message with the third attribute therein to the second computer, the second computer generating a second record having the first event data, the first, second and third attributes, and the first and second determinations, and storing the second record therein, the second computer sending an eighth message having the second record therein to the distributed ledger computer, and the distributed ledger computer adding the second record to a second block and broadcasting the second block to the plurality of nodes of the distributed ledger to validate and store the second block on the distributed ledger.

In yet another embodiment the supply chain process is a transport of freight, the first event data is a digital photograph captured during the supply chain process, the first attribute is a process identifier of the supply chain process, the second attribute is a second record providing a description of the supply chain process, the first course of action is a transporting of freight by the supply chain process from a departure location to a destination location, and the second computer making the first determination to either maintain the first course of action or to change the first course of action based on the digital photograph of the supply chain process, the process identifier, and the description of the supply chain process.

In another embodiment the computing system comprises first and second computers operably communicating with one another, the second computer operably communicating with the distributed ledger computer, the first computer capturing the first event data of a supply chain process, and obtaining a first attribute of the supply chain process that is stored therein, the first computer sending a first message to the second computer, the first message having the first event data and the first attribute therein, the second computer obtaining a second attribute of the supply chain process stored therein utilizing the first attribute in response to the first message, the second computer making a first determination to either maintain a first course of action in the supply chain process or to change the first course of action in the supply chain process utilizing the first event data and the first and second attributes, the second computer generating a first record having the first event data, the first and second attributes, and the first determination, the second computer storing the first record therein, the second computer sending a second message having the first record therein to the distributed ledger computer, and the distributed ledger computer adding the first record to the first block and broadcasting the first block to the plurality of nodes of the distributed ledger to validate and store the first block on the distributed ledger, in response to the second message.

In a further embodiment the second computer calculating a hash value of the first record, the second computer sending a third message having the hash value therein to the distributed ledger computer, and the distributed ledger computer adding the hash value to a second block and broadcasting the second block to the plurality of nodes of the distributed ledger to validate and store the second block on the distributed ledger, in response to the third message.

In another embodiment the computing system further comprises third and fourth computers that operably communicate with the second computer, the third computer displaying the first record, and receiving the input data that indicates a second determination relating to the first course of action of the supply chain process, and sending a third message having the second determination to the second computer, the fourth computer operably communicating with an external data source, the fourth computer obtaining a third attribute of the supply chain process from the external data source, the fourth computer sending a fourth message to the second computer with the third attribute therein, the second computer generating a second record having the first event data, the first, second and third attributes, and the first and second determinations, and storing the second record therein, the second computer sending a fifth message with the second record therein to the distributed ledger computer, and the distributed ledger computer adding the second record to a second block and broadcasting the second block to the plurality of nodes of the distributed ledger to validate and store the second block on the distributed ledger.

In yet another embodiment the supply chain process is a transport of freight, the first event data is a digital photograph captured during the supply chain process, the first attribute is a process identifier of the supply chain process, the second attribute is a second record providing a description of the supply chain process, the first course of action is a transporting of freight by the supply chain process from a departure location to a destination location, and the second computer making the first determination to either maintain the first course of action or to change the first course of action based on the digital photograph of the supply chain process, the process identifier, and the description of the supply chain process.

In a further embodiment the computing system comprises first and second computers operably communicating with one another, the second computer operably communicating with the distributed ledger computer, the first computer capturing the first event data of the supply chain process and obtaining the first attribute of the supply chain process that is stored therein, the first computer sending a first message to the second computer, the first message having the first attribute therein, the second computer obtaining the second attribute of the supply chain process utilizing the first attribute in response to the first message, and sending a second message to the first computer in response to the first message, the second message having the second attribute therein, the first computer making the first determination to either maintain the first course of action in the supply chain process or to change the first course of action in the supply chain process utilizing the first event data and the first and second attributes, the first computer generating the first record having the first event data, the first and second attributes, and the first determination, the first computer sending a third message having the first record therein to the second computer, and sending a fourth message having the first record therein to the distributed ledger computer, the second computer storing the first record therein in response to the third message, and the distributed ledger computer adding the first record to the first block and broadcasting the first block to the plurality of nodes of the distributed ledger to validate and store the first block on the distributed ledger, in response to the fourth message.

In another embodiment the first computer calculating a hash value of the first record, the first computer sending a fifth message having the hash value therein to the distributed ledger computer, and the distributed ledger computer adding the hash value to a second block and broadcasting the second block to the plurality of nodes of the distributed ledger to validate and store the second block on the distributed ledger, in response to the fifth message.

In yet another embodiment the computing system further comprises third and fourth computers that operably communicate with the second computer, the third computer displaying the first record, and receiving the input data that indicates a second determination relating to the first course of action of the supply chain process, and sending a fifth message having the second determination therein to the second computer, the fourth computer operably communicating with an external data source, the fourth computer obtaining a third attribute of the supply chain process from the external data source, the fourth computer sending a sixth message having the third attribute therein to the second computer, the second computer generating a second record having the first event data, the first, second and third attributes, and the first and second determinations, and storing the second record therein, the second computer sending a seventh message having the third record therein to the distributed ledger computer, and the distributed ledger computer adding the second record to a second block and broadcasting the second block to the plurality of nodes of the distributed ledger to validate and store the second block on the distributed ledger.

In a further embodiment the supply chain process is a transport of freight, the first event data is a digital photograph captured during the supply chain process, the first attribute is a process identifier of the supply chain process, the second attribute is a second record providing a description of the supply chain process, the first course of action is a transporting of freight by the supply chain process from a departure location to a destination location, and the second computer making the first determination to either maintain the first course of action or to change the first course of action based on the digital photograph of the supply chain process, the process identifier, and the description of the supply chain process.

In another embodiment the computing system comprises a first computer operably communicating with the distributed ledger computer, the first computer capturing the first event data of the supply chain process, and obtaining the first and second attributes of the supply chain process that are stored therein, the first computer making the first determination to either maintain the first course of action in the supply chain process or to change the first course of action in the supply chain process utilizing the first event data and the first and second attributes, the first computer generating the first record having the first event data, the first and second attributes, and the first determination, and storing the first record therein, the first computer sending a first message having the first record therein to the distributed ledger computer, and the distributed ledger computer adding the first record to a first block and broadcasting the first block to the plurality of nodes of the distributed ledger to validate and store the first block on the distributed ledger, in response to the first message.

In yet another embodiment the first computer calculating a hash value of the first record, the first computer sending a second message having the hash value therein to the distributed ledger computer, and the distributed ledger computer adding the hash value to a second block and broadcasting the second block to the plurality of nodes of the distributed ledger to validate and store the second block on the distributed ledger, in response to the second message.

In a further embodiment the computing system further comprises second and third computers that operably communicate with the first computer, the second computer displaying the first record, and receiving the input data that indicates a second determination relating to the first course of action of the supply chain process, and sending a second message having the second determination therein to the first computer, the third computer operably communicating with an external data source, the third computer obtaining a third attribute of the supply chain process from the external data source, the third computer sending a third message having the third attribute therein to the first computer, the first computer generating a second record having the first event data, the first, second and third attributes, and the first and second determinations, and storing the second record therein, the first computer sending a fourth message having the second record therein to the distributed ledger computer, and the distributed ledger computer adding the second record to a second block and broadcasting the second block to the plurality of nodes of the distributed ledger to validate and store the second block on the distributed ledger.

In yet another embodiment the computing system further comprises a second computer that operably communicates with the first computer, the second computer displaying the first record, and receiving the input data that indicates a second determination relating to the first course of action of the supply chain process, and sending a second message having the second determination therein to the first computer, the first computer further operably communicating with an external data source, the first computer obtaining a third attribute of the supply chain process from the external data source, the first computer generating a second record having the first event data, the first, second and third attributes, and the first and second determinations, and storing the second record therein, the first computer sending a fourth message having the second record therein to the distributed ledger computer, and the distributed ledger computer adding the second record to a second block and broadcasting the second block to the plurality of nodes of the distributed ledger to validate and store the second block on the distributed ledger.

In another embodiment the first computer displaying the first record, and receiving the input data that indicates a second determination relating to the first course of action of the supply chain process, the first computer further operably communicating with an external data source, the first computer obtaining a third attribute of the supply chain process from the external data source, the first computer generating a second record having the first event data, the first, second and third attributes, and the first and second determinations, and storing the third record therein, the first computer sending a fourth message having the second record therein to the distributed ledger computer, and the distributed ledger computer adding the second record to a second block and broadcasting the second block to the plurality of nodes of the distributed ledger to validate and store the second block on the distributed ledger.

In a further embodiment the supply chain process is a transport of freight, the first event data is a digital photograph captured during the supply chain process, the first attribute is a process identifier of the supply chain process, the second attribute is a second record providing a description of the supply chain process, the first course of action is a transporting of freight by the supply chain process from a departure location to a destination location, and the first computer making the first determination to either maintain the first course of action or to change the first course of action based on the digital photograph of the supply chain process, the process identifier, and the description of the supply chain process.

The disclosure also provides a system for supply chain event management, comprising: a first computer capturing first event data of a supply chain process, and obtaining first and second attributes of the supply chain process that are stored therein, the first computer making a first determination to either maintain a first course of action in the supply chain process or to change the first course of action in the supply chain process utilizing the first event data and the first and second attributes, the first computer generating a first record having the first event data, the first and second attributes, and the first determination, and storing the first record therein, and the first computer adding the first record to a first block and broadcasting the first block to the plurality of nodes of a distributed ledger to validate and store the first block on the distributed ledger.

In certain embodiments the first computer calculating a hash value of the first record, and the first computer adding the hash value to a second block and broadcasting the second block to the plurality of nodes of the distributed ledger to validate and store the second block on the distributed ledger.

In a further embodiment the first computer operably communicating with an external data source, the first computer obtaining a third attribute of the supply chain process from the external data source, the first computer generating a second record having the first event data, the first, second and third attributes, and the first and second determinations, and storing the second record therein, and the first computer adding the second record to a second block and broadcasting the second block to the plurality of nodes of the distributed ledger to validate and store the second block on the distributed ledger.

In another embodiment the supply chain process is a transport of freight, the first event data is a digital photograph captured during the supply chain process, the first attribute is a process identifier of the supply chain process, the second attribute is a second record providing a description of the supply chain process, the first course of action is a transporting of freight by the supply chain process from a departure location to a destination location, and the first computer making the first determination to either maintain the first course of action or to change the first course of action based on the digital photograph of the supply chain process, the process identifier, and the description of the supply chain process.

The disclosure further provides a system for supply chain event management, comprising: a computing system that operably communicates with first and second distributed ledger computers, the first distributed ledger computer being a node of a first distributed ledger, the second distributed ledger computer being a node of a second distributed ledger, the computing system capturing first event data of a supply chain process, and obtaining a first attribute of the supply chain process that is stored therein, the computing system obtaining a second attribute of the supply chain process utilizing the first attribute, the computing system making a first determination to either maintain a first course of action in the supply chain process or to change the first course of action in the supply chain process utilizing the first event data and the first and second attributes, the computing system generating a first record having the first event data, the first and second attributes, and the first determination, the computing system calculating a hash value of the first record, the first distributed ledger computer adding the hash value to a first block and broadcasting the first block to a plurality of nodes of the first distributed ledger to validate and store the first block on the first distributed ledger, and the second distributed ledger computer adding the hash value to a second block and broadcasting the second block to a plurality of nodes of the second distributed ledger to validate and store the second block on the second distributed ledger.

In certain embodiments the computing system comprises first and second computers operably communicating with one another, the second computer operably communicating with the first and second distributed ledger computers, the first computer capturing the first event data of the supply chain process, and obtaining the first attribute of the supply chain process that is stored therein, the first computer sending a first message to the second computer, the first message having the first attribute therein, the second computer obtaining the second attribute of the supply chain process utilizing the first attribute in response to the first message, and sending a second message to the first computer in response to the first message, the second message having the second attribute therein, the first computer making the first determination to either maintain the first course of action in the supply chain process or to change the first course of action in the supply chain process utilizing the first event data and the first and second attributes, the first computer generating the first record having the first event data, the first and second attributes, and the first determination, the first computer further calculating the hash value of the first record, the first computer sending a third message having the hash value to the first distributed ledger computer, and a fourth message having the hash value to the second distributed ledger computer, the first distributed ledger computer adding the hash value to the first block and broadcasting the first block to the plurality of nodes of the first distributed ledger to validate and store the first block on the first distributed ledger in response to the third message, and the second distributed ledger computer adding the hash value to the second block and broadcasting the second block to the plurality of nodes of the second distributed ledger to validate and store the second block on the second distributed ledger in response to the fourth message.

The present disclosure additionally provides a system for supply chain event management, comprising: a computing system that operably communicates with first and second distributed ledger computers, the first distributed ledger computer being a node of a first distributed ledger, the second distributed ledger computer being a node of a second distributed ledger, the computing system capturing first event data of a supply chain process, and obtaining a first attribute of the supply chain process that is stored therein, the computing system obtaining a second attribute of the supply chain process utilizing the first attribute, the computing system making a first determination to either maintain a first course of action in the supply chain process or to change the first course of action in the supply chain process utilizing the first event data and the first and second attributes, the computing system generating a first record having the first event data, the first and second attributes, and the first determination, the computing system splitting the first record into second and third records, the computing system calculating a first hash value of the second record, and sending the first hash value to the first distributed ledger computer, and the computing system calculating a second hash value of the third record, and sending the second hash value to the second distributed ledger computer, the first distributed ledger computer adding the first hash value to a first block and broadcasting the first block to a plurality of nodes of the first distributed ledger to validate and store the first block on the first distributed ledger, and the second distributed ledger computer adding the second hash value to a second block and broadcasting the second block to a plurality of nodes of the second distributed ledger to validate and store the second block on the second distributed ledger.

In yet another embodiment the computing system includes first and second computer operably communicating with one another, the second computer operably communicating with the first and second distributed ledger computers, the first computer capturing the first event data of the supply chain process, and obtaining the first attribute of the supply chain process that is stored therein, the first computer sending a first message to the second computer, the first message having the first attribute therein, the second computer obtaining the second attribute of the supply chain process utilizing the first attribute in response to the first message, and sending a second message to the first computer in response to the first message, the second message having the second attribute therein, the first computer making the first determination to either maintain a first course of action in the supply chain process or to change the first course of action in the supply chain process utilizing the first event data and the first and second attributes, the first computer generating the first record having the first event data, the first and second attributes, and the first determination, the first computer splitting the first record into second and third records, the first computer calculating a first hash value of the second record, and sending a third message with the first hash value therein to the first distributed ledger computer, the first computer calculating a second hash value of the third record, and sending a fourth message with the second hash value therein to the second distributed ledger computer, the first distributed ledger computer adding the first hash value to a first block and broadcasting the first block to a plurality of nodes of the first distributed ledger to validate and store the first block on the first distributed ledger, in response to the third message, and the second distributed ledger computer adding the second hash value to a second block and broadcasting the second block to a plurality of nodes of the second distributed ledger to validate and store the second block on the second distributed ledger, in response to the fourth message.

The present disclosure also provides a system for supply chain event management, comprising: a computing system operably communicating with the first and second distributed ledger computers, the first distributed ledger computer being a node of a first distributed ledger, the second distributed ledger computer being a node of a second distributed ledger, the computing system capturing first event data of a supply chain process and obtaining a first attribute of the supply chain process that is stored therein, the computing system obtaining a second attribute of the supply chain process utilizing the first attribute, the computing system making a first determination to either maintain a first course of action in the supply chain process or to change the first course of action in the supply chain process utilizing the first event data and the first and second attributes, the computing system generating a first record having the first event data, the first and second attributes, and the first determination, the computing system calculating a first hash value of the first record, and splitting the first hash value into second and third hash values, the computing system sending the second hash value to the first distributed ledger computer, and sending the third hash value to the second distributed ledger computer, the first distributed ledger computer adding the second hash value to a first block and broadcasting the first block to a plurality of nodes of the first distributed ledger to validate and store the first block on the first distributed ledger, and the second distributed ledger computer adding the third hash value to a second block and broadcasting the second block to a plurality of nodes of the second distributed ledger to validate and store the second block on the second distributed ledger.

In another embodiment the computing system includes first and second computer operably communicating with one another, the second computer operably communicating with the first and second distributed ledger computers, the first computer capturing the first event data of the supply chain process and obtaining the first attribute of the supply chain process that is stored therein, the first computer sending a first message to the second computer, the first message having the first attribute therein, the second computer obtaining the second attribute of the supply chain process utilizing the first attribute in response to the first message, and sending a second message to the first computer in response to the first message, the second message having the second attribute therein, the first computer making the first determination to either maintain the first course of action in the supply chain process or to change the first course of action in the supply chain process utilizing the first event data and the first and second attributes, the first computer generating the first record having the first event data, the first and second attributes, and the first determination, the first computer calculating the first hash value of the first record, and splitting the first hash value into second and third hash values, the first computer sending a third message having the second hash value therein to the first distributed ledger computer, and sending a fourth message having the third hash value therein to the second distributed ledger computer, the first distributed ledger computer adding the second hash value to the first block and broadcasting the first block to the plurality of nodes of the first distributed ledger to validate and store the first block on the first distributed ledger, in response to the third message, and the second distributed ledger computer adding the third hash value to the second block and broadcasting the second block to the plurality of nodes of the second distributed ledger to validate and store the second block on the second distributed ledger, in response to the fourth message.

The present disclosure further provides a system for supply chain event management, comprising: a computing system operably communicating with the first and second distributed ledger computers, the first distributed ledger computer being a node of a first distributed ledger, the second distributed ledger computer being a node of a second distributed ledger, the computing system capturing first event data of a supply chain process and obtaining a first attribute of the supply chain process that is stored therein, the computing system obtaining a second attribute of the supply chain process utilizing the first attribute, the computing system making a first determination to either maintain a first course of action in the supply chain process or to change the first course of action in the supply chain process utilizing the first event data and the first and second attributes, the computing system generating a first record having the first event data, the first and second attributes, and the first determination, the computing system sending a third message with the first record therein to the first distributed ledger computer, and sending a fourth message with the first record therein to the second distributed ledger computer, the first distributed ledger computer adding the first record to a first block and broadcasting the first block to a plurality of nodes of the first distributed ledger to validate and store the first block on the first distributed ledger, in response to the third message and the second distributed ledger computer adding the first record to a second block and broadcasting the second block to a plurality of nodes of the second distributed ledger to validate and store the second block on the second distributed ledger, in response to the fourth message.

In another embodiment the computing system includes first and second computer operably communicating with one another, the second computer operably communicating with the first and second distributed ledger computers, the first computer capturing the first event data of the supply chain process and obtaining the first attribute of the supply chain process that is stored therein, the first computer sending a first message to the second computer, the first message having the first attribute therein, the second computer obtaining the second attribute of the supply chain process utilizing the first attribute in response to the first message, and sending a second message to the first computer in response to the first message, the second message having the second attribute therein, the first computer making the first determination to either maintain a first course of action in the supply chain process or to change the first course of action in the supply chain process utilizing the first event data and the first and second attributes, the first computer generating the first record having the first event data, the first and second attributes, and the first determination, the first computer sending a third message with the first record therein to the first distributed ledger computer, and sending a fourth message with the first record therein to the second distributed ledger computer, the first distributed ledger computer adding the first record to the first block and broadcasting the first block to the plurality of nodes of the first distributed ledger to validate and store the first block on the first distributed ledger, in response to the third message, and the second distributed ledger computer adding the first record to the second block and broadcasting the second block to the plurality of nodes of the second distributed ledger to validate and store the second block on the second distributed ledger, in response to the fourth message.

The present disclosure also provides a system for supply chain event management, comprising: a computing system operably communicating with the first and second distributed ledger computers, the first distributed ledger computer being a node of a first distributed ledger, the second distributed ledger computer being a node of a second distributed ledger, the computing system capturing first event data of a supply chain process and obtaining a first attribute of the supply chain process that is stored therein, the computing system obtaining a second attribute of the supply chain process utilizing the first attribute, the computing system making a first determination to either maintain a first course of action in the supply chain process or to change the first course of action in the supply chain process utilizing the first event data and the first and second attributes, the computing system generating a first record having the first event data, the first and second attributes, and the first determination, the computing system splitting the first record into second and third records, the computing system sending a third message with the second record therein to the first distributed ledger computer, and sending a fourth message with the third record therein to the second distributed ledger computer, the first distributed ledger computer adding the second record to a first block and broadcasting the first block to a plurality of nodes of the first distributed ledger to validate and store the first block on the first distributed ledger, in response to the third message, and the second distributed ledger computer adding the third record to a second block and broadcasting the second block to a plurality of nodes of the second distributed ledger to validate and store the second block on the second distributed ledger, in response to the fourth message.

In a further embodiment the computing system includes first and second computer operably communicating with one another, the second computer operably communicating with the first and second distributed ledger computers, the first computer capturing the first event data of the supply chain process and obtaining a first attribute of the supply chain process that is stored therein, the first computer sending a first message to the second computer, the first message having the first attribute therein, the second computer obtaining the second attribute of the supply chain process utilizing the first attribute in response to the first message, and sending a second message to the first computer in response to the first message, the second message having the second attribute therein, the first computer making the first determination to either maintain a first course of action in the supply chain process or to change the first course of action in the supply chain process utilizing the first event data and the first and second attributes, the first computer generating the first record having the first event data, the first and second attributes, and the first determination, the first computer splitting the first record into second and third records, the first computer sending a third message with the second record therein to the first distributed ledger computer, and sending a fourth message with the third record therein to the second distributed ledger computer, the first distributed ledger computer adding the second record to the first block and broadcasting the first block to the plurality of nodes of the first distributed ledger to validate and store the first block on the first distributed ledger, in response to the third message, and the second distributed ledger computer adding the third record to the second block and broadcasting the second block to the plurality of nodes of the second distributed ledger to validate and store the second block on the second distributed ledger, in response to the fourth message.

BRIEF DESCRIPTION OF DRAWINGS

FIG. 1 is a diagram illustrating supply chain event data types;

FIG. 2 is a diagram illustrating supply chain event data types, distributed ledger types, and formats for supply chain event data;

FIG. 3 is a schematic of a system for supply chain event management in accordance with an exemplary embodiment;

FIG. 4 is a schematic of a system for supply chain event management in accordance with another exemplary embodiment;

FIG. 5 is a schematic of a system for supply chain event management in accordance with another exemplary embodiment;

FIG. 6 is a schematic of a system for supply chain event management in accordance with another exemplary embodiment;

FIG. 7 is a schematic of a system for supply chain event management in accordance with another exemplary embodiment;

FIG. 8 is a schematic of a system for supply chain event management in accordance with another exemplary embodiment;

FIG. 9 is a block diagram of a method of storing hashed supply chain event data on a public distributed ledger utilizing the system of FIG. 3;

FIG. 10 is a block diagram of a method for storing hashed supply chain event data on a public distributed ledger utilizing the system of FIG. 3;

FIG. 11 is a block diagram of a method for storing hashed supply chain event data on a public distributed ledger utilizing the system of FIG. 6;

FIG. 12 is a block diagram of a method for storing supply chain event data on two or more distributed ledgers utilizing the system of FIG. 8;

FIG. 13 is a block diagram of a method for storing partial supply chain event data on a first distributed ledger and partial supply chain event data on a second distributed ledger utilizing the system of FIG. 8;

FIG. 14 is a schematic of a system for supply chain event management in accordance with another exemplary embodiment;

FIG. 15 is a schematic of a system for supply chain event management in accordance with another exemplary embodiment;

FIG. 16 is a schematic of a system for supply chain event management in accordance with another exemplary embodiment;

FIG. 17 is a block diagram of a method for converting raw supply chain event data into processed supply chain event data and the use in decision-making;

FIG. 18 is a block diagram of a method for storing hashed supply chain event data on a public distributed ledger utilizing the system of FIG. 4;

FIG. 19 is a block diagram of a method for storing hashed supply chain event data on a public distributed ledger utilizing the system of FIG. 5;

FIG. 20 is a block diagram of a method for storing hashed supply chain event data on a public distributed ledger utilizing the system of FIG. 6;

FIG. 21 is a block diagram of a method for storing hashed supply chain event data on a public distributed ledger utilizing the system of FIG. 7;

FIG. 22 is a block diagram of a method for storing hashed supply chain event data on a public distributed ledger utilizing the system of FIG. 14;

FIG. 23 is a block diagram of a method for storing hashed supply chain event data on a public distributed ledger utilizing the system of FIG. 15;

FIG. 24 is a block diagram of a method for storing hashed supply chain event data on a public distributed ledger utilizing the system of FIG. 16; and FIG. 25 is a block diagram illustrating linking data blocks on a distributed ledger using hashes.

DESCRIPTION OF EMBODIMENTS

Systems and related methods for the capture, formatting, processing, analysis, storage, or sharing of supply chain event data comprising a distributed ledger including, but not limited to, a Blockchain or Hashgraph in regard to the operation and execution of supply chain processes are presented herein. A multitude of supply chain events and supply chain event data can be observed in every supply chain transaction. The present invention enables a user to capture supply chain event data, make sense of it through the application of formatting, processing and analysis, store supply chain event data in a database and write the supply chain event data or a hash of the supply chain event data onto a distributed ledger so that it can be shared with a multitude of parties involved directly or indirectly in the operation and execution of the supply chain transaction. For the purposes of describing the present invention, reference to "supply chain event data" will simply referred to as "event data" and reference to "supply chain events" will simply be referred to as "events" unless explicitly stated otherwise.

A majority of event data that is generated by or related to the operation and execution of supply chain processes may occur in the field of transportation, logistics or material movement. However, the present invention is not limited to the field of transportation, logistics or material movement and may apply equally to other fields in which events occur and event data may be generated including, but not limited to, warehouse operations, cross-dock operations, manufacturing and assembly operations, pick, pack and ship operations, quality inspection operations, testing or lab operations, retail operations, operations concerned with movement of human beings or personnel, agricultural operations, construction operations, refinery operations, mining and drilling operations, hospital operations, restaurant operations, food truck operations, catering operations, hotel operations, cruise ship operations, hospitality operations, theme park operations, airport operations, seaport operations, rail yard operations, switching yard operations, train station operations, subway station operations, bus terminal operations, waste management operations, maintenance or repair operations, installation operations, passenger travel operations, defense and military operations, law enforcement operations, document management operations, public or private event operations, concert operations, sporting event operations, motor or animal racing operations, museum operations, or pop-up store operations. Operations during which event data is captured include, but are not limited to, private, non-profit, commercial, government, non-government organization or military operations.

Event data may be captured during the use of supply chain assets such as vehicles or material handling equipment which may include, but are not limited to, heavy trucks, light trucks, trailers, tankers, self-driving trailers, containers, self-driving containers, tanker trucks, delivery vans, step vans, maintenance vans, repair vans, installation vans, pickup trucks, tractors, agricultural vehicles, agricultural machines, lawn mowers, golf carts, container moving equipment, trailer moving equipment, robotic movers, cranes, construction equipment, drilling and mining equipment, oil and gas exploration equipment, forklifts, pallet jacks, robotic storage shelves, material pickers, busses, locomotives, rail cars, switching engines, specialty railroad equipment, passenger trains, commuter trains, subway trains, law enforcement vehicles, fire trucks, ambulances, first responder vehicles, passenger vehicles, taxis, ride sharing vehicles, airplanes, helicopters, drones, airborne passenger transport vehicles, motorcycles, scooters, boards, bicycles, boats, barges, container ships, tanker ships, cruise ships, sail boats, yachts, ferries, catamarans, personnel moving ships, landing crafts, hovercrafts, tug boats, or speed boats.

Event data may be captured by means of a manual user entry or by means of an event data capture device or computer that can partially or fully capture event data automatically. Devices or computers that rely on either manual, automated, or partially manual and partially automated capture of event data include, but not limited to, a smart watch, a wearable device, a medical or biometric device, a sensor or actuator, an Internet of Things device, a phone, a pager or other wireless device, a barcode reader, a handheld RFID device, a stationary RFID device, an RTLS device, a BLE device, a GPS device, a lidar, a radar, a CPU, a GPU, a FPGA, a chip with an integrated circuit, an electronic logging device, a sensor, an actuator, a tablet computer, a desktop computer, a laptop computer, a data center computer, a data center server, an image capture device, a video capture device, a sound recording device, a device used for the operation of a supply chain asset, a device permanently attached to a supply chain asset, a device temporarily used during the operation of a supply chain asset, a device attached to a product or material, a device attached to a pallet or packaging, a device mounted to a building, a device positioned along a road, a public or private website, a public or private database, a device controlled by a third party, a computer controlled by a third-party, a computer controlled by a third party involved in or affected by the operation of a supply chain transaction, a satellite, a surveillance camera, or a drone. A computer may be located locally or remotely including, but not limited to, in a data center or a computer cloud. Computers may communicate with one another through one of several means including, but not limited to, a connection using a wire or cable, a wireless connection using nearfield technologies, a wireless connection using cellular or satellite wireless networks, a wireless connection using proprietary wireless networks or a connection in which data is downloaded manually or automatically from one computer and then uploaded manually or automatically to another computer. In some embodiments of the present invention, the above devices or computers may only capture event data. In other embodiments of the present invention, a device or computer may format, process, analyze, share, or store event data as well.

Event data may be captured in formats including, but not limited to, textual, numerical, still image, video, graphical, abstracted, abbreviated, proprietary, or audible form. Event data may be obtained by way of collection mechanisms including, but not limited to, means employed by any device or computer listed above, manual or automated user entry or selection, automated software entry or selection, third-party systems by way of an interface, direct or indirect measurement, a trigger by another computer, or observation. Event data may further be obtained through means including, but not limited to, data previously stored on any device or computer listed above, data previously stored on any computer described in the present invention disclosure, manual or previously stored data entered by users, manual or previously stored user selections, rule-based or otherwise automated software inputs, data from artificial intelligence computers, data from other computers used in the capture of events, data from computers comprising a distributed ledger, data from publicly available sources, data from private sources, or data from documents including, but not limited to, instructions for handling of a business process, instructions for handling of materials, instructions for operating an asset, instructions for operating a machine, user manuals, certificates, warranties, or other documents related to the operation and execution of a supply chain process. Examples of events and event data are listed further below.

In some embodiments of the present invention, events may be captured by devices or computers that are temporarily attached to a supply chain asset or material. Examples of temporary devices or computers may include, but are not limited to, wireless sensors to measure conditions such as shock, acceleration, deceleration, temperature, humidity or physical location. Other temporary devices may include, but are not limited to, RFID tag readers, barcode readers, BLE devices or other wireless devices that allow for the identification of items through the scan of a barcode or electronic tag. A temporary device or computer may be attached to materials being transported, to packaging materials, or to a supply chain asset. A temporary device or computer may communicate with any other computer described in the present invention in a multitude of ways including, but not limited to, wirelessly, through a cable, or through other mechanisms to upload or download event data. Temporary devices may be used frequently in some embodiments of the present invention, especially when autonomous vehicles may be used for a multitude of purposes or for a multitude of people or freight movements. The data generated by temporary devices may be available immediately, or it may only become available after a period of time has passed.

In some embodiments of the present invention, event data may be captured and processed by external systems that are not directly controlled by parties who are directly involved in a supply chain process or transaction including, but not limited to, a security camera, a warehouse camera, a camera mounted on a material moving asset such as a pallet jack or forklift, a camera mounted on another supply chain asset, an RFID reader, or a variety of sensors. For example, a camera mounted to the outside of the loading dock of an adjacent facility to a pick-up location may capture the license plate of a supply chain asset to identify the supply chain asset and then send an alert to the system described in the present invention so that all parties involved in the transaction may be notified that the supply chain asset has arrived at the pick-up location loading dock.

Events that occur during a supply chain transaction and the resulting event data include, but are not limited to, a date, a time, a physical location, a supply chain asset identifier, a supply chain asset owner identifier, a supply chain asset operator identifier, a device identifier, a computer identifier, a material identifier, a freight identifier, a warehouse identifier, a cross-dock identifier, a yard identifier, a storage location identifier, a facility identifier, a manufacturing plant identifier, a depot identifier, a retail location identifier, a home base identifier, a repair location identifier, a plan or planning identifier, a user name or user identifier, a password, a temporary password, a cryptographic public key, a cryptographic private key, a hash, a third-party operator identifier, a location identifier, a device identifier, a customer identifier, a retailer identifier, a wholesaler identifier, a distributer identifier, a shipper identifier, a carrier identifier, a case identifier, a process identifier, an origin location identifier, a midway point identifier, a destination identifier, a route identifier, a tracking identifier, an identifier designated by a third-party system, a traffic condition, a road condition, a road hazard, road construction, a type of road, a light condition, an atmospheric condition, a facility condition, a location of a supply chain asset, an origin location, a destination location, a location along a route, an alert about an exception condition, a travel time, a dwell time, a delay, an accident, an estimated departure time, an estimated arrival time, a loading capacity, weight of loaded freight on a supply chain asset, a hazardous material classification, instructions for handling of a hazardous material, a weather condition, a temperature condition, a barometric condition, measurement of a shock, measurement of an impact, an operating condition, a breakdown, a need for repair, a need for maintenance, an application of brakes, an application of acceleration, an obstacle, a breakdown in wireless communication, establishment of wireless communication, one or more results of actions taken by an operator, establishment of a route, a change in a route, a sensor reading, an image capture, a satellite image, a video, a purchase order, a sales order, a transportation order, a shipping order, a packing list, a bill of materials, a delivery note, a waybill, an air waybill, a bill of lading, a CMR document, a multimodal bill of lading, a cargo insurance certificate, a commercial invoice, an international commercial invoice, an international proforma invoice, an international purchase order, a general conditions of international sale document, an ATA carnet, a carnet, a certificate of origin, a certificate of inspection, a certificate of analysis, a phytosanitary document, a kosher certificate, a halal certificate, a manifest, a transport order, presence of a material, absence of a material, presence of an operator or passenger, absence of an operator or passenger, a change in freight, absence of a change in freight, a payment receipt, absence of a payment receipt, loading of freight, time to load freight, securing of freight, capture of an image of freight, dwell time at a warehouse or dock, charges for excessive dwell time at a warehouse or dock, staging of freight prior to loading, absence of freight staging prior to loading, availability of human operators during loading, a freight condition at origin, presence of freight securing devices at origin, absence of freight securing devices at origin, handling instructions for freight securing, freight pickup completion, a freight condition at points along a route, duration of a transport transaction, a delay in freight delivery, damages to freight during shipment, proximity to a destination, distance from a destination, time to reach a destination, sequence of multi-stop deliveries, closeness of multi-stop delivery points, freight shipment completion, freight condition at destination, dwell time at destination, unloading of freight, time to unload freight at a destination, condition of freight securing devices at destination, freight drop-off completion, a freight theft, a freight damage, availability of human operators during unloading, results of quality inspections, time to return to an origin location, time to return to a home base location, time to a second pick-up location, distance to a second pick-up location, time to a second drop-off location, distance to a second drop-off location, condition of a manufacturing asset, condition of a freight moving or supply chain asset, an inventory identifier, an inventory location identifier, availability of a material in inventory, an inventory location, an inventory dwell time, a container location, a container dwell time, a trailer location, a trailer dwell time, a FIFO sequence, a LIFO sequence, a restocking sequence, a restocking signal or alert, a quality inspection result, a quality inspection trigger, a staging location, a staging process completion signal, a staging process incomplete signal, a human operator availability during freight staging, a process operator identifier, operator certifications and permits, supply chain asset permits, a hazardous material permit, a hazardous material certification for an operator, material inventory on a supply chain asset, tool availability on a supply chain asset, parts or tools inventory at an installation or maintenance location, proximity to an installation or maintenance point, distance from an installation or maintenance location, time to reach an installation or maintenance location, time to return to a depot or base location, sequence of multi-stop installation or maintenance operations, dwell time at an installation or maintenance location, closeness of multi-stop installation or maintenance locations, a physical storage location of materials, a condition of a manufacturing asset, demand for materials in specific markets and geographies, availability of materials in geographic locations, price of a material, public holidays, employee vacation, employee sickness, employee absence, employee licenses and certifications, employee health status, a certificate to operate supply chain asset, a drivers license, financial payments, receipts of financial payments, terms of payment, payment delays, immediate payments, discounts and bonuses, motivational incentives, points to complete a process, transaction, activity or task, availability of other contractual agreements, a fuel condition, an energy condition, availability of fuel or energy, location of a refueling or charging point, a regulatory mandate, a law or ordinance, completion of a process, non-completion of a process, availability of documents relevant to the operation of a supply chain transaction, availability of computers storing documents relevant to the operation of a supply chain transaction, or availability of human or machine operators monitoring the operation of a supply chain transaction. Some events and event data are the result of processes performed by supply chain assets or operators engaged during the operation and execution of a supply chain transaction while other events and event data are external occurrences and out of the control of a human or machine operator, a business or a third party. The absence of an event completion including, but not limited to, unfinished data inputs, disrupted data inputs, incorrect data inputs, or missing data inputs may be considered event data in its own right for the purposes of the present invention disclosure.

The capture, monitoring, documentation and sharing of event data is an important part of the present invention. When exceptions from expected values of event data occur, any computer shown in the present invention disclosure may create and send an alert about an exception condition to any other computer or to users of external computers. Exception alerts may be treated as event data for the purposes of the present invention disclosure and they may be written to a distributed ledger in the same way as any other event data. Further applying the principle, when any computer shown in the present invention disclosure determines that a different course of action from an initial course of action may be necessary, it may create and send an alert about a change in the course of action to any other computer or to users of external computers. Alerts on a change in a course of action may be treated as event data for the purposes of the present invention disclosure and they may be written to a distributed ledger in the same way as any other event data.

Materials or freight may include, but are not limited to, raw materials, parts, consumables, work-in-progress materials, manufacturing assets, packaging, freight securing devices, pallets or crates, containers, written documents such as manuals or instructions, or finished goods or products. Materials may have a physical form generally as a gas, liquid or solid or they may not have a physical form including, but not limited to software or data.

Supply chain assets and devices that capture, format and process event data may be used in a variety of supply chain operations. A supply chain operation is a process, or transaction, which comprises a series of activities or tasks comprising of people, machines, materials, skills, and knowledge to achieve an aim or objective. For the purposes of the present invention disclosure, we refer to a process as a class of transactions, for example "loading of freight" or "unloading of freight," and to transactions as an instance of a process, for example the "loading of freight on a given day in a specific location". A process may comprise of many transactions and many transactions may all be instances of a single process. Supply chain processes or transactions generate events and event data or are affected by events and event data. For example, the outcome of a process, transaction, activity or task is one or more event or event data. Often, an event resulting from activities performed in one process or transaction serves as a basis for how activities in another process or transaction are performed. A simple example may be that when a material pickup by a truck is delayed at the material origin, the likelihood of a delay in the material delivery at a destination increases greatly.

A business process may comprise a multitude of events that may occur in a sequence or in parallel. Events comprise of the occurrence of a state and are documented through event data. When an event occurs, the resulting event data is captured by one or more devices or computers. An important aspect of how a business process and an event are related to one another is that a business process typically begins with an event and ends with an event. For example, a shipper may have freight that needs to be moved. The shipper will determine a route, a day and time, availability of a supply chain asset, etc. in order to begin the process of transporting the freight. The initial steps of setting up a plan are considered a course of action within the present invention disclosure. The first event and resulting event data in this process may be to set a course of action including, but not limited to, determining a pickup time, determining a drop off time, determining a transit time, determining a loading time, identifying special handling instructions, and so on. This course of action is then communicated to other participants in the transaction so that they can plan how to operate later business processes. At different stages during the operation of a supply chain process, events and event data may be used to monitor whether the course of action is still attainable or whether a change in the course of action is necessary. Delays of a supply chain asset for example due to problems in loading, traffic or extreme weather conditions, delays during unloading, etc. may lead to a change in the initial course of action.

A supply chain is a series of processes comprising of people, machines, materials, skills, and knowledge that transform one or more raw materials into one or more finished products. For example, supply chain processes include, but are not limited to, inbound transportation of materials, manufacturing, warehousing, outbound shipping, placement of product in customer locations, maintenance sites or installation sites, maintenance of materials after installation and also the return of products from customers back to retailers, distributors, wholesalers, or manufacturers. Further examples of supply chain processes include, but are not limited to, loading of materials onto supply chain assets, storing of materials, counting and inspecting materials, counting materials in storage, quality inspections, repair or replacement of defective materials, replenishment of missing materials, exchange of older materials for newer ones, taking of materials out of storage, audits, collection of metrics regarding cost, time, quality, quantity or other attributes of processes or materials, planning of manufacturing processes, marketing and sales promotions, advertising, sponsorship or social media campaigns, employee training and education, labor disputes or strikes, or unloading of materials at a destination.

In some embodiments of the present invention, the operation and execution of a supply chain process documented through the capture, processing, formatting, analysis, monitoring, decision-making, sharing, or storing of event data may yield metrics describing the performance of a supply chain asset, an operator, a party directly involved in the operation and execution of a supply chain process, a party not directly involved in the operation and execution of a supply chain process, or other aspects of the supply chain process itself. Metrics may serve as a basis for operation decision-making by human or machine operators of any of the computers described in the present invention. Metrics may be displayed to human or machine operators by formats including, but not limited to, textual, numerical, abstracted, abbreviated, compressed, or graphical form. Examples of metrics include, but are not limited to, operator work hours, drive times, dwell times, supply chain asset utilization, warehouse efficiency, depot efficiency, retail location efficiency, fuel efficiency, route efficiency, travel time, toll charges, fee charges, insurance premiums, accident conditions, insurance payments, freight per customer metrics, freight per mile metrics, cost per mile metrics, weather influences on supply chain assets, efficiency by freight type, efficiency by trailer type, efficiency by process, efficiency by transport type, efficiency by distance to destination, efficiency in less-than-truckload operations, efficiency in last mile operations, efficiency in sea port deliveries and pickups, efficiency in airport deliveries and pickups, efficiency in parcel delivery, maintenance and repair efficiency, or the efficiency of a system to store event data on a distributed ledger. Any computer discussed in the present invention disclosure may collect, process, share or use metrics as described above.

In some embodiments of the present invention external data sources are used to obtain data that adds meaning during the interpretation and analysis of event data. External data sources may include, but are not limited to, an enterprise resource planning system, a customer data system, a supplier system, a business partner system, a transportation management system, a route management system, a freight forwarding system, a freight brokerage system, a warehouse management system, a global trade management system, a financial system, a banking system, a credit card processing system, an online sales system, a sales support system, a customer relationship management system, a supplier relationship management system, a human resource management system, a time and attendance system, an online database, a system containing publicly available data, a system containing private data, a system containing military data, or a system containing government data.

In some embodiments of the present invention, a supply chain asset may be an autonomous vehicle or autonomous material movement equipment. An autonomous supply chain asset may operate fully autonomously, partially autonomously or fully manually with a human operator. One or more autonomous supply chain assets may be locally or remotely monitored by a human or machine operator.

A distributed ledger including, but not limited to, a Blockchain or Hashgraph, may be public or private. A permissioned distributed ledger is generally a type of a private distributed ledger. A permissioned distributed ledger may be a type of public distributed ledger, if permission to access is granted universally. A distributed ledger may have one or more nodes in a network of nodes. In some embodiments of the present invention, it is conceivable that a private distributed ledger may only have one node. A distributed ledger may reside on one or more computers. A node of a distributed ledger may reside on one or more computers. A computer may host one or more distributed ledgers. A distributed ledger may reside on any of the computers discussed in this invention disclosure.

Referring to FIG. 1, event data may be described by one of three types. Classification 100 comprises three types of event data and a practical example. Raw event data (101) is captured by a device or computer and enhanced through attributes, which may be raw event data in its own right and provide additional context, into processed event data (102) while either raw or processed event data may be aggregated into meta event data (103) for the purposes of analysis and deeper understanding. In some embodiments of the present invention, event data may remain in its raw form and may not be processed further before being sent from or to any computer described in the present invention disclosure.

In some embodiments of the present invention, raw event data (101) and attributes may be obtained from a computer not directly used in the operation and execution of a supply chain process. Some sources of raw event data (101), for example when it originates from computers operated by parties including, but not limited to, shippers, forwarders, brokers, third-part logistics providers, or carriers, may send more than one raw event data (101) element in a computer file. An example of a computer file or document that may contain more than one raw event data (101) element is a bill of lading (BOL), which may be comprised of data about a shipper, data about one or more materials being transported, specific instructions for transport handling, or data about the destination or recipient of the materials.

When raw event data (101) is captured by a device, it may not always provide enough information to enable decision-making about maintaining or changing a course of action. For example, the capture of location coordinates for a supply chain asset is not sufficient to draw meaningful conclusions about its current situation or the operators' ability to deliver the freight on time. Location coordinates provide a latitude and longitude, time stamp and speed. It is only when further attributes in the form of additional raw event data (101) are applied that the resulting processed event data (102) becomes valuable. In the example, useful attributes include a distance to the destination, an estimated arrival time, typical traffic and road conditions on the route ahead or work hour restrictions of the supply chain asset operator.

Another example may be the observation of a loading process to load materials onto a trailer of a supply chain asset by means of a camera mounted in the loading space of a trailer or inside of a warehouse facility. The observation of the loading process is a raw event (101), which includes data about how many pallets or packages have been loaded, whether the freight was properly secured, or that pallets were not double-stacked when it is not desirable. However, the video file itself, which is raw event data (101) is still of little value until it is combined with attributes that describe the supply chain asset itself, its current process and purpose, its current location, a shipping order, a bill of lading, etc. The addition of attributes to the raw event data (101) captured by a video camera transforms it into processed event data (102), which in this example allows local or remote human or machine operators to verify that the loading operation has been completed successfully or, conversely, that it has not been handled properly.

As described, an important aspect of managing events in supply chain processes is that raw event data (101) often needs to be enriched through one or more attribute, providing additional data, before it becomes valuable to users. Raw event data (101) may be enriched through the addition of attributes, which may be raw event data in its own right or other data relevant to the operation and execution of supply chain processes, into processed event data (102). Processed event data (102) may contain one or more raw event data element and one or more attribute. Attributes allow for the transformation of raw event data (101) into processed event data (102) and may come from a multitude of computers including, but not limited to, previously stored raw event data (101), previously stored processed event data (102), previously stored meta event data (103), data already residing on the computer that handles the transformation of raw event data (101) into processed event data (102), another instance of a computer capturing raw event data (101), another instance of a computer transforming raw event data (101) into processed event data (102), any computer discussed in this invention disclosure, or they may come from a variety of external data sources listed above.

A multitude of raw or processed event data elements that have the same or similar characteristics may be combined into meta event data (103), which describes commonalities or patterns that may exist within a multitude of raw or processed event data elements. Meta event data allows the identification of similarities or differences within a multitude of raw or processed event data elements as well as the identification of patterns, especially when raw event data and attributes are compared in processed event data. In some embodiments of the present invention, event data that may not have the same or similar characteristics may also be combined into meta event data (103) to gain a deeper understanding.

A practical example of processing a multitude of raw event data (101) or processed event data (102) into one or more meta event data (103) elements may be that a multitude of supply chain assets might undertake a transport from point A to point B passing through a multitude of traffic situations. In this example, it is conceivable that the travel times between points A and B ranged from two hours to four hours. By analyzing a multitude of processed event data (102) each describing specific instances of the travel from A to B, it may be possible to deduce that travel times are shorter on certain days and longer on others, that specific start times led to faster travel than others or that local sporting events or local temperatures had an effect on travel time. In this example, the resulting meta event data (103) may outline all of these factors or specific recommendations to allow local or remote human or machine operators to determine on which days and at which times they might operate a supply chain asset for the movement of freight or passengers. Another practical example may be that several supply chain assets may have picked up a specific type of material as freight from a multitude of manufacturers of the material. By comparing and analyzing dwell times at a loading dock in each specific instance, it may be possible to deduce average loading times by manufacturer, which in turn may be used for the calculation of overall process times from the pickup to the delivery of freight for future supply chain asset operations.

Referring to FIG. 17, a block diagram with practical example comprising a flow for the conversion of raw data into processed data is shown. Diagram 1700 comprises of seven steps to obtain raw event data (101) and additional attributes to create a processed event (102) based on an analysis. A supply chain asset that carries temperature sensitive materials on a refrigerated trailer may be equipped with a temperature sensor that sends regular updates to a computer so that they can be analyzed (1701). The computer receives the temperature measurement and also a supply chain asset identification number, which constitutes raw event data (101, 1702). Based on the asset identification, the computer can locate a document that contains information about acceptable temperature ranges in its storage, which is raw event data (101) as well and serves as an attribute for the purposes of the analysis (1703). The computer compares the temperature measurement, for example 43 F, to a range of acceptable values, for example 36-41 F (1704). The result of the analysis is processed event data (102), which, in this example, means that the materials are not being transported within an acceptable temperature range (1705). Based on using raw event data (101) to derive processed event data (102), the computer sends the results of the analysis to the operator of the supply chain asset (1706) to affect a course of action. The supply chain asset operator can stop and adjust the temperature of the trailer to bring it back into the acceptable range (1707).

Referring to FIG. 2, different types of event data may be stored in different ways on different types of distributed ledgers. Classification 200 comprises of three types of event data (207; 208-210) also described in classification 100, two generic formats in which event data (201, 202-203) may be stored on a distributed ledger and two generic types of distributed ledger (204; 205-206). Raw event data (101, 208), processed event data (102, 209), meta event data (103, 210), one or more attributes, results of an analysis, decisions, or other data relevant to the operation and execution of a supply chain process will be referred to as "data" for the purposes of the following description of FIG. 2.

Data itself may also be written to a distributed ledger (204; 205-206) in the form of a hash (202) or in its original format (203). When data is stored on a distributed ledger in hashed form (202), a computer applies a hash function to create a hash, or mathematical abstraction, of the original data. This is important to prove at later points in time that the original data has not been changed or altered by a user of a computer system or by the computer system itself. When this proof may be required at a later point in time, a user may create a hash of the original data available in a computer system and compare it to a hash written to a distributed ledger at the time the hash was added. If the first and second hashes do not match, a user knows that the data has been altered or compromised. When data is stored on a distributed ledger in its original form, data formats include, but are not limited to, in complete and unaltered form, in formatted form, in abstracted form, in abbreviated form, in compressed form, or in encrypted form.

A practical example of hashed and whole data is a bill of lading document. In its original form, the document contains data such as origin and destination locations, information about materials that are being shipped and other details that describe a shipment transaction. The document itself is the original data in that anyone can read and understand its contents. When a hash algorithm is applied, the contents of the document are represented by a string of characters. A person or computer that analyzes the original data can derive meaning from it while this is not possible when the same person or computer analyzes a hash, which is just an abstract string of characters. For example, if the sentence "Today is a warm and pleasant day." is converted into a hash using an MD5 algorithm, the resulting hash is "2f7fee349875d8c1bb5c8208442ac869". If the sentence is slightly changed, the hash value also changes, which makes it possible to prove that whole data inside of a document has changed. For example, if the sentence changes to "Today is a cold and pleasant day" the hash value changes to "d520159c7 dee6699334c755fc17b5fe1" using the same algorithm.

As shown in FIG. 2, data may be stored on a private distributed ledger (206), or a public distributed ledger (205). Not shown in FIG. 2, data may be stored on a hybrid form of private-public distributed ledger, on two or more private distributed ledgers, on two or more public distributed ledgers, on one or more private and one or more public distributed ledgers, or on two or more distributed ledgers comprising different distributed ledger technologies or platforms. Different distributed ledger technologies or platforms may include, but are not limited to, Bitcoin Blockchain technology, Ethereum Blockchain technology, or Hashgraph technology.

Further not shown in FIG. 2, whole data (203) may be split into two or more parts before each part is hashed separately and then stored on one, two or more distributed ledgers. Further applying the principle, whole data (203) may be first hashed where the resulting hash (202) may then be split into two or more parts to be stored on one, two or more distributed ledgers. Two or more hashes of split whole data (203) or two or more parts of a spilt hash (202) may be stored on two or more private distributed ledgers, on two or more public distributed ledgers, on two or more hybrid distributed ledgers, one or more private and one or more public distributed ledgers, one or more private and one or more hybrid distributed ledgers, one or more hybrid and one or more public distributed ledgers, or one two or more distributed ledgers based on different distributed ledger technologies or platforms.

Referring to FIG. 25, a block diagram with a practical example for linking data blocks on a distributed ledger using hashes is shown. Block Diagram 2500 comprises of six elements to illustrate how blocks form a chain on a distributed ledger. The first block (2501) shows a first block in a distributed ledger that is often called a genesis block. Data elements 1.1 to 1.n have been written to the first block. The first block (2501) as the first block does not contain a hash since no previous blocks exist. When no further data is written to first block (2501, a hash of all data (2502) is created. The hash representing the data content of the first block (2501) is written to the second block (2503) and new data elements 2.1. to 2.n are added to the second block (2503) until it has been completed. Then a hash of the data (2504) contained in the second block (2503) is created. The hash representing the second block (2504) is written to a third block (2505) and new data elements 3.1. to 3.n are added to the third block (2505) until it has been completed. Then a hash of the data (2506) contained in the third block (2505) is created. This process continues for all future blocks on the distributed ledger.

Referring to FIG. 3, one embodiment of the present invention comprising a distributed ledger for supply chain event data is shown. System 300 comprises of seven computers used in the capture, formatting, processing, analysis, monitoring, decision-making, hashing, sharing and storing of event data on a distributed ledger. Event data may be captured on a first computer (301), then being sent to a second computer (302) for processing, then being sent to a third computer (303) for analysis and decision-making, then being sent to a fourth computer (304) for storage, then being sent to a sixth computer (319) comprising a distributed ledger for storage and connecting to a network of nodes on a distributed ledger (325), a fifth computer (305) for monitoring other computers, and in some embodiments of the present invention for decision-making, and a seventh computer (315) to access data on external systems (323). Data residing on an external system may include, but is not limited to, raw event data (101), processed event data (102) or meta event data (103), one or more attributes, or other data relevant to the operation and execution of a supply chain process. System 300 comprises of seven computers that all receive and send data to one another about the operation and execution of a supply chain process.

Sharing of event data between two or more of the computers in system 300 occurs by means of communication. Data formats used in communication may include, but are not limited to, native, proprietary, textual, numerical, image, video, audio, abbreviation, abstraction, compression, hash, or encrypted form. Event data may be sent from one computer to any other computer in the format in which it was captured or received, or in a different format from the one in which it was captured or received. Communication between two or more computers in System 300 may be unsecured or secured. Secured communication may include, but is not limited to, the use of authentication of users prior to the display of event data, the use of encryption of event data during the sending and receiving of event data, the use of private and public keys, the use of secure socket layers, or the use of a virtual private network. User authentication mechanisms may include, but are not limited to, a user name, a password, a fingerprint, a retina scan, a facial image recognition, a voice recognition, a user location, a DNA marker, other biometric factors such as gait, other hardware devices, or any combination thereof. For example, the use of private and public keys allows for the authentication of users who create and share event data in that only one party possesses a private key and can encrypt event data with it while a multitude of parties may be able to decrypt the event data using a freely available corresponding public key. In some embodiments of the present invention, public keys may be stored on a distributed ledger.

In one embodiment of the present invention, any computer shown in system 300 may handle raw event data (101), processed event data (102), meta event data (103), one or more results of analysis, one or more decisions, one or more attributes, one or more hashes, or other data relevant to the operation and execution of a supply chain process in its original, whole form. In another embodiment of the present invention, any computer shown in system 300 may handle raw event data (101), processed event data (102), meta event data (103), one or more results of analysis, one or more decisions, one or more attributes, one or more hashes, or other data relevant to the operation and execution of a supply chain process in abbreviated, abstracted, compressed, or encrypted form. In another embodiment of the present invention, any computer in System 300 may create and share a hash, using a hashing function, of raw event data (101), processed event data (102), meta event data (103), one or more results of analysis, one or more decisions, one or more attributes, one or more other hashes, or other data relevant to the operation and execution of a supply chain process.

In some embodiments of the present invention, any computer shown in system 300 may request and initiate the capture of raw event data (101), the creation of processed event data (102) or meta event data (103), the creation of a hash, the analysis of event data, the making of a decision, the monitoring of event data, the storage of event data, or the sharing of event data from any other computer shown in system 300.

In some embodiments of the present invention, any computer in System 300 may receive a request for a first computer to capture raw event data, which it then sends to a first computer (301), from any other computer in System 300 with the exception of a first computer (301).

In some embodiments of the present invention, any computer in System 300 may store and maintain previous raw event data (101), previous processed event data (102), previous meta event data (103), previous attributes, results from a previous analysis, previous decisions, previous hashes, or previously received other data relevant to the operation and execution of a supply chain process.

In some embodiments of the present invention, any computer in System 300 may transform a multitude of raw event data (101), processed event data (102), meta event data (103), a multitude of attributes, a multitude of results from analysis, a multitude of decisions, a multitude of hashes, or a multitude of other data relevant to the operation and execution of a supply chain process into meta event data (103) as described in Classification 100.

In some embodiments of the present invention, any computer in System 300 may only receive raw event data (101) without attributes from any other computer in System 300. In some embodiments of the present invention, any computer in System 300 may only send a raw event (101) without further processing, formatting, analysis, hashing, or decision-making to any other computer in System 300.

In some embodiments of the present invention, any computer in System 300 may request permission to capture, format, process, analyze, monitor, hash, share or store raw event data (101), processed event data (102), meta event data (103), one or more results of analysis, one or more decisions, one or more attributes, one or more hashes, or other data relevant to the operation and execution of a supply chain process from any other computer in System 300.

In some embodiments of the present invention, it may be necessary for any computer in System 300 to request additional raw event data (101), additional processed event data (102), additional meta event data (103), one or more additional attributes, one or more additional hashes, or other additional data relevant to the operation and execution of a supply chain process from any other computer in System 300.

In some embodiments of the present invention, any computer in System 300 may serve as a basis for operational decision-making by generating, analyzing or using performance metrics as described above.

In some embodiments of the present invention, any computer in System 300 may display event data in graphical form, numerical or textual form, on a map, or as a performance metric to a user.

In some embodiments of the present invention, any computer in System 300 may be located on a supply chain asset to allow a human or machine operator access to the respective system or systems before, during, or after the operation and execution of a supply chain process on the supply chain asset itself.

In some embodiments of the present invention, any computer shown in system 300 may request, capture, format, process, monitor, hash, share, or store event data that may not necessarily be required during the current operation of a supply chain process, but may or may not be needed at a later point in time.

A first computer (301) captures raw event data (101) and may store and retrieve processed event data (102), meta event data (103), one or more results of analysis, one or more decisions, one or more attributes, one or more hashes, or other data relevant to the operation and execution of a supply chain process.

In one embodiment of the present invention, a first computer (301) may capture event data based on a precondition being met including, but not limited to, a process initiating, a process occurring, or a process completing. In another embodiment of the present invention, a first computer (301) may capture event data based on a user instruction or command, or a software trigger. In another embodiment of the present invention, a first computer (301) may capture event data based on an instruction received from any other system described in system 300. In another embodiment of the present invention, a first computer (301) may capture event data based on a pre-programmed condition including, but not limited to, a deviation from expected values or a deviation from a range of acceptable values. In another embodiment of the present invention, a first computer (301) may capture event data based on points in time, including, but not limited to, capturing of event data at regular intervals (i.e., every x minutes), at a given hour, or once, twice, thrice, etc. per day. In another embodiment of the present invention, a first computer (301) may be programmed to capture event data randomly. In another embodiment of the present invention, a first computer (301) may receive an instruction to capture event data from another instance of a first computer, from another instance of a second computer, from another instance of a third computer, from another instance of a fourth computer, from another instance of a fifth computer, from another instance of a sixth computer comprising a distributed ledger, or from another instance of a seventh computer to access external data.

A first computer (301) may capture raw event data (101) and send it to a second computer (302) by means of communication (306), to a third computer (303) by means of communication (309), a fifth computer (305) by means of communication (311), or a seventh computer (315) to access external data by means of communication (318). Not shown in System 300, a first computer (301) may capture raw event data (101) and send it to another instance of a first computer, a fourth computer (304), or a sixth computer (319) comprising a distributed ledger by means of communication.

A first computer (301) may receive raw event data (101), processed event data (102), meta event data (103), one or more results of analysis, one or more decision, one or more attributes, one or more hashes, or other data relevant to the operation and execution of a supply chain process from a second computer (302) by means of communication (306), to a third computer (303) by means of communication (309), a fifth computer (305) by means of communication (311), or a seventh computer (315) to access external data by means of communication (318). Not shown in System 300, a first computer (301) may receive raw event data (101), processed event data (102), meta event data (103), one or more results of analysis, one or more decision, one or more attributes, one or more hashes, or other data relevant to the operation and execution of a supply chain process from another instance of a first computer, a fourth computer (304), or a sixth computer (319) comprising a distributed ledger by means of communication.

A first computer (301) may send processed event data (102), meta event data (103), one or more results of analysis, one or more decision, one or more attributes, one or more hashes, or other data relevant to the operation and execution of a supply chain process to a second computer (302) by means of communication (306), to a third computer (303) by means of communication (309), a fifth computer (305) by means of communication (311), or a seventh computer (315) to access external data by means of communication (318). Not shown in System 300, a first computer (301) may send processed event data (102), meta event data (103), one or more results of analysis, one or more decision, one or more attributes, one or more hashes, or other data relevant to the operation and execution of a supply chain process to another instance of a first computer, a fourth computer (304), or a sixth computer (319) comprising a distributed ledger by means of communication.

A second computer (302) processes raw event data (101), previous raw event data, processed event data (102), previous processed event data, meta event data (103), previous meta event data, results from a previous analysis, previous decisions, one or more attributes, one or more hashes, or other data relevant to the operation and execution of a supply chain process as described in Classification 100.

A second computer (302) may receive raw event data (101), processed event data (102), meta event data (103), one or more results of analysis, one or more decision, one or more attributes, one or more hashes, or other data relevant to the operation and execution of a supply chain process from a first computer (301) by means of communication (306), a third computer (303) by means of communication (307), a fourth computer (304) by means of communication (310), a fifth computer (305) by means of communication (312), or a seventh computer (315) to access external data by means of communication (317). Not shown in System 300, a second computer (302) may receive raw event data (101), processed event data (102), meta event data (103), one or more results of analysis, one or more decision, one or more attributes, one or more hashes, or other data relevant to the operation and execution of a supply chain process from another instance of a second computer, or a sixth computer (319) comprising a distributed ledger by means of communication.

A second computer (302) may send raw event data (101), processed event data (102), meta event data (103), one or more results of analysis, one or more decision, one or more attributes, one or more hashes, or other data relevant to the operation and execution of a supply chain process to a first computer (301) by means of communication (306), a third computer (303) by means of communication (307), a fourth computer (304) by means of communication (310), a fifth computer (305) by means of communication (312), or a seventh computer (315) to access external data by means of communication (317). Not shown in System 300, a second computer (302) may send raw event data (101), processed event data (102), meta event data (103), one or more results of analysis, one or more decision, one or more attributes, one or more hashes, or other data relevant to the operation and execution of a supply chain process to another instance of a second computer, or a sixth computer (319) comprising a distributed ledger by means of communication.

A third computer (303) analyzes raw event data (101), processed event data (102), meta event data (103), one or more attributes, previous results of analysis, previous decisions, one or more hashes, or other data relevant to the operation and execution of a supply chain process in order to decide on a course of action comprising no change, postponement of a decision or a different course of action.

In one embodiment of the present invention, a third computer (303) may display the results of an analysis to a local or remote human or machine operator to obtain a decision on a course of action comprising no change, postponement of a decision or a different course of action. In another embodiment of the present invention, a third computer (303) may send the results of an analysis to a fifth computer (305) by means of communication (313) in order for a fifth computer (305) to display the results of an analysis to a local or remote human or machine operator who then decides on a course of action comprising no change, postponement of a decision or a different course of action. In another embodiment of the present invention, a third computer (303) may send the results of an analysis to a seventh computer (315) to access external data by means of communication (316) in order for a seventh computer (315) to display the results of an analysis to a local or remote human or machine operator of an external system who then decides on a course of action comprising no change, postponement of a decision or a different course of action. An external system may then send the decision to a seventh computer (315) by means of communication, which in turn may send it to any other computer in System 300.

A third computer (303) may receive raw event data (101), processed event data (102), meta event data (103), one or more results of analysis, one or more decision, one or more attributes, one or more hashes, or other data relevant to the operation and execution of a supply chain process from a first computer (301) by means of communication (309), a second computer (302) by means of communication (307), a fourth computer (304) by means of communication (308), a fifth computer (305) by means of communication (313), a sixth computer (319) comprising a distributed ledger by means of communication (321), or a seventh computer (315) to access external data by means of communication (316). Not shown in System 300, a third computer (303) may receive raw event data (101), processed event data (102), meta event data (103), one or more results of analysis, one or more decision, one or more attributes, one or more hashes, or other data relevant to the operation and execution of a supply chain process from another instance of a third computer by means of communication.

A third computer (302) may send raw event data (101), processed event data (102), meta event data (103), one or more results of analysis, one or more decision, one or more attributes, one or more hashes, or other data relevant to the operation and execution of a supply chain process to a first computer (301) by means of communication (309), a second computer (302) by means of communication (307), a fourth computer (304) by means of communication (308), a fifth computer (305) by means of communication (313), a sixth computer (319) comprising a distributed ledger by means of communication (321), or a seventh computer (315) to access external data by means of communication (316). Not shown in System 300, a third computer (303) may send raw event data (101), processed event data (102), meta event data (103), one or more results of analysis, one or more decision, one or more attributes, one or more hashes, or other data relevant to the operation and execution of a supply chain process to another instance of a third computer by means of communication.

A fourth computer (304) may store raw event data (101), processed event data (102), meta event data (103), one or more attributes, one or more results of analysis, one or more decisions, one or more hashes, or other data relevant to the operation and execution of a supply chain process. A fourth computer (304) may serve as a repository for previous data comprising of previous raw event data, previous processed event data, previous meta event data, previous attributes, previous results of analysis, previous decisions, previous hashes, or previously received other data relevant to the operation and execution of a supply chain process.

In some embodiments of the present invention, a fourth computer (304) may store raw event data (101), processed event data (102), meta event data (103), one or more attributes, one or more results of analysis, one or more decision, one or more hashes, or other data relevant to the operation and execution of a supply chain process on more than one instance of a fourth computer. In some embodiments of the present invention, a fourth computer (304) may store raw event data (101), processed event data (102), meta event data (103), one or more attributes, one or more results of analysis, one or more decision, one or more hashes, or other data relevant to the operation and execution of a supply chain process partially on a first instance of a fourth computer, partially on a second instance of a fourth computer, partially on a third instance of a fourth computer, and so on.

A fourth computer (304) may receive raw event data (101), processed event data (102), meta event data (103), one or more results of analysis, one or more decision, one or more attributes, one or more hashes, or other data relevant to the operation and execution of a supply chain process from a second computer (302) by means of communication (310), a third computer (303) by means of communication (308), a fifth computer (305) by means of communication (314), or a sixth computer (319) comprising a distributed ledger by means of communication (320). Not shown in System 300, a fourth computer (304) may receive raw event data (101), processed event data (102), meta event data (103), one or more results of analysis, one or more decision, one or more attributes, one or more hashes, or other data relevant to the operation and execution of a supply chain process from a first computer (301), another instance of a fourth computer, or a seventh computer (315) to access external data by means of communication.

A fourth computer (304) may send raw event data (101), processed event data (102), meta event data (103), one or more results of analysis, one or more decision, one or more attributes, one or more hashes, or other data relevant to the operation and execution of a supply chain process to a second computer (302) by means of communication (310), a third computer (303) by means of communication (308), a fifth computer (305) by means of communication (314), or a sixth computer (319) comprising a distributed ledger by means of communication (320). Not shown in System 300, a fourth computer (304) may send raw event data (101), processed event data (102), meta event data (103), one or more results of analysis, one or more decision, one or more attributes, one or more hashes, or other data relevant to the operation and execution of a supply chain process to a first computer (301), another instance of a fourth computer, or a seventh computer (315) to access external data by means of communication.

A fifth computer (305) monitors the operation and execution of a supply chain process either locally or remotely allowing a machine or human operator to assess the operation and, in some embodiments of the present invention, affect a course of action before, during or after the operation and execution of a supply chain process.

In some embodiments of the present invention, a fifth computer (305) may receive the results of an analysis from a third computer (303) or any other computer shown in System 300 in order to affect a course of action. Once a local or remote human or machine operator of a fifth computer (305) has determined a course of action comprising no change, postponement of a decision or a different course of action, a fifth computer (305) may send the resulting decision to any other computer shown in system 300. In some embodiments of the present invention, a fifth computer (305), operated by a local or remote human or machine operator, may receive results of an analysis or a decision from a third computer (303) or any other computer shown in System 300 in order to explicitly validate or explicitly confirm a proposed course of action comprising no change, postponement of a decision or a different course of action. One example may be that when a supply chain asset in a given location senses heavy rain, freezing temperatures, or a snow storm, its estimated time of arrival may change. Further, the estimated time of arrival of other supply chain assets that may pass through the same location shortly or soon may be changed to a later estimated time of arrival due to the anticipated slower travel speeds necessitated by severe weather conditions. Another practical example may be that a change in temperature outside of an acceptable range on a temperature-controlled trailer may lead to a request to stop a supply chain asset until a defective temperature control system can be repaired. In some embodiments of the present invention, a fifth computer (305), operated by a local or remote human or machine operator, may receive results of an analysis or a decision from a third computer (303) or any other computer shown in System 300 in order to implicitly validate or implicitly confirm a proposed course of action by not taking an action that opposes or negates the proposed course of action comprising no change, postponement of a decision or a different course of action. In some embodiments of the present invention, a local or remote human or machine operator of a fifth computer (305) may have the ability to manually enter a course of action comprising no change, postponement of a decision or a different course of action. In one embodiment of the present invention, a local or remote human or machine operator may monitor a single instance of the operation and execution of a supply chain process. In another embodiment of the present invention, a local or remote human or machine operator may monitor a multitude of instances of supply chain processes during their operation and execution. In some embodiments of the present invention, a fifth computer (305) may display data acquired before, during, or after the monitoring of a multitude of operations on a map, in the form of metrics, or any other way allowing a local or remote human or machine operator to control the operation of a multitude of supply chain assets in parallel. In some embodiments of the present invention, a fifth computer (305) may display raw event data (101), processed event data (102), meta event data (103), one or more attributes, one or more results of analysis, one or more decision, one or more hashes, or other data relevant to the operation and execution of a supply chain process on more than one instance of a fifth computer. In some embodiments of the present invention, a fifth computer (305) may display raw event data (101), processed event data (102), meta event data (103), one or more attributes, one or more results of analysis, one or more decision, one or more hashes, or other data relevant to the operation and execution of a supply chain process partially on a first instance of a fifth computer, partially on a second instance of a fifth computer, partially on a third instance of a fifth computer, and so on.

A fifth computer (305) may receive raw event data (101), processed event data (102), meta event data (103), one or more results of analysis, one or more decision, one or more attributes, one or more hashes, or other data relevant to the operation and execution of a supply chain process from a first computer (301) by means of communication (311), a second computer (302) by means of communication (312), a third computer (303) by means of communication (313), or a fourth computer (304) by means of communication (314). Not shown in System 300, a fifth computer (305) may receive raw event data (101), processed event data (102), meta event data (103), one or more results of analysis, one or more decision, one or more attributes, one or more hashes, or other data relevant to the operation and execution of a supply chain process from another instance of a fifth computer, a sixth computer (319) comprising a distributed ledger, or a seventh computer (315) to access external data by means of communication.

A fifth computer (305) may send raw event data (101), processed event data (102), meta event data (103), one or more results of analysis, one or more decision, one or more attributes, one or more hashes, or other data relevant to the operation and execution of a supply chain process to a first computer (301) by means of communication (311), a second computer (302) by means of communication (312), a third computer (303) by means of communication (313), or a fourth computer (304) by means of communication (314).

Not shown in System 300, a fifth computer (305) may send raw event data (101), processed event data (102), meta event data (103), one or more results of analysis, one or more decision, one or more attributes, one or more hashes, or other data relevant to the operation and execution of a supply chain process to another instance of a fifth computer, a sixth computer (319) comprising a distributed ledger, or a seventh computer (315) to access external data by means of communication.

A sixth computer (319) comprising a distributed ledger may be used to store event data in a manner shown in Classification 200. The storage of event data on a distributed ledger may serve as proof to all participants in a supply chain transaction that events, represented by event data, have actually occurred. The storage of event data on a distributed ledger may further serve as an effective way for all parties with access to the distributed ledger to access and view event data while all sharing the same view on the data.

In one embodiment of the present invention, a sixth computer (319) comprising a distributed ledger may serve as a repository for event data to any other computer shown in System 300. In another embodiment of the present invention, a sixth computer (319) comprising a distributed ledger may serve as a repository of event data that did not originate in any of the computers shown in System 300. In one embodiment of the present invention, event data may be stored on a sixth computer (319) comprising a distributed ledger when it becomes available to any computer shown in System 300. In another embodiment of the present invention, event data may be collected, combined and stored on a sixth computer (319) comprising a distributed ledger in regular intervals such as every hour, every two hours, once per day, etc. In some embodiments of the present invention, a sixth computer (319) comprising a distributed ledger may serve as a basis for financial decision-making including, but not limited to, a determination of payment amounts, payment due dates, payment terms, bonus payments, insurance payments, toll, fee and charge payments, detention charge payments, determination of pay-to parties, one or more customer charges, or how to split a payment between multiple parties. In some embodiments of the present invention, event data stored on a sixth computer (319) comprising a distributed ledger may be displayed on any other computer shown in System 300 in a way that allows direct access to a distributed ledger.

A sixth computer (319) comprising a distributed ledger may receive raw event data (101), processed event data (102), meta event data (103), one or more results of analysis, one or more decision, one or more attributes, one or more hashes, or other data relevant to the operation and execution of a supply chain process from a third computer (303) by means of communication (321), or a fourth computer (304) by means of communication (320). Not shown in System 300, a sixth computer (319) comprising a distributed ledger may receive raw event data (101), processed event data (102), meta event data (103), one or more results of analysis, one or more decision, one or more attributes, one or more hashes, or other data relevant to the operation and execution of a supply chain process from a first computer (301), a second computer (302), a fifth computer (305), another instance of a sixth computer comprising a distributed ledger, or a seventh computer (315) to access external data by means of communication.

A sixth computer (319) comprising a distributed ledger may send raw event data (101), processed event data (102), meta event data (103), one or more results of analysis, one or more decision, one or more attributes, one or more hashes, or other data relevant to the operation and execution of a supply chain process to a third computer (303) by means of communication (321), or a fourth computer (304) by means of communication (320). Not shown in System 300, a sixth computer (319) comprising a distributed ledger may send raw event data (101), processed event data (102), meta event data (103), one or more results of analysis, one or more decision, one or more attributes, one or more hashes, or other data relevant to the operation and execution of a supply chain process to a first computer (301), a second computer (302), a fifth computer (305), another instance of a sixth computer comprising a distributed ledger, or a seventh computer (315) to access external data by means of communication.

A seventh computer (315) provides access to external data that may not have been captured by a first computer (301) or obtained from a second computer (302), a third computer (303), a fourth computer (304), a fifth computer (305), a sixth computer (319) comprising a distributed ledger, or another instance of a seventh computer. A seventh computer (315) allows access to external data sources, examples of which are listed above.

In one embodiment of the present invention, a seventh computer (315) may obtain data from external data sources using automated computer system interface mechanisms including, but not limited to, an EDI document, an application programming interface, an application binary interface, a file grabber, direct access to an external computer, or direct access to an external computer database. In another embodiment of the present invention, a user of a seventh computer (315) may manually enter data obtained from an external computer by mechanisms that include, but are not limited to, looking at an external system, receiving data in an email or similar message, receiving a data file on a storage device, or receiving data via communication with a user of an external computer. In one embodiment of the present invention, a seventh computer (315) may only send event data to an external system. In another embodiment of the present invention, a seventh computer (315) may only receive event data from an external system. In another embodiment of the present invention, a seventh computer (315) may send event data to and receive event data from an external system. In another embodiment of the present invention, a seventh computer (315) may obtain data from an external computer comprising a distributed ledger. In some embodiments of the present invention, a local or remote human or machine operator of an external data source may receive a request for a decision from a seventh computer (315) and may send a decision on a course of action comprising no change, postponement of a decision or a different course of action to a seventh computer (315).

A seventh computer (315) to access external data may receive raw event data (101), processed event data (102), meta event data (103), one or more results of analysis, one or more decision, one or more attributes, one or more hashes, or other data relevant to the operation and execution of a supply chain process from a first computer (301) by means of communication (318), a second computer (302) by means of communication (317), or a third computer (303) by means of communication (316). Not shown in System 300, a seventh computer (315) to access external data may receive raw event data (101), processed event data (102), meta event data (103), one or more results of analysis, one or more decision, one or more attributes, one or more hashes, or other data relevant to the operation and execution of a supply chain process from a fourth computer (304), a fifth computer (305), a sixth computer (319), or another instance of a seventh computer to access external data by means of communication.

A seventh computer (315) to access external data may send raw event data (101), processed event data (102), meta event data (103), one or more results of analysis, one or more decision, one or more attributes, one or more hashes, or other data relevant to the operation and execution of a supply chain process to a first computer (301) by means of communication (318), a second computer (302) by means of communication (317), or a third computer (303) by means of communication (316). Not shown in System 300, a seventh computer (315) to access external data may send raw event data (101), processed event data (102), meta event data (103), one or more results of analysis, one or more decision, one or more attributes, one or more hashes, or other data relevant to the operation and execution of a supply chain process to a fourth computer (304), a fifth computer (305), a sixth computer (319), or another instance of a seventh computer to access external data by means of communication.

In certain embodiments the computing system comprises first (301), second (302), third (303), and fourth (304) computers operably communicating with one another, the third (303) and fourth (304) computer operably communicating with the distributed ledger computer (319), the first computer (301) capturing the first event data during the execution of the supply chain process, and obtaining the first attribute of the supply chain process that is stored therein, the first computer (301) sending a first message to the second computer (302), the first message having the first event data and the first attribute of the supply chain process therein, the second computer (302) sending a second message to the fourth computer (304) in response to the first message, the second message having the first attribute and requesting the second attribute of the supply chain process from the fourth computer (304), the fourth computer (304) obtaining the second attribute utilizing the first attribute in response to the second message, and sending a third message to the second computer (302) having the second attribute therein in response to the second message, the second computer (302) sending a fourth message to the third computer (303), the fourth message having the first event data and the first and second attributes of the supply chain process therein, the third computer (303) making the first determination to either maintain the first course of action in the supply chain process or to change the first course of action in the supply chain process utilizing the first event data and the first and second attributes, the third computer (303) generating the first record having the first event data, the first and second attributes, and the first determination, and sending a fifth message having the first record therein to the fourth computer (304), and sending a sixth message having the first record therein to the distributed ledger computer (319), the fourth computer (304) storing the first record therein in response to the fifth message, and the distributed ledger computer (319) adding the first record to the first block and broadcasting the first block to the plurality of nodes (325) of the distributed ledger to validate and store the first block on the distributed ledger, in response to the sixth message.

In one embodiment the third computer (303) further calculating a hash value of the first record, the third computer (303) sending a seventh message having the hash value therein to the distributed ledger computer (319), and the distributed ledger computer (319) adding the hash value to the second block and broadcasting the second block to the plurality of nodes (325) of the distributed ledger to validate and store the second block on the distributed ledger, in response to the seventh message.

In certain embodiments the computing system further comprises fifth (305) and sixth (315) computers that operably communicate with the first (301), second (302), third (303), and fourth (304) computers, the fifth computer (305) displaying the first record, and receiving the input data that indicates the second determination relating to the first course of action of the supply chain process, and sending a seventh message having the second determination to the third computer (303), the sixth computer (315) operably communicating with an external data source (322), the sixth computer (315) obtaining a third attribute of the supply chain process from the external data source (322), the sixth computer (315) sending an eighth message having the third attribute therein to the third computer (303), the third computer (303) generating a second record having the first event data, the first, second and third attributes, and the first and second determinations, and storing the second record therein, the computing system sending a ninth message having the second record therein to the distributed ledger computer (319), and the distributed ledger computer (319) adding the second record to a second block and broadcasting the second block to the plurality of nodes (325) of the distributed ledger to validate and store the second block on the distributed ledger.

In certain embodiments the supply chain process is a transport of freight, the first event data is a digital photograph captured during the supply chain process, the first attribute is a process identifier of the supply chain process, the second attribute is a second record providing a description of the supply chain process, the first course of action is a transporting of freight by the supply chain process from a departure location to a destination location, and the third computer (303) making the first determination to either maintain the first course of action or to change the first course of action based on the digital photograph of the supply chain process, the process identifier, and the description of the supply chain process.

Referring to FIG. 4, another embodiment of the present invention comprising a distributed ledger for supply chain event data is shown. System 400 comprises of six computers used in the capture, formatting, processing, analysis, monitoring, decision-making, hashing, sharing and storing of event data on a distributed ledger. Event data may be captured on a first computer (401), then being sent to a second computer (402) for processing, analysis and decision-making, then being sent to a third computer (403) for storage, then being sent to a fifth computer (405) comprising a distributed ledger for storage and connecting to a network of nodes on a distributed ledger (408), a fourth computer (404) for monitoring other computers, and in some embodiments of the present invention for decision-making, and a sixth computer (405) to access external data (407). The embodiment of the present invention shown in System 400 functions as described in System 300 with the exception that two separate computers for processing, and analysis and decision-making have been combined into one computer (402).

In certain embodiments the computing system comprises first (401), second (402), and third (403) computers operably communicating with one another, the third computer (403) operably communicating with the distributed ledger computer (406), the first computer (401) capturing the first event data during the execution of the supply chain process, and obtaining the first attribute of the supply chain process that is stored therein, the first computer (401) sending a first message to the second computer (402), the first message having the first event data and the first attribute of the supply chain process therein, the second computer (402) sending a second message to the third computer (403) in response to the first message, the second message having the first attribute and requesting the second attribute of the supply chain process from the third computer (403), the third computer (403) obtaining the second attribute stored therein utilizing the first attribute in response to the second message, the third computer (403) sending a third message to the second computer (402) having the second attribute therein in response to the second message, the second computer (402) making the first determination to either maintain the first course of action in the supply chain process or to change the first course of action in the supply chain process utilizing the first event data and the first and second attributes, the second computer (402) generating a first record having the first event data, the first and second attributes, and the first determination, and sending a fourth message having the first record therein to the third computer (403), and sending a fifth message having the first record therein to the distributed ledger computer (406), the third computer (403) storing the first record therein in response to the fourth message, and the distributed ledger computer (406) adding the first record to the first block and broadcasting the first block to the plurality of nodes (408) of the distributed ledger to validate and store the first block on the distributed ledger, in response to the fifth message.

In one embodiment the second computer (402) further calculating a hash value of the first record the second computer (402) sending a sixth message having the hash value therein to the distributed ledger computer (406), and the distributed ledger computer (406) adding the hash value to a second block and broadcasting the second block to the plurality of nodes (408) of the distributed ledger to validate and store the second block on the distributed ledger, in response to the sixth message.

In certain embodiments the computing system further comprises fourth (404) and fifth (405) computers that operably communicate with the second computer (402), the fourth computer (404) displaying the first record, and receiving the input data that indicates the second determination relating to the first course of action of the supply chain process, and sending a sixth message having the second determination to the second computer (402), the fifth computer (405) operably communicating with an external data source (407), the fifth computer (405) obtaining a third attribute of the supply chain process from the external data source (407), the fifth computer (405) sending a seventh message with the third attribute therein to the second computer (402), the second computer (402) generating a second record having the first event data, the first, second and third attributes, and the first and second determinations, and storing the second record therein, the second computer (402) sending an eighth message having the second record therein to the distributed ledger computer (406), and the distributed ledger computer (406) adding the second record to a second block and broadcasting the second block to the plurality of nodes (408) of the distributed ledger to validate and store the second block on the distributed ledger.

In certain embodiments the supply chain process is a transport of freight, the first event data is a digital photograph captured during the supply chain process, the first attribute is a process identifier of the supply chain process, the second attribute is a second record providing a description of the supply chain process, the first course of action is a transporting of freight by the supply chain process from a departure location to a destination location, and the second computer (402) making the first determination to either maintain the first course of action or to change the first course of action based on the digital photograph of the supply chain process, the process identifier, and the description of the supply chain process.

Referring to FIG. 18, shown is Block Diagram 1800 comprising a flow to illustrate a practical example in reference to system 400 for the capture of raw event data (101) and additional attributes for the creation of processed event data (102) to enable decision-making by an operator. Block diagram 1800 comprises of ten steps to capture, process, analyze and share raw event (101) loading photos for a supply chain asset in a freight transportation process. Raw loading event data (101) may be captured by a still image camera attached to a driver communication device for example. The driver uses this first computer (401) to take several images of freight being loaded onto a trailer (1801). The first computer (401) processes the photo files and additional data such as vehicle identifier (Vehicle-ID), user identifier (User-ID), location, process identifier (Process-ID), or a date and time stamp for transmission and sends them to a second computer (402, 1802). The second computer (402) may request additional event attributes such as a bill of lading (BOL) or standard operating procedure (SOP) from a sixth computer (405) to access external systems by using the process identifier as a reference, in this particular example interfacing into a transportation management system controlled and operated by the shipper of the freight (1803). The second computer (402) then processes the raw event data (101) and additional attributes into processed event data (102) which it sends it to a fourth computer (404, 1804). A fourth computer (404) displays the processed event data (102), which includes the photo files, bill of lading and standard operating procedure to a human operator (1805). The human operator assesses the processed event data (102) and determines that the pallets have been secured safely to the supply chain asset (1806). The human operator documents his decision, for example by indicating to a computer software that the pallets are safe (1806). Not shown in Block Diagram 1800 is that the human operator decision can be documented on a fourth computer (404) in some embodiments of the present invention and that a fourth computer (404) then sends the information to a second computer (402). In other embodiments of the present invention a fourth computer (404) may only serve as an information display computer that allows access to a second computer (402) for the human operator. Shown again in Block Diagram 1800, the second computer (402) adds the decision to the already existing raw event data (101) and processed event (102) data and then creates a hash (202) of all available data and sends all data and the hash (202) to a third computer (403) for storage (1807). A third computer (403) stores all data and the hash (202, 1808). A second computer (402) then sends the hash (202) to a fifth computer (406) comprising a distributed ledger (1809). A fifth computer (406) comprising a distributed ledger writes the hash (202) on a distributed ledger (1810). An index of abbreviations used in the diagram is shown in (1811).

Not shown in Block Diagram 1800, a software program may perform the activities of assessing that the materials have been properly loaded and secured onto the trailer of a supply chain asset (1806). Further not shown, once a human operator or software program validates that all materials were properly loaded, a second computer (402) may also send a notification of the results of the analysis to the owner or operator of the supply chain asset, a shipper, a carrier and the recipient of the freight. A sixth computer (405) providing access to and, in some embodiments of the present invention, an interface into external data sources may now also be updated. Still further not shown in Block Diagram 1800, a multitude of additional parties including, but not limited to, a freight forwarder, a broker, or an end-user of the materials may also be notified by a second computer (402). Still further not shown are cases where materials are not properly secured to a supply chain asset. Still further not shown in Block Diagram 1800, a fifth computer (406) comprising a distributed ledger may receive raw event data (101), processed event data (102), a result of an analysis, a decision, or other data relevant to the operation of a supply chain asset in the form of whole data (203) to store on a distributed ledger.

Referring to FIG. 5, another embodiment of the present invention comprising a distributed ledger for supply chain event data is shown. System 500 comprises of five computers used in the capture, formatting, processing, analysis, monitoring, decision-making, hashing, sharing and storing of event data on a distributed ledger. Event data may be captured on a first computer (501), then being sent to a second computer (502) for processing, analysis, decision-making and storage, then being sent to a fourth computer (505) comprising a distributed ledger for storage and connecting to a network of nodes on a distributed ledger (507), a third computer (503) for monitoring other computers, and in some embodiments of the present invention for decision-making, and a fifth computer (504) to access external data (506). The embodiment of the present invention shown in System 500 functions as described in System 300 with the exception that three separate computers for processing, analysis, decision-making and storage have been combined into one computer (502).

In certain embodiments the computing system comprises first (501) and second (502) computers operably communicating with one another, the second computer (502) operably communicating with the distributed ledger computer, the first computer (501) capturing the first event data of a supply chain process, and obtaining a first attribute of the supply chain process that is stored therein, the first computer (501) sending a first message to the second computer (502), the first message having the first event data and the first attribute therein, the second computer (502) obtaining a second attribute of the supply chain process stored therein utilizing the first attribute in response to the first message, the second computer (502) making a first determination to either maintain a first course of action in the supply chain process or to change the first course of action in the supply chain process utilizing the first event data and the first and second attributes, the second computer (502) generating a first record having the first event data, the first and second attributes, and the first determination, the second computer (502) storing the first record therein, the second computer (502) sending a second message having the first record therein to the distributed ledger computer (505), and the distributed ledger computer (505) adding the first record to the first block and broadcasting the first block to the plurality of nodes (507) of the distributed ledger to validate and store the first block on the distributed ledger, in response to the second message.

In one embodiment the second computer calculating a hash value of the first record, the second computer (502) sending a third message having the hash value therein to the distributed ledger computer (505), and the distributed ledger computer (505) adding the hash value to a second block and broadcasting the second block to the plurality of nodes (507) of the distributed ledger to validate and store the second block on the distributed ledger, in response to the third message.

In certain embodiments the computing system further comprises third (503) and fourth (504) computers that operably communicate with the second computer (502), the third computer (503) displaying the first record, and receiving the input data that indicates a second determination relating to the first course of action of the supply chain process, and sending a third message having the second determination to the second computer (502), the fourth computer (504) operably communicating with an external data source (506), the fourth computer (504) obtaining a third attribute of the supply chain process from the external data source (506), the fourth computer (504) sending a fourth message to the second computer (502) with the third attribute therein, the second computer (502) generating a second record having the first event data, the first, second and third attributes, and the first and second determinations, and storing the second record therein, the second computer (502) sending a fifth message with the second record therein to the distributed ledger computer (505), and the distributed ledger computer (505) adding the second record to a second block and broadcasting the second block to the plurality of nodes (507) of the distributed ledger to validate and store the second block on the distributed ledger.

In yet another embodiment the supply chain process is a transport of freight, the first event data is a digital photograph captured during the supply chain process, the first attribute is a process identifier of the supply chain process, the second attribute is a second record providing a description of the supply chain process, the first course of action is a transporting of freight by the supply chain process from a departure location to a destination location, and the second computer (502) making the first determination to either maintain the first course of action or to change the first course of action based on the digital photograph of the supply chain process, the process identifier, and the description of the supply chain process.

Referring to FIG. 19, shown is Block Diagram 1900 comprising a flow to illustrate a practical example in reference to system 500 for the capture of raw event data (101) and additional attributes for the creation of processed event data (102) to enable decision-making by an operator. Block diagram 1900 comprises of nine steps to capture, process, analyze and share raw event (101) loading photos for a supply chain asset in a freight transportation process. Raw loading event data (101) may be captured by a still image camera attached to a driver communication device for example. The driver uses this first computer (501) to take several images of freight being loaded onto a trailer (1901). The first computer (501) processes the photo files and additional data such as vehicle identifier (Vehicle-ID), user identifier (User-ID), location, process identifier (Process-ID), or a date and time stamp for transmission and sends them to a second computer (502, 1902). The second computer (502) may request additional event attributes such as a bill of lading (BOL) or standard operating procedure (SOP) from a fifth computer (504) to access external systems by using the process identifier as a reference, in this particular example interfacing into a transportation management system controlled and operated by the shipper of the freight (1903). The second computer (402) then processes the raw event data (101) and additional attributes into processed event data (102) which it sends it to a third computer (503, 1904). A third computer (503) displays the processed event data (102), which includes the photo files, bill of lading and standard operating procedure to a human operator (1905). The human operator assesses the processed event data (102) and determines that the pallets have been secured safely to the supply chain asset (1906). The human operator documents his decision, for example by indicating to a computer software that the pallets are safe (1906). Not shown in Block Diagram 1900 is that the human operator decision can be documented on a third computer (503) in some embodiments of the present invention and that a third computer (503) then sends the information to a second computer (502). In other embodiments of the present invention a third computer (503) may only serve as an information display computer that allows access to a second computer (502) for the human operator. Shown again in Block Diagram 1900, the second computer (502) adds the decision to the already existing raw event data (101) and processed event data (102) and then creates a hash (202) of all available data and stores all data and the hash (202, 1907). A second computer (502) then sends the hash (202) to a fourth computer (505) comprising a distributed ledger (1908). A fourth computer (505) comprising a distributed ledger writes the hash (202) on a distributed ledger (1909). An index of abbreviations used in the diagram is shown in (1910).

Not shown in Block Diagram 1900, a software program may perform the activities of assessing that the materials have been properly loaded and secured onto the trailer of a supply chain asset (1906). Further not shown, once a human operator or software program validates that all materials were properly loaded, a second computer (502) may also send a notification of the results of the analysis to the owner or operator of the supply chain asset, a shipper, a carrier and the recipient of the freight. A fifth computer (504) providing access to and, in some embodiments of the present invention, an interface into external data sources may now also be updated. Still further not shown in Block Diagram 1900, a multitude of additional parties including, but not limited to, a freight forwarder, a broker, or an end-user of the materials may also be notified by a second computer (502). Still further not shown are cases where materials are not properly secured to a supply chain asset. Still further not shown in Block Diagram 1900, a fourth computer (505) comprising a distributed ledger may receive raw event data (101), processed event data (102), a result of an analysis, a decision, or other data relevant to the operation of a supply chain asset in the form of whole data (203) to store on a distributed ledger.

Referring to FIG. 6, another embodiment of the present invention comprising a distributed ledger for supply chain event data is shown. System 600 comprises of five computers used in the capture, formatting, processing, analysis, monitoring, decision-making, hashing, sharing and storing of event data on a distributed ledger. Event data may be captured, processed, analyzed, or one or more decisions being made on a first computer (601), then being sent to a second computer (602) for storage, then being sent to a fourth computer (605) comprising a distributed ledger for storage and connecting to a network of nodes on a distributed ledger (607), a third computer (603) for monitoring other computers, and in some embodiments of the present invention for decision-making, and a fifth computer (604) to access external data (606). The embodiment of the present invention shown in System 600 functions as described in System 300 with the exception that three separate computers for capture, processing, analysis and decision-making have been combined into one computer (601).

In one embodiment the computing system comprises first (601) and second (602) computers operably communicating with one another, the second computer (602) operably communicating with the distributed ledger computer (605), the first computer (601) capturing the first event data of the supply chain process and obtaining the first attribute of the supply chain process that is stored therein, the first computer (601) sending a first message to the second computer (602), the first message having the first attribute therein, the second computer (602) obtaining the second attribute of the supply chain process utilizing the first attribute in response to the first message, and sending a second message to the first computer (601) in response to the first message, the second message having the second attribute therein, the first computer (601) making the first determination to either maintain the first course of action in the supply chain process or to change the first course of action in the supply chain process utilizing the first event data and the first and second attributes, the first computer (601) generating the first record having the first event data, the first and second attributes, and the first determination, the first computer (601) sending a third message having the first record therein to the second computer (602), and sending a fourth message having the first record therein to the distributed ledger computer (605), the second computer (602) storing the first record therein in response to the third message, and the distributed ledger computer (605) adding the first record to the first block and broadcasting the first block to the plurality of nodes (607) of the distributed ledger to validate and store the first block on the distributed ledger, in response to the fourth message.

In another embodiment the first computer (601) calculating a hash value of the first record, the first computer (601) sending a fifth message having the hash value therein to the distributed ledger computer (605), and the distributed ledger computer (605) adding the hash value to a second block and broadcasting the second block to the plurality of nodes (607) of the distributed ledger to validate and store the second block on the distributed ledger, in response to the fifth message.

In yet another embodiment the computing system further comprises third (603) and fourth (604) computers that operably communicate with the second computer (602), the third computer (603) displaying the first record, and receiving the input data that indicates a second determination relating to the first course of action of the supply chain process, and sending a fifth message having the second determination therein to the second computer (602), the fourth computer (604) operably communicating with an external data source (606), the fourth computer (604) obtaining a third attribute of the supply chain process from the external data source (606), the fourth computer (604) sending a sixth message having the third attribute therein to the second computer (602), the second computer (602) generating a second record having the first event data, the first, second and third attributes, and the first and second determinations, and storing the second record therein, the second computer (602) sending a seventh message having the third record therein to the distributed ledger computer (605), and the distributed ledger computer (605) adding the second record to a second block and broadcasting the second block to the plurality of nodes (607) of the distributed ledger to validate and store the second block on the distributed ledger.

In a further embodiment the supply chain process is a transport of freight, the first event data is a digital photograph captured during the supply chain process, the first attribute is a process identifier of the supply chain process, the second attribute is a second record providing a description of the supply chain process, the first course of action is a transporting of freight by the supply chain process from a departure location to a destination location, and the second computer (602) making the first determination to either maintain the first course of action or to change the first course of action based on the digital photograph of the supply chain process, the process identifier, and the description of the supply chain process.

Referring to FIG. 20, a Block diagram 2000 for capturing of raw event data (101) and additional attributes for the creation of processed event data (102) to enable decision-making by an operator utilizing the system 600 is illustrated. Block diagram 2000 comprises of ten steps to capture, process, analyze and share raw event (101) loading photos for a supply chain asset in a freight transportation process. Raw loading event data (101) may be captured by a still image camera attached to a driver communication device or portable computer for example. The driver uses this first computer (601) to take several images of freight being loaded onto a trailer (2001). The first computer (601) processes the photo files and additional data such as vehicle identifier (Vehicle-ID), user identifier (User-ID), location, process identifier (Process-ID), or a date and time stamp (2002). The first computer (601) may request additional event attributes such as a bill of lading (BOL) or standard operating procedure (SOP) from a fifth computer (604) to access external systems by using the process identifier as a reference, in this particular example interfacing into a transportation management system controlled and operated by the shipper of the freight (2003). The first computer (601) then processes the raw event data (101) and additional attributes into processed event data (102) which it sends it to a third computer (603, 2004). A third computer (603) displays the processed event data (102), which includes the photo files, bill of lading and standard operating procedure to a human operator (2005). The human operator assesses the processed event data (102) and determines that the pallets have been secured safely to the supply chain asset (2006). The human operator documents his decision, for example by indicating to a computer software that the pallets are safe (2006). Not shown in Block Diagram 2000 is that the human operator decision can be documented on a third computer (603) in some embodiments of the present invention. In other embodiments of the present invention a third computer (603) may only serve as an information display computer that allows access to a first computer (601) for the human operator. Shown again in Block Diagram 2000, the first computer (601) adds the decision to the already existing raw event data (101) and processed event (102) data and then creates a hash (202) of all available data and sends all data and the hash (202) to a second computer (602) for storage (2007). A second computer (602) stores all data and the hash (202, 2008). A first computer (601) then sends the hash (202) to a fourth computer (604) comprising a distributed ledger (2009). A fourth computer (604) comprising a distributed ledger writes the hash (202) on a distributed ledger (2010). An index of abbreviations used in the diagram is shown in (2011).

Not shown in Block Diagram 2000, a software program may perform the activities of assessing that the materials have been properly loaded and secured onto the trailer of a supply chain asset (2006). Further not shown, once a human operator or software program validates that all materials were properly loaded, a first computer (601) may also send a notification of the results of the analysis to the owner or operator of the supply chain asset, a shipper, a carrier and the recipient of the freight. A fifth computer (604) providing access to and, in some embodiments of the present invention, an interface into external data sources may now also be updated. Still further not shown in Block Diagram 2000, a multitude of additional parties including, but not limited to, a freight forwarder, a broker, or an end-user of the materials may also be notified by a first computer (601). Still further not shown are cases where materials are not properly secured to a supply chain asset. Still further not shown in Block Diagram 2000, a fourth computer (604) comprising a distributed ledger may receive raw event data (101), processed event data (102), a result of an analysis, a decision, or other data relevant to the operation of a supply chain asset in the form of whole data (203) to store on a distributed ledger.

Referring to FIG. 7, another embodiment of the present invention comprising a distributed ledger for supply chain event data is shown. System 700 comprises of four computers used in the capture, formatting, processing, analysis, monitoring, decision-making, hashing, sharing and storing of event data on a distributed ledger. Event data may be captured, processed, analyzed, one or more decisions being made, or stored on a first computer (701), then being sent to a third computer (704) comprising a distributed ledger for storage and connecting to a network of nodes on a distributed ledger (706), a second computer (702) for monitoring other computers, and in some embodiments of the present invention for decision-making, and a fourth computer (703) to access external data (705). The embodiment of the present invention shown in System 700 functions as described in System 300 with the exception that four separate computers for capture, processing, analysis, decision-making and storage have been combined into one computer (701).

In one embodiment the computing system comprises a first computer (701) operably communicating with the distributed ledger computer (704), the first computer (701) capturing the first event data of the supply chain process, and obtaining the first and second attributes of the supply chain process that are stored therein, the first computer (701) making the first determination to either maintain the first course of action in the supply chain process or to change the first course of action in the supply chain process utilizing the first event data and the first and second attributes, the first computer (701) generating the first record having the first event data, the first and second attributes, and the first determination, and storing the first record therein, the first computer (701) sending a first message having the first record therein to the distributed ledger computer (704), and the distributed ledger computer (704) adding the first record to a first block and broadcasting the first block to the plurality of nodes (706) of the distributed ledger to validate and store the first block on the distributed ledger, in response to the first message.

In certain embodiments the first computer (701) calculating a hash value of the first record, the first computer (701) sending a second message having the hash value therein to the distributed ledger computer (704), and the distributed ledger computer (704) adding the hash value to a second block and broadcasting the second block to the plurality of nodes (706) of the distributed ledger to validate and store the second block on the distributed ledger, in response to the second message.

In one embodiment the computing system further comprises second (702) and third computers (703) that operably communicate with the first computer (701), the second computer (702) displaying the first record, and receiving the input data that indicates a second determination relating to the first course of action of the supply chain process, and sending a second message having the second determination therein to the first computer (701), the third computer (703) operably communicating with an external data source (705), the third computer (703) obtaining a third attribute of the supply chain process from the external data source (705), the third computer (703) sending a third message having the third attribute therein to the first computer (701), the first computer (701) generating a second record having the first event data, the first, second and third attributes, and the first and second determinations, and storing the second record therein, the first computer (701) sending a fourth message having the second record therein to the distributed ledger computer (704), and the distributed ledger computer (704) adding the second record to a second block and broadcasting the second block to the plurality of nodes (706) of the distributed ledger to validate and store the second block on the distributed ledger.

In certain embodiments the computing system further comprises a second computer (702) that operably communicates with the first computer (701), the second computer (702) displaying the first record, and receiving the input data that indicates a second determination relating to the first course of action of the supply chain process, and sending a second message having the second determination therein to the first computer (701), the first computer (701) further operably communicating with an external data source (705), the first computer (701) obtaining a third attribute of the supply chain process from the external data source (705), the first computer (701) generating a second record having the first event data, the first, second and third attributes, and the first and second determinations, and storing the second record therein, the first computer (701) sending a fourth message having the second record therein to the distributed ledger computer (704), and the distributed ledger computer (704) adding the second record to a second block and broadcasting the second block to the plurality of nodes (706) of the distributed ledger to validate and store the second block on the distributed ledger.

Referring to FIG. 21, shown is Block Diagram 2100 comprising a flow to illustrate a practical example in reference to system 700 for the capture of raw event data (101) and additional attributes for the creation of processed event data (102) to enable decision-making by an operator. Block diagram 2100 comprises of nine steps to capture, process, analyze and share raw event (101) loading photos for a supply chain asset in a freight transportation process. Raw loading event data (101) may be captured by a still image camera attached to a driver communication device or portable computer for example. The driver uses this first computer (701) to take several images of freight being loaded onto a trailer (2101). The first computer (701) processes the photo files and additional data such as vehicle identifier (Vehicle-ID), user identifier (User-ID), location, process identifier (Process-ID), or a date and time stamp (2102). The first computer (701) may request additional event attributes such as a bill of lading (BOL) or standard operating procedure (SOP) from a fourth computer (703) to access external systems by using the process identifier as a reference, in this particular example interfacing into a transportation management system controlled and operated by the shipper of the freight (2103). The first computer (701) then processes the raw event data (101) and additional attributes into processed event data (102) which it sends it to a second computer (702, 2104). A second computer (702) displays the processed event data (102), which includes the photo files, bill of lading and standard operating procedure to a human operator (2105). The human operator assesses the processed event data (102) and determines that the pallets have been secured safely to the supply chain asset (2106). The human operator documents his decision, for example by indicating to a computer software that the pallets are safe (2106). Not shown in Block Diagram 2100 is that the human operator decision can be documented on a second computer (702) in some embodiments of the present invention. In other embodiments of the present invention a second computer (702) may only serve as an information display computer that allows access to a first computer (701) for the human operator. Shown again in Block Diagram 2100, the first computer (701) adds the decision to the already existing raw event data (101) and processed event (102) data and then creates a hash (202) of all available data and stores all data and the hash (202) (2107). A first computer (701) then sends the hash (202) to a third computer (704) comprising a distributed ledger (2108). A third computer (704) comprising a distributed ledger writes the hash (202) on a distributed ledger (2109). An index of abbreviations used in the diagram is shown in (2110).

Not shown in Block Diagram 2100, a software program may perform the activities of assessing that the materials have been properly loaded and secured onto the trailer of a supply chain asset (2106). Further not shown, once a human operator or software program validates that all materials were properly loaded, a first computer (701) may also send a notification of the results of the analysis to the owner or operator of the supply chain asset, a shipper, a carrier and the recipient of the freight. A fourth computer (703) providing access to and, in some embodiments of the present invention, an interface into external data sources may now also be updated. Still further not shown in Block Diagram 2100, a multitude of additional parties including, but not limited to, a freight forwarder, a broker, or an end-user of the materials may also be notified by a first computer (701). Still further not shown are cases where materials are not properly secured to a supply chain asset. Still further not shown in Block Diagram 2100, a third computer (704) comprising a distributed ledger may receive raw event data (101), processed event data (102), a result of an analysis, a decision, or other data relevant to the operation of a supply chain asset in the form of whole data (203) to store on a distributed ledger.

Referring to FIG. 8, another embodiment of the present invention comprising a distributed ledger for supply chain event data in reference to System 600 is shown. System 800 comprises of five computers used in the capture, formatting, processing, analysis, monitoring, decision-making, hashing, sharing and storing of event data on a distributed ledger. Event data may be captured, processed, analyzed, or one or more decisions being made on a first computer (801), then being sent to a second computer (802) for storage, then being sent to a fourth computer (804) comprising a first distributed ledger for storage and connecting to a network of nodes on a distributed ledger (809), then being sent to a fifth computer (805) comprising a second distributed ledger and connecting to a network of nodes on a distributed ledger (808), a third computer (803) for monitoring other computers, and in some embodiments of the present invention for decision-making, and a sixth computer (806) to access external data (807). System 800 functions in the same way that System 600 does with the exception that a fifth computer (805) comprising a second distributed ledger has been added. The storage of raw event data (101), processed event data (102), meta event data (103), one or more results of analysis, one or more decision, one or more attributes, one or more hashes, or other data relevant to the operation and execution of a supply chain process on two or more distributed ledgers may occur in any of the ways listed in Classification 200.

For example, materials may have been loaded onto a supply chain asset such as a truck with a trailer at a pick-up location, which constitutes a raw event. The corresponding raw event data (101) may be a photographic image of the loaded freight on a trailer taken with a first computer (801) such as a smart phone or tablet computer controlled by a first operator. A first computer (801) may process the raw event data (101) into processed event data (102) through the addition of attributes that may include, but are not limited to, a user identifier, a date and time, a supply chain asset identifier, a shipping order identifier, a physical location and a bill of lading comprising details about the materials being transported. A first operator may also create additional raw event data (101) such as manually entering a count of pallets, or manually entering a confirmation that all freight has been properly secured to the trailer on a first computer (801). When the additional raw event data (101) is combined with the initial processed event data (102), it may be possible to deduce that a loading process has been completed. A first computer (801) may further request additional attributes from a sixth computer (806) to access external data. For example, a first operator may request detailed data included on a shipping order document based on the shipping order identifier already known. A sixth computer (806) may request and receive a shipping order document based on the known shipping order identifier from a computer operated by the shipper of the freight and then send it to a first computer where it may be used to compare the material count listed on the shipping order to that on the bill of lading as well as the manual count conducted by a first operator. If there are discrepancies, they may be addressed right away and if there are none, a first operator may proceed to drive to a destination. A first computer may now combine the available raw event data (101), processed event data (102), results of an analysis and decision to proceed to a route into a single document. Either the whole document or a hash of the document may then be stored on a fourth computer (804) comprising a first distributed ledger operated by the carrier and it may also be stored on a fifth computer (805) comprising a second distributed ledger operated by the shipper.

In certain embodiments a system for supply chain event management comprises a computing system that operably communicates with first (804) and second (805) distributed ledger computers, the first distributed ledger computer (804) being a node of a first distributed ledger (809), the second distributed ledger computer (805) being a node of a second distributed ledger (808), the computing system capturing first event data of a supply chain process, and obtaining a first attribute of the supply chain process that is stored therein, the computing system obtaining a second attribute of the supply chain process utilizing the first attribute, the computing system making a first determination to either maintain a first course of action in the supply chain process or to change the first course of action in the supply chain process utilizing the first event data and the first and second attributes, the computing system generating a first record having the first event data, the first and second attributes, and the first determination, the computing system calculating a hash value of the first record, the first distributed ledger computer (804) adding the hash value to a first block and broadcasting the first block to a plurality of nodes (809) of the first distributed ledger to validate and store the first block on the first distributed ledger, and the second distributed ledger computer (805) adding the hash value to a second block and broadcasting the second block to a plurality of nodes (808) of the second distributed ledger to validate and store the second block on the second distributed ledger.

In certain embodiments the computing system comprises first (801) and second (802) computers operably communicating with one another, the second computer (802) operably communicating with the first (804) and second (805) distributed ledger computers, the first computer (801) capturing the first event data of the supply chain process, and obtaining the first attribute of the supply chain process that is stored therein, the first computer (801) sending a first message to the second computer (802), the first message having the first attribute therein, the second computer (802) obtaining the second attribute of the supply chain process utilizing the first attribute in response to the first message, and sending a second message to the first computer (801) in response to the first message, the second message having the second attribute therein, the first computer (801) making the first determination to either maintain the first course of action in the supply chain process or to change the first course of action in the supply chain process utilizing the first event data and the first and second attributes, the first computer (801) generating the first record having the first event data, the first and second attributes, and the first determination, the first computer (801) further calculating the hash value of the first record, the first computer (801) sending a third message having the hash value to the first distributed ledger computer (804), and a fourth message having the hash value to the second distributed ledger computer (805), the first distributed ledger computer (804) adding the hash value to the first block and broadcasting the first block to the plurality of nodes (809) of the first distributed ledger to validate and store the first block on the first distributed ledger in response to the third message, and the second distributed ledger computer (805) adding the hash value to the second block and broadcasting the second block to the plurality of nodes (808) of the second distributed ledger to validate and store the second block on the second distributed ledger in response to the fourth message.

In certain embodiments a system for supply chain event management comprises a computing system that operably communicates with first (804) and second (805) distributed ledger computers, the first distributed ledger computer (804) being a node of a first distributed ledger (809), the second distributed ledger computer (805) being a node of a second distributed ledger (808), the computing system capturing first event data of a supply chain process, and obtaining a first attribute of the supply chain process that is stored therein, the computing system obtaining a second attribute of the supply chain process utilizing the first attribute, the computing system making a first determination to either maintain a first course of action in the supply chain process or to change the first course of action in the supply chain process utilizing the first event data and the first and second attributes, the computing system generating a first record having the first event data, the first and second attributes, and the first determination, the computing system splitting the first record into second and third records, the computing system calculating a first hash value of the second record, and sending the first hash value to the first distributed ledger computer (804), and the computing system calculating a second hash value of the third record, and sending the second hash value to the second distributed ledger computer (805), the first distributed ledger computer (804) adding the first hash value to a first block and broadcasting the first block to a plurality of nodes (809) of the first distributed ledger to validate and store the first block on the first distributed ledger, and the second distributed ledger computer (805) adding the second hash value to a second block and broadcasting the second block to a plurality of nodes (808) of the second distributed ledger to validate and store the second block on the second distributed ledger.

In certain embodiments the computing system includes first (801) and second (802) computer operably communicating with one another, the second computer (802) operably communicating with the first (804) and second (805) distributed ledger computers, the first computer (801) capturing the first event data of the supply chain process, and obtaining the first attribute of the supply chain process that is stored therein, the first computer (801) sending a first message to the second computer (802), the first message having the first attribute therein, the second computer (802) obtaining the second attribute of the supply chain process utilizing the first attribute in response to the first message, and sending a second message to the first computer (801) in response to the first message, the second message having the second attribute therein, the first computer (801) making the first determination to either maintain a first course of action in the supply chain process or to change the first course of action in the supply chain process utilizing the first event data and the first and second attributes, the first computer (801) generating the first record having the first event data, the first and second attributes, and the first determination, the first computer (801) splitting the first record into second and third records, the first computer (801) calculating a first hash value of the second record, and sending a third message with the first hash value therein to the first distributed ledger computer (804), the first computer (801) calculating a second hash value of the third record, and sending a fourth message with the second hash value therein to the second distributed ledger computer (805), the first distributed ledger computer (804) adding the first hash value to a first block and broadcasting the first block to a plurality of nodes (809) of the first distributed ledger to validate and store the first block on the first distributed ledger, in response to the third message, and the second distributed ledger computer (805) adding the second hash value to a second block and broadcasting the second block to a plurality of nodes (808) of the second distributed ledger to validate and store the second block on the second distributed ledger, in response to the fourth message.

In certain embodiments a system for supply chain event management comprises a computing system operably communicating with the first (804) and second (805) distributed ledger computers, the first distributed ledger computer (804) being a node of a first distributed ledger (809), the second distributed ledger computer (805) being a node of a second distributed ledger (808), the computing system capturing first event data of a supply chain process and obtaining a first attribute of the supply chain process that is stored therein, the computing system obtaining a second attribute of the supply chain process utilizing the first attribute, the computing system making a first determination to either maintain a first course of action in the supply chain process or to change the first course of action in the supply chain process utilizing the first event data and the first and second attributes, the computing system generating a first record having the first event data, the first and second attributes, and the first determination, the computing system calculating a first hash value of the first record, and splitting the first hash value into second and third hash values, the computing system sending the second hash value to the first distributed ledger computer (804), and sending the third hash value to the second distributed ledger computer (805), the first distributed ledger computer (804) adding the second hash value to a first block and broadcasting the first block to a plurality of nodes (809) of the first distributed ledger to validate and store the first block on the first distributed ledger, and the second distributed ledger computer (805) adding the third hash value to a second block and broadcasting the second block to a plurality of nodes (808) of the second distributed ledger to validate and store the second block on the second distributed ledger.

In one embodiment the computing system includes first (801) and second (802) computer operably communicating with one another, the second computer (802) operably communicating with the first (804) and second (805) distributed ledger computers, the first computer (801) capturing the first event data of the supply chain process and obtaining the first attribute of the supply chain process that is stored therein, the first computer (801) sending a first message to the second computer (802), the first message having the first attribute therein, the second computer (802) obtaining the second attribute of the supply chain process utilizing the first attribute in response to the first message, and sending a second message to the first computer (801) in response to the first message, the second message having the second attribute therein, the first computer (801) making the first determination to either maintain the first course of action in the supply chain process or to change the first course of action in the supply chain process utilizing the first event data and the first and second attributes, the first computer (801) generating the first record having the first event data, the first and second attributes, and the first determination, the first computer (801) calculating the first hash value of the first record, and splitting the first hash value into second and third hash values, the first computer (801) sending a third message having the second hash value therein to the first distributed ledger computer (804), and sending a fourth message having the third hash value therein to the second distributed ledger computer (805), the first distributed ledger computer (804) adding the second hash value to the first block and broadcasting the first block to the plurality of nodes (809) of the first distributed ledger to validate and store the first block on the first distributed ledger, in response to the third message, and the second distributed ledger computer (805) adding the third hash value to the second block and broadcasting the second block to the plurality of nodes (808) of the second distributed ledger to validate and store the second block on the second distributed ledger, in response to the fourth message.

In one embodiment a system for supply chain event management comprises a computing system operably communicating with the first (804) and second 9805) distributed ledger computers, the first distributed ledger computer (804) being a node of a first distributed ledger (809), the second distributed ledger computer (805) being a node of a second distributed ledger (808), the computing system capturing first event data of a supply chain process and obtaining a first attribute of the supply chain process that is stored therein, the computing system obtaining a second attribute of the supply chain process utilizing the first attribute, the computing system making a first determination to either maintain a first course of action in the supply chain process or to change the first course of action in the supply chain process utilizing the first event data and the first and second attributes, the computing system generating a first record having the first event data, the first and second attributes, and the first determination, the computing system sending a third message with the first record therein to the first distributed ledger computer (804), and sending a fourth message with the first record therein to the second distributed ledger computer (805), the first distributed ledger computer (804) adding the first record to a first block and broadcasting the first block to a plurality of nodes (809) of the first distributed ledger to validate and store the first block on the first distributed ledger, in response to the third message and the second distributed ledger computer (804) adding the first record to a second block and broadcasting the second block to a plurality of nodes (808) of the second distributed ledger to validate and store the second block on the second distributed ledger, in response to the fourth message.

In certain embodiments the computing system includes first (801) and second (802) computer operably communicating with one another, the second computer (802) operably communicating with the first (804) and second (805) distributed ledger computers, the first computer (801) capturing the first event data of the supply chain process and obtaining the first attribute of the supply chain process that is stored therein, the first computer (801) sending a first message to the second computer (802), the first message having the first attribute therein, the second computer (802) obtaining the second attribute of the supply chain process utilizing the first attribute in response to the first message, and sending a second message to the first computer (801) in response to the first message, the second message having the second attribute therein, the first computer (801) making the first determination to either maintain a first course of action in the supply chain process or to change the first course of action in the supply chain process utilizing the first event data and the first and second attributes, the first computer (801) generating the first record having the first event data, the first and second attributes, and the first determination, the first computer (801) sending a third message with the first record therein to the first distributed ledger computer (804), and sending a fourth message with the first record therein to the second distributed ledger computer (805), the first distributed ledger computer (804) adding the first record to the first block and broadcasting the first block to the plurality of nodes (809) of the first distributed ledger to validate and store the first block on the first distributed ledger, in response to the third message, and the second distributed ledger computer (805) adding the first record to the second block and broadcasting the second block to the plurality of nodes (808) of the second distributed ledger to validate and store the second block on the second distributed ledger, in response to the fourth message.

In one embodiment a system for supply chain event management comprises a computing system operably communicating with the first (801) and second (802) distributed ledger computers, the first distributed ledger computer (801) being a node of a first distributed ledger (809), the second distributed ledger computer (805) being a node of a second distributed ledger (808), the computing system capturing first event data of a supply chain process and obtaining a first attribute of the supply chain process that is stored therein, the computing system obtaining a second attribute of the supply chain process utilizing the first attribute, the computing system making a first determination to either maintain a first course of action in the supply chain process or to change the first course of action in the supply chain process utilizing the first event data and the first and second attributes, the computing system generating a first record having the first event data, the first and second attributes, and the first determination, the computing system splitting the first record into second and third records, the computing system sending a third message with the second record therein to the first distributed ledger computer (804), and sending a fourth message with the third record therein to the second distributed ledger computer (805), the first distributed ledger computer (804) adding the second record to a first block and broadcasting the first block to a plurality of nodes (809) of the first distributed ledger to validate and store the first block on the first distributed ledger, in response to the third message, and the second distributed ledger computer (805) adding the third record to a second block and broadcasting the second block to a plurality of nodes (808) of the second distributed ledger to validate and store the second block on the second distributed ledger, in response to the fourth message.

In certain embodiments the computing system includes first (801) and second (802) computer operably communicating with one another, the second computer (802) operably communicating with the first (801) and second (802) distributed ledger computers, the first computer (801) capturing the first event data of the supply chain process and obtaining a first attribute of the supply chain process that is stored therein, the first computer (801) sending a first message to the second computer (802), the first message having the first attribute therein, the second computer (802) obtaining the second attribute of the supply chain process utilizing the first attribute in response to the first message, and sending a second message to the first computer (801) in response to the first message, the second message having the second attribute therein, the first computer (801) making the first determination to either maintain a first course of action in the supply chain process or to change the first course of action in the supply chain process utilizing the first event data and the first and second attributes, the first computer (801) generating the first record having the first event data, the first and second attributes, and the first determination, the first computer (801) splitting the first record into second and third records, the first computer (801) sending a third message with the second record therein to the first distributed ledger computer (804), and sending a fourth message with the third record therein to the second distributed ledger computer (805), the first distributed ledger computer (804) adding the second record to the first block and broadcasting the first block to the plurality of nodes (809) of the first distributed ledger to validate and store the first block on the first distributed ledger, in response to the third message, and the second distributed ledger computer adding the third record to the second block and broadcasting the second block to the plurality of nodes (808) of the second distributed ledger to validate and store the second block on the second distributed ledger, in response to the fourth message.

Referring to FIG. 14, another embodiment of the present invention comprising a distributed ledger for supply chain event data is shown. System 1400 comprises of three computers used in the capture, formatting, processing, analysis, monitoring, decision-making, hashing, sharing and storing of event data on a distributed ledger. Event data may be captured, processed, analyzed, external data (1404) being accessed, one or more decisions being made, or stored on a first computer (1401), then being sent to a third computer (1403) comprising a distributed ledger for storage and connecting to a network of nodes on a distributed ledger (1405), and a second computer (1402) for monitoring other computers. The embodiment of the present invention shown in System 1400 functions as described in System 300 with the exception that five separate computers for capture, processing, analysis, access to external data, decision-making and storage have been combined into one computer (1401).

In certain embodiments the computing system further comprises a second computer (1402) that operably communicates with the first computer (1401), the second computer (1402) displaying the first record, and receiving the input data that indicates a second determination relating to the first course of action of the supply chain process, and sending a second message having the second determination therein to the first computer (1401), the first computer (1401) further operably communicating with an external data source (1404), the first computer (1401) obtaining a third attribute of the supply chain process from the external data source (1404), the first computer (1401) generating a second record having the first event data, the first, second and third attributes, and the first and second determinations, and storing the second record therein, the first computer (1401) sending a fourth message having the second record therein to the distributed ledger computer (1403), and the distributed ledger computer (1403) adding the second record to a second block and broadcasting the second block to the plurality of nodes (1405) of the distributed ledger to validate and store the second block on the distributed ledger.

Referring to FIG. 22, shown is Block Diagram 2200 comprising a flow to illustrate a practical example in reference to system 1400 for the capture of raw event data (101) and additional attributes for the creation of processed event data (102) to enable decision-making by an operator. Block diagram 2200 comprises of nine steps to capture, process, analyze and share raw event (101) loading photos for a supply chain asset in a freight transportation process. Raw loading event data (101) may be captured by a still image camera attached to a driver communication device or portable computer for example. The driver uses this first computer (1401) to take several images of freight being loaded onto a trailer (2201). The first computer (1401) processes the photo files and additional data such as vehicle identifier (Vehicle-ID), user identifier (User-ID), location, process identifier (Process-ID), or a date and time stamp (2202). The first computer (1401) may request additional event attributes such as a bill of lading (BOL) or standard operating procedure (SOP) from an access external data source in this particular example interfacing into a transportation management system controlled and operated by the shipper of the freight (2203). The first computer (1401) then processes the raw event data (101) and additional attributes into processed event data (102) which it sends it to a second computer (1402, 2204). A second computer (1402) displays the processed event data (102), which includes the photo files, bill of lading and standard operating procedure to a human operator (2205). The human operator assesses the processed event data (102) and determines that the pallets have been secured safely to the supply chain asset (2206). The human operator documents his decision, for example by indicating to a computer software that the pallets are safe (2206). Not shown in Block Diagram 2200 is that the human operator decision can be documented on a second computer (1402) in some embodiments of the present invention. In other embodiments of the present invention a second computer (1402) may only serve as an information display computer that allows access to a first computer (1401) for the human operator. Shown again in Block Diagram 2200, the first computer (1401) adds the decision to the already existing raw event data (101) and processed event (102) data and then creates a hash (202) of all available data and stores all data and the hash (202) (2207). A first computer (1401) then sends the hash (202) to a third computer (1403) comprising a distributed ledger (2208). A third computer (1403) comprising a distributed ledger writes the hash (202) on a distributed ledger (2209). An index of abbreviations used in the diagram is shown in (2210).

Not shown in Block Diagram 2200, a software program may perform the activities of assessing that the materials have been properly loaded and secured onto the trailer of a supply chain asset (2206). Further not shown, once a human operator or software program validates that all materials were properly loaded, a first computer (1401) may also send a notification of the results of the analysis to the owner or operator of the supply chain asset, a shipper, a carrier and the recipient of the freight. Still further not shown in Block Diagram 2200, a multitude of additional parties including, but not limited to, a freight forwarder, a broker, or an end-user of the materials may also be notified by a first computer (1401). Still further not shown are cases where materials are not properly secured to a supply chain asset. Still further not shown in Block Diagram 2200, a third computer (1403) comprising a distributed ledger may receive raw event data (101), processed event data (102), a result of an analysis, a decision, or other data relevant to the operation of a supply chain asset in the form of whole data (203) to store on a distributed ledger.

Referring to FIG. 15, another embodiment of the present invention comprising a distributed ledger for supply chain event data is shown. System 1500 comprises of two computers used in the capture, formatting, processing, analysis, monitoring, decision-making, hashing, sharing and storing of event data on a distributed ledger. Event data may be captured, processed, analyzed, external data (1503) being accessed, one or more decisions being made, monitoring being performed, or data stored on a first computer (1501), then being sent to a third computer (1502) comprising a distributed ledger for storage and connecting to a network of nodes on a distributed ledger (1504). The embodiment of the present invention shown in System 1500 functions as described in System 300 with the exception that six separate computers for capture, processing, analysis, access to external data, decision-making, monitoring and storage have been combined into one computer (1401).

In certain embodiments the first computer (1501) displaying the first record, and receiving the input data that indicates a second determination relating to the first course of action of the supply chain process, the first computer (1501) further operably communicating with an external data source (1503), the first computer (1501) obtaining a third attribute of the supply chain process from the external data source (1503), the first computer (1501) generating a second record having the first event data, the first, second and third attributes, and the first and second determinations, and storing the third record therein, the first computer (1501) sending a fourth message having the second record therein to the distributed ledger computer (1502), and the distributed ledger computer (1502) adding the second record to a second block and broadcasting the second block to the plurality of nodes (1504) of the distributed ledger to validate and store the second block on the distributed ledger.

In one embodiment the supply chain process is a transport of freight, the first event data is a digital photograph captured during the supply chain process, the first attribute is a process identifier of the supply chain process, the second attribute is a second record providing a description of the supply chain process, the first course of action is a transporting of freight by the supply chain process from a departure location to a destination location, and the first computer (1501) making the first determination to either maintain the first course of action or to change the first course of action based on the digital photograph of the supply chain process, the process identifier, and the description of the supply chain process.

Referring to FIG. 23, shown is Block Diagram 2300 comprising a flow to illustrate a practical example in reference to system 1500 for the capture of raw event data (101) and additional attributes for the creation of processed event data (102) to enable decision-making by an operator. Block diagram 2300 comprises of nine steps to capture, process, analyze and share raw event (101) loading photos for a supply chain asset in a freight transportation process. Raw loading event data (101) may be captured by a still image camera attached to a driver communication device or portable computer for example. The driver uses this first computer (1501) to take several images of freight being loaded onto a trailer (2301). The first computer (1501) processes the photo files and additional data such as vehicle identifier (Vehicle-ID), user identifier (User-ID), location, process identifier (Process-ID), or a date and time stamp (2302). The first computer (1501) may request additional event attributes such as a bill of lading (BOL) or standard operating procedure (SOP) from an access external data source in this particular example interfacing into a transportation management system controlled and operated by the shipper of the freight (2303). The first computer (1501) then processes the raw event data (101) and additional attributes into processed event data (102) (2304). A first computer (1501) displays the processed event data (102), which includes the photo files, bill of lading and standard operating procedure to a human operator (2305). The human operator assesses the processed event data (102) and determines that the pallets have been secured safely to the supply chain asset (2306). The human operator documents his decision, for example by indicating to a first computer (1501) that the pallets are safe (2306). The first computer (1501) adds the decision to the already existing raw event data (101) and processed event (102) data and then creates a hash (202) of all available data and stores all data and the hash (202) (2307). A first computer (1501) then sends the hash (202) to a second computer (1502) comprising a distributed ledger (2308). A second computer (1502) comprising a distributed ledger writes the hash (202) on a distributed ledger (2309). An index of abbreviations used in the diagram is shown in (2310).

Not shown in Block Diagram 2300, a software program may perform the activities of assessing that the materials have been properly loaded and secured onto the trailer of a supply chain asset (2306). Further not shown, once a human operator or software program validates that all materials were properly loaded, a first computer (1501) may also send a notification of the results of the analysis to the owner or operator of the supply chain asset, a shipper, a carrier and the recipient of the freight. Still further not shown in Block Diagram 2300, a multitude of additional parties including, but not limited to, a freight forwarder, a broker, or an end-user of the materials may also be notified by a first computer (1501). Still further not shown are cases where materials are not properly secured to a supply chain asset. Still further not shown in Block Diagram 2300, a second computer (1502) comprising a distributed ledger may receive raw event data (101), processed event data (102), a result of an analysis, a decision, or other data relevant to the operation of a supply chain asset in the form of whole data (203) to store on a distributed ledger.

Referring to FIG. 16, another embodiment of the present invention comprising a distributed ledger for supply chain event data is shown. System 1600 comprises of one computer used in the capture, formatting, processing, analysis, monitoring, decision-making, hashing, sharing and storing of event data on a distributed ledger. Event data may be captured, processed, analyzed, external data (1602) being accessed, one or more decisions being made, monitoring being performed, or data stored on a first computer (1601) comprising a distributed ledger for storage and connecting to a network of nodes on a distributed ledger (1603) as well. The embodiment of the present invention shown in System 1600 functions as described in System 300 with the exception that seven separate computers for capture, processing, analysis, access to external data, decision-making, monitoring, storage and storage on a distributed ledger have been combined into one computer (1601).

In one embodiment a system for supply chain event management comprises a first computer (1601) capturing first event data of a supply chain process, and obtaining first and second attributes of the supply chain process that are stored therein, the first computer (1601) making a first determination to either maintain a first course of action in the supply chain process or to change the first course of action in the supply chain process utilizing the first event data and the first and second attributes, the first computer (1601) generating a first record having the first event data, the first and second attributes, and the first determination, and storing the first record therein, and the first computer (1601) adding the first record to a first block and broadcasting the first block to the plurality of nodes (1603) of a distributed ledger to validate and store the first block on the distributed ledger.

In certain embodiments the first computer (1601) calculating a hash value of the first record, and the first computer (1601) adding the hash value to a second block and broadcasting the second block to the plurality of nodes (1603) of the distributed ledger to validate and store the second block on the distributed ledger.

In one embodiment the first computer (1601) operably communicating with an external data source (1602), the first computer (1601) obtaining a third attribute of the supply chain process from the external data source (1602), the first computer (1601) generating a second record having the first event data, the first, second and third attributes, and the first and second determinations, and storing the second record therein, and the first computer (1601) adding the second record to a second block and broadcasting the second block to the plurality of nodes (1603) of the distributed ledger to validate and store the second block on the distributed ledger.

In certain embodiments the supply chain process is a transport of freight, the first event data is a digital photograph captured during the supply chain process, the first attribute is a process identifier of the supply chain process, the second attribute is a second record providing a description of the supply chain process, the first course of action is a transporting of freight by the supply chain process from a departure location to a destination location, and the first computer (1601) making the first determination to either maintain the first course of action or to change the first course of action based on the digital photograph of the supply chain process, the process identifier, and the description of the supply chain process.

Referring to FIG. 24, shown is Block Diagram 2400 comprising a flow to illustrate a practical example in reference to system 1600 for the capture of raw event data (101) and additional attributes for the creation of processed event data (102) to enable decision-making by an operator. Block diagram 2400 comprises of eight steps to capture, process, analyze and share raw event (101) loading photos for a supply chain asset in a freight transportation process. Raw loading event data (101) may be captured by a still image camera attached to a driver communication device or portable computer for example. The driver uses this first computer (1601) comprising a distributed ledger to take several images of freight being loaded onto a trailer (2401). The first computer (1601) comprising a distributed ledger processes the photo files and additional data such as vehicle identifier (Vehicle-ID), user identifier (User-ID), location, process identifier (Process-ID), or a date and time stamp (2402). The first computer (1601) comprising a distributed ledger may request additional event attributes such as a bill of lading (BOL) or standard operating procedure (SOP) from an access external data source in this particular example interfacing into a transportation management system controlled and operated by the shipper of the freight (2403). The first computer (1601) comprising a distributed ledger then processes the raw event data (101) and additional attributes into processed event data (102) (2404). A first computer (1601) comprising a distributed ledger displays the processed event data (102), which includes the photo files, bill of lading and standard operating procedure to a human operator (2405). The human operator assesses the processed event data (102) and determines that the pallets have been secured safely to the supply chain asset (2406). The human operator documents his decision, for example by indicating to a first computer (1601) comprising a distributed ledger that the pallets are safe (2406). The first computer (1601) comprising a distributed ledger adds the decision to the already existing raw event data (101) and processed event (102) data and then creates a hash (202) of all available data and stores all data and the hash (202) (2407). A first computer (1601) comprising a distributed ledger writes the hash (202) on a distributed ledger (2409). An index of abbreviations used in the diagram is shown in (2409).

Not shown in Block Diagram 2400, a software program may perform the activities of assessing that the materials have been properly loaded and secured onto the trailer of a supply chain asset (2406). Further not shown, once a human operator or software program validates that all materials were properly loaded, a first computer (1601) comprising a distributed ledger may also send a notification of the results of the analysis to the owner or operator of the supply chain asset, a shipper, a carrier and the recipient of the freight. Still further not shown in Block Diagram 2400, a multitude of additional parties including, but not limited to, a freight forwarder, a broker, or an end-user of the materials may also be notified by a first computer (1601) comprising a distributed ledger. Still further not shown are cases where materials are not properly secured to a supply chain asset. Still further not shown in Block Diagram 2400, a first computer (1601) comprising a distributed ledger may receive raw event data (101), processed event data (102), a result of an analysis, a decision, or other data relevant to the operation of a supply chain asset in the form of whole data (203) to store on a distributed ledger.

Referring to FIG. 9, shown is a Block Diagram 900 comprising a flow for storing a hash of a captured supply chain event data on a public distributed ledger in reference to System 300. The flow shown in Block Diagram 900 begins with a first computer (301) capturing raw event data (101) and one or more attributes (901), then sending the raw event data (101) and one or more attributes to a second computer (302) (902). A second computer (302) requests further attributes comprising additional raw events, additional processed events, one or more meta events, one or more results from an analysis, one or more decision, or other data relevant to the operation and execution of a supply chain process at the time the original raw event data (101) was captured from a seventh computer (315) to access external systems. Upon receipt of the requested data, a second computer (302) creates processed event data (102), which it sends to a third computer (303) for analysis and decision-making (903). A third computer (303) analyzes the processed event data (102), decides on a course of action and notifies all parties (904). A third computer (303) then packages the processed event (102), results of an analysis and decision into one or more files and applies a hashing function to create a hash representing the processed event (102) (905). A third computer (303) then sends the processed event data (102) file or files to a fourth computer for storage (906). A third computer (303) then sends the hash of the processed event data (102) to a sixth computer (319) comprising a public distributed ledger with a request to add the hash to a public distributed ledger (907). A sixth computer (319) comprising a public distributed ledger adds the hash of the processed event data (102) to a block and broadcasts the transaction to a network of nodes (908). The nodes in a network validate the transaction and add the hash of the processed event data (102) to their respective blocks (909). As a result, a hash of supply chain event data has been added to a block and to a public distributed ledger (910). Not shown in block diagram 900 is a case when whole event data is added to a public or private distributed ledger or when hashed event data is added to a private distributed ledger. An index of abbreviations used in the diagram is shown in (911).

A practical example of the above block diagram may be when a supply chain asset encounters an obstacle during a transport transaction. A device or computer such as a smartphone or tablet computer used by the supply chain asset operator may detect that the velocity of the supply chain asset has decreased from average travel speeds to a stop and go behavior while the supply chain asset is on a highway. Causes for a slowdown may be heavy traffic, accidents or road construction. The device may send the raw event data of a new travel speed along with the supply chain asset ID and a physical location to a first server, which may then determine that it requires additional detailed traffic data from an external system specifically designed to provide traffic congestion, accident and construction information. When the additional external event data is received by the first server, it may determine that an accident has occurred and that travel times are extended by two or more hours on the particular stretch of highway where the supply chain asset is currently located. The raw event data obtained from the device has already been processed into processed event data through the addition of attributes about the supply chain asset and its location. It is now further processed through the addition of attributes from an external data source. A second server may assess the raw event data and processed event data to determine that a planned ETA may no longer be attainable and may calculate a new ETA. The raw event data, attributes and results of analysis may then be packaged into a data file by the second server. The second server then creates a hash representing the data file and sends the data file and hash to a third server comprising a database for storage. The second server also sends the hash to a computer comprising a public distributed ledger and requests that the hash be added to a block. The computer comprising a public distributed ledger adds the hash to a block and broadcasts the transaction to a network of nodes, which in turn validates the transaction and adds the hash to its blocks. The hash is now added to a public distributed ledger and the second computer may then send it to all parties involved in the transaction to notify them of the updated ETA. The recipient of the materials, for example, may use the hash to request the data file from a third server storing the data file and may determine whether to request a change in the course of action or to maintain the initial course of action. For example, the recipient of the materials may request that the supply chain asset slow down to arrive at a later time than the new ETA to accommodate changes in its business process.

Referring to FIG. 10, shown is Block Diagram 1000 comprising a flow to illustrate a practical example for loading of materials in a transportation process for supply chain assets in reference to system 300. Block diagram 1000 comprises of ten steps to capture, process, analyze and share a raw loading event (101) for a supply chain asset in a freight transportation process. Raw loading event data (101) may be captured by a video camera mounted in the back of a trailer that may be triggered by light, motion or weight sensors, or any combination thereof, to begin recording as soon as loading activity is detected (1001). A first computer (301) to which the video camera may connect may process the original video file for transmission, for example by compressing the file or by taking out sequences without activity, and may add attributes such as a vehicle identifier (Vehicle-ID), a vehicle location (Location), a camera identifier (camera ID), a transaction or process identifier (process ID), or a date and time stamp (1002). A first computer (301) then sends the raw event data (101) and additional data to a second computer (302) for processing (1003). A second computer (302) may request additional event attributes such as a bill of lading (BOL), transport order (TO), or handling instructions from a seventh computer (315) to access external systems, in this particular example interfacing into a transportation management system controlled and operated by the shipper of the freight (1004). A seventh computer (315) to access external data interfaces into a shipper transportation management system, which looks up the respective files based on a transaction or process identifier, collects the requested data and files (1005), processes them for transmission and sends them to a seventh computer (315) to access external data, which in turn sends them to a second computer (302) as one package (1006). A second computer (302) adds the additional files to the existing raw loading event data (101) captured on video and its already established attributes (1007). A second computer (302) then assembles the available data into one or more electronic files to create processed event data (102), which it sends to a third computer (303) for analysis (1008). In one embodiment of the present invention, a third computer (303) may be operated and controlled by a human operator, in which case the operator may assess the processed event data (102) to ensure that all materials have been properly loaded onto the supply chain asset, that they have been properly secured on the trailer, or that special handling instructions were correctly adhered to (1009). In another embodiment of the present invention, a software program may perform the activities of assessing that the materials have been properly loaded onto the trailer of a supply chain asset (1009). Once a human operator or software program validate that all materials were properly loaded, a third computer (303) may send a notification of the results of the analysis to the owner or operator of the supply chain asset, a shipper, a carrier and the recipient of the freight (1010) at a minimum. An index of abbreviations used in the diagram is shown in (1011).

Not shown in Block Diagram 1000, a seventh computer (315) providing access to and, in some embodiments of the present invention, an interface into external data sources may now also be updated. For example, a third computer (303) may add an estimated time of arrival to a loading complete notification that is sent to a seventh computer (315). Further not shown in Block Diagram 1000, a fourth computer (304) may receive processed event data (102) to store it. Still further not shown in Block Diagram 1000, a multitude of additional parties including, but not limited to, a freight forwarder, a broker, or an end-user of the materials may also be notified by a third computer (303). Still further not shown in Block Diagram 1000, a shipper transportation management system may be updated with an estimated time of arrival by a seventh computer (315) to access external systems as well. Still further not shown in Block Diagram 1000 is a case when a verification of a loading process does not occur because materials may be missing or visibly damaged, or because special handling instructions, for example the use of an air ride trailer or the use of straps to secure freight, were not completely observed. In this scenario, a third computer (303) may alert all relevant parties that one or more corrective actions are necessary before the supply chain asset may leave a loading dock area. The resulting execution of corrective measures, possibly ranging from an exchange of materials to a stricter adherence to special instructions, comprises new raw loading event data (101) and the process described in Block Diagram 1000 may now repeat itself until a loading process has been successfully completed. As a potential consequence, a new course of action may now become necessary in case the repeated loading process exceeds a time limit available for a timely delivery of the materials at a recipient location. This, too, may trigger an exception process to prepare the recipient for delays in the arrival of the materials. Still further not shown in Block Diagram 1000, a sixth computer (319) comprising a distributed ledger may receive raw event data (101), processed event data (102), a result of an analysis, a decision, or other data relevant to the operation of a supply chain asset in the form of a hash (202) or whole event (203) to store on a distributed ledger.

Referring to FIG. 11, shown is a block diagram 1100 comprising a flow for storing a hash of captured supply chain event data on a public distributed ledger in reference to System 600. The flow shown in Block Diagram 1100 begins with a first computer (601) capturing a raw event (101) and one or more attributes (1101). A first computer (601) then determines whether further processing of the raw event is necessary (1102), which it may not in cases where only a raw event (101) may be added to a public distributed ledger. In cases where a raw event (101) may be transformed into a processed event (102), either the attributes captured by a first computer (601) suffice to create a processed event (102) (1103) or a first computer (601) may request further attributes comprising additional raw events, additional processed events, one or more meta events, one or more results from an analysis, one or more decisions, or other data relevant to the operation and execution of a supply chain process at the time the original raw event (101) was captured from a fifth computer (604) interfacing into external data sources (1104). A first computer (601) then analyzes the raw event (101) or processed event (102), decides on a course of action, formats the raw event (101) or processed event (102) and applies a hashing function to create a hash representing the raw event (101) or processed event (102) (1105). Not shown in block diagram 1100 is the possibility that a first computer (601) may also notify all affected parties of a decision on a course of action. A first computer (601) then sends the formatted raw event (101) or formatted processed event (102) and the respective hash to a second computer (602) for storage (1106). A first computer (601) then sends the hash of the raw event (101) or processed event (102) to a fourth computer (605) comprising a public distributed ledger with a request to add the hash to a public distributed ledger (1107). A fourth computer (605) comprising a public distributed ledger adds the hash of the raw event (101) or processed event (102) to a block and broadcasts the transaction to a network of nodes (1108). The nodes in a network validate the transaction and add the hash of the raw event (101) or processed event (102) to their respective blocks (1109). As a result, a hash of supply chain event data has been added to a block and to a public distributed ledger (1110). Not shown in block diagram 1100 is a case when a whole event is added to a public or private distributed ledger or when a hashed event is added to a private distributed ledger. An index of abbreviations used in the diagram is shown in (1111).

An example of the embodiment of the present invention shown in Block Diagram 1100 may be the continuous addition of a GPS location coordinates to a blockchain while a supply chain asset is on a route from an origin location to a destination location. Especially when high-value items are transported or when an insurance company may require an immutable record of progress along a route, this may be the case. Once a supply chain asset such as a delivery truck is ready to leave an origin location where it has loaded freight, an operator of the supply chain asset may engage a first computer (601) such as a smart phone or tablet computer to capture, process, format, store and share a first set of GPS coordinates. A first computer (601) then captures a pair of latitude and longitude coordinates along with a date and time stamp. A first computer (601) may now also add additional attributes including, but not limited to, a transaction identifier, a shipping order, a bill of lading, a shipper, a carrier, a recipient, a loading manager signature, a supply chain asset identifier and a supply chain asset operator identifier. A first computer (601) then processes the raw event data (101) and attributes into processed event data (102) and formats the processed event data (102) by combining it onto a first computer file. A first computer (601) then applies a hashing function to create a first hash uniquely describing the contents of the first computer file. A first computer (601) then sends the first computer file and first hash to a second computer (602) for storage. Not shown in Block Diagram 1100, a first computer (601) may also send the first computer file and first hash to a fifth computer (604) to access external data so that a fifth computer (604) to access external data may send the first computer file and first hash to a computer operated by an insurance company. Shown again in Block Diagram 1100, a first computer (601) then requests that the first hash be added to public distributed ledger by a fourth computer (605) comprising a distributed ledger. A fourth computer (605) comprising a distributed ledger adds the first hash to a block and broadcasts the transaction to a network of nodes, which in turn validate the transaction and add the hash to their blocks. As a result, the first hash has been added to a public distributed ledger. This process may now repeat itself each time new GPS location coordinates have been captured, which provides a consistent view of how the supply chain asset progresses from an origin location to a destination location, until the supply chain asset reaches its location. Not shown in Block Diagram 1100, an operator of a supply chain asset using a first computer (601) may add additional raw event data (101), additional processed event data (102), or additional attributes at various points along the route to further document the progress of the supply chain asset towards its location.

Referring to FIG. 12, shown is a Block Diagram 1200 comprising a flow for storing a hash of event data on two or more public distributed ledgers in reference to system 800. The flow shown in Block Diagram 1200 begins with a first computer (801) capturing raw event data (101) and one or more attributes (1201). A first computer (801) then determines whether further processing of the raw event data is necessary (1202), which may not be the case when only the raw event data (101) may be added to a two or more distributed ledgers. In cases where raw event data (101) may be transformed into processed event data (102), either the attributes captured by a first computer (801) suffice to create processed event data (102) (1203) or a first computer (801) may request further attributes comprising additional raw event data, additional processed event data, additional meta event data, one or more results from analysis, one or more decision, one or more hashes, or other data relevant to the operation and execution of a supply chain process at the time the initial raw event data (101) was captured from a sixth computer (806) to access external data (1204). A first computer (801) then analyzes the raw event data (101) or processed event data (102), decides on a course of action, formats the raw event data (101) or processed event data (102) and applies a hashing function to create a hash representing the raw event data (101) or processed event data (102) (1205). Not shown in Block Diagram 1200 is the possibility that a first computer (801) may also notify affected parties of a decision on a course of action. Shown again in Block Diagram 1200, a first computer (801) then sends the formatted raw event data (101) or formatted processed event data (102) and the hash to a second computer (802) for storage (1206). A first computer (801) then sends the hash to a fourth computer (804) comprising a first public distributed ledger with a request to add the hash to a first public distributed ledger (1207). A fourth computer (804) comprising a first public distributed ledger adds the hash to a block and broadcasts the transaction to a first network of nodes (1208). The nodes in a first network validate the transaction and add the hash to their respective blocks (1209). As a result, a hash of supply chain event data has been added to a block and to a first public distributed ledger (1210). A first computer (801) then sends the hash to a fifth computer (805) comprising a second public distributed ledger with a request to add the hash to a second public distributed ledger (1211). A fifth computer (805) comprising a second public distributed ledger adds the hash to a block and broadcasts the transaction to a second network of nodes (1212). The nodes in a second network validate the transaction and add the hash to their respective blocks (1213). As a result, a hash of supply chain event data has been added to a block and to a second public distributed ledger (1214). An index of abbreviations used in the diagram is shown in (1215).

A practical example of when event data that may be stored on one or more distributed ledger is that different parties involved in the operation and execution of a supply chain transaction may wish to use distributed ledgers in addition to the distributed ledger used by the present invention. Another example may be that different parties may prefer the use of different distributed ledger technologies, which would necessitate the writing of event data to more than one distributed ledger. Still another example may be that an implementation of the present invention may be based on the use of a private or permissioned distributed ledger while the event data that is being written to a private or permissioned distributed ledger may need to be made available to parties such as insurance or financing companies who may only have access a public distributed ledger.

Referring to FIG. 13, shown is a Block Diagram 1300 comprising a flow for storing a first hash of a first part of event data on a first public distributed ledger and storing a second hash of a second part of event data on a second public distributed ledger in reference to system 800. The flow shown in Block Diagram 1300 begins with a first computer (801) capturing raw event data (101) and one or more attributes (1301). A first computer (801) then determines whether further processing of the raw event data (101) is necessary (1302), which may not be the case when only raw event data (101) may be added in two or more parts to two or more distributed ledgers. In cases where raw event data (101) may be transformed into processed event data (102), either the attributes captured by a first computer (801) suffice to create a processed event (102) (1303) or a first computer (801) may request further attributes comprising additional raw event data, additional processed event data, one or more meta events, one or more results from analysis, one or more decision, one or more hashes, or other data relevant to the operation and execution of a supply chain process at the time the initial raw event data (101) was captured from a sixth computer (806) to access external data (1304). A first computer (801) then analyzes the raw event data (101) or processed event data (102), decides on a course of action, formats the raw event data (101) or processed event data (102) and then splits the raw event data (101) or processed event data (102) into two parts before applying a hashing function to each part to create two hashes representing the two separate parts of raw event data (101) or processed event data (102) (1305). Not shown in Block Diagram 1300 is a case where event data is first hashed and then the resulting hash is split into two parts. Further not shown in Block Diagram 1300 are cases where event data is spilt into more than two parts creating more than two hashes or where a hash representing all event data is split into more than two parts. Further not shown in Block Diagram 1300 is the possibility that a first computer (801) may also notify affected parties of a decision on a course of action. Shown again in Block Diagram 1300, a first computer (801) then sends the two parts of raw event data (101) or processed event data (102) along with their two respective hashes to a second computer (802) for storage (1306). A first computer (801) then sends a first hash to a fourth computer (804) comprising a first public distributed ledger with a request to add the first hash to a first public distributed ledger (1307). A fourth computer (804) comprising a first public distributed ledger adds the first hash to a block and broadcasts the transaction to a first network of nodes (1308). The nodes in a first network validate the transaction and add the first hash to their respective blocks (1309). As a result, a first hash of supply chain event data has been added to a block and to a first public distributed ledger (1310). A first computer (801) then sends the second hash to a fifth computer (805) comprising a second public distributed ledger with a request to add the second hash to a second public distributed ledger (1311). A fifth computer (805) comprising a second public distributed ledger adds the second hash to a block and broadcasts the transaction to a second network of nodes (1312). The nodes in a second network validate the transaction and add the second hash to their respective blocks (1313). As a result, a second hash of supply chain event data has been added to a block and to a second public distributed ledger (1314). An index of abbreviations used in the diagram is shown in (1315).

A practical example of splitting event data or hashes into two or more parts before storing each part on the same or two or more distributed ledgers may be based on information security considerations. The splitting of event data, which is then hashed separately or the hashing of event data, where a hash is then split into two or more parts, allows users to keep the data safe from parties who may not have permission to access any computer discussed in the present invention disclosure. Another practical consideration for the application of split event data or split hashes may be that a first hash or first part of a hash may be stored on a public distributed ledger while a second hash or second part of a hash me be stored on a private distributed ledger.

The use of the term "or" in the claims is used to mean "and/or" unless explicitly indicated to refer to alternatives only or the alternatives are mutually exclusive, although the disclosure supports a definition that refers to only alternatives and to "and/or." When used in conjunction with the word "comprising" or other open language in the claims, the words "a" and "an" denote "one or more," unless specifically noted. The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to, possessing only those one or more steps and also covers other unlisted steps.

Unless indicated otherwise, or otherwise clearly contradicted by context, the steps in the methods disclosed herein can be performed in any order.

What is claimed is:

1. A system for supply chain event management, comprising:
a computing system operably communicating with a distributed ledger computer, the distributed ledger computer being a node of a distributed ledger;
wherein the computing system captures an occurrence of a first event defined by first event data during an execution of a supply chain process from a network connected device, and obtains a first attribute and a second attribute of the supply chain process during the execution, where in the first attribute and the second attribute are specific to the occurrence of the first event and the network connected device, and wherein the first event data comprises raw event data including sensor data of an autonomous vehicle while the autonomous vehicle operates, and wherein the raw event data is converted into processed event data by enhancing the raw event data with one or more attributes of the supply chain process, wherein the processed event data is converted into meta event data by enhancing the processed event data with one or more attributes of the supply chain process, and
wherein each of the raw event data, the processed event data, and the meta event data is transformed as input data formatted for input into a decision-making program and that defines one or more patterns of the supply chain process;
wherein the decision-making program, executing on the computing system and upon receiving the formatted input data, makes a first determination to either maintain a first course of action in the supply chain process or to change the first course of action in the supply chain process utilizing the one or more patterns defined by the processed event data;
wherein the computing system utilizes a hashing function to generate a first by hashing an original event data value of least one of the raw event data, the processed event data, or the meta event data, in a blockchain format, to create a hash event data value;

wherein the computing system uploads the first event data and the hash event data value to the distributed ledger, wherein the first event data and the hash event data is stored on the distributed ledger in the blockchain format as a first record, and wherein the first event data is classified on the distributed ledger as different types of event data; and wherein the distributed ledger computer adds the first record to a first block using the first hash and broadcasts the first block to a plurality of nodes of the distributed ledger to validate and store the first block on the distributed ledger, and wherein the first hash and the first block are provided by the computing system to a set of additional parties that may access the first record.

2. The system of claim 1, wherein:

the computing system further displays the first record, and receives input data that indicates a second determination relating to the first course of action of the supply chain process;

the computing system operably communicates with an external data source, the computing system obtains a third attribute of the supply chain process from the external data source;

the computing system generates a second record having the first event data, the first, second, and third attributes, and the first and second determinations, and stores the second record therein;

the computing system sends the second record to the distributed ledger computer, and the distributed ledger computer adds the second record to a second block and broadcasts the second block to the plurality of nodes of the distributed ledger to validate and store the second block on the distributed ledger.

3. The system of claim 1, wherein:

the computing system captures second event data during the execution of the supply chain process, and obtains third and fourth attributes of the supply chain process;

the computing system makes a second determination to either maintain a second course of action in the supply chain process or to change the second course of action in the supply chain process utilizing the second event data and the third and fourth attributes;

the computing system generates a second record having the second event data, the third and fourth attributes, and the second determination, and stores the second record therein;

the computing systems sends the second record to the distributed ledger computer;

and the distributed ledger computer adds the second record to a second block and broadcasting the second block to the plurality of nodes of the distributed ledger to validate and store the second block on the distributed ledger.

4. The system of claim 1, wherein:

the computing system comprises first, second, third, and fourth computers operably communicating with one another, the third and fourth computer operably communicating with the distributed ledger computer;

the first computer captures the first event data during the execution of the supply chain process, and obtains the first attribute of the supply chain process that is stored therein;

the second computer second a second message to the fourth computer in response to the first message, the second message having the first attribute and requesting the second attribute of the supply chain process from the fourth computer;

the fourth computer obtains the second attribute stored therein utilizing the first attribute in response to the second message, and sends a third message to the second computer having the second attribute therein in response to the second message;

the second computer sends a fourth message to the third computer; the fourth message having the first event data and the first and second attributes of the supply chain process therein;

the third computer makes the first determination to either maintain the first course of action in the supply chain process or to change the first course of action in the supply chain process utilizing the first event data and the first and second attributes;

the third computer generates the first record having the first event data, the first and second attributes, and the first determination, and sends a fifth message having the first record therein to the fourth computer, and sends a sixth message having the first record therein to the distributed ledger computer;

the fourth computer stores the first record therein in response to the sixth message; and the distributed ledger computer adds the first record to the first block and broadcasts the first block to the plurality of nodes of the distributed ledger to validate and store the first block on the distributed ledger, in response to the sixth message.

5. The system of claim 4, wherein:

the computing system further comprises fifth and sixth computers that operably communicate with the first, second, third, and fourth computers;

the fifth computer displays the first record, and receives the input data that indicates the second determination relating to the first course of action of the supply chain process, and sends a seventh message having the second determination to the third computer;

the sixth computer operably communicating with an external data source, the sixth computer obtains a third attribute of the supply chain process from the external data source;

the sixth computer sends an eighth message having the third attribute therein to the third computer;

the third computer generates a second record having the first event data, the first, second and third attributes, and the first and second determinations, and stores the second record therein;

the computing system sends a ninth message having the second record therein to the distributed ledger computer; and the distributed ledger computer adds the second record to a second block and broadcasts the second block to the plurality of nodes of the distributed ledger to validate and store the second block on the distributed ledger.

6. The system of claim 4, wherein:

the supply chain process is a transport of freight;

the first event data is a digital photograph captured during the supply chain process;

the first attribute is a process identifier of the supply chain process;

the second attribute is a second record providing a description of the supply chain process;

the first course of action is a transporting of freight by the supply chain process from a departure location to a destination location; and the third computer makes the first determination to either maintain the first course of action or to change the first course of action based on the digital photograph of the supply chain process, the process identifier, and the description of the supply chain process.

7. The system of claim 1, wherein:
the computing system comprises first and second computers operably communicating with one another, the second computer operably communicating with the distributed ledger computer;
the first computer captures the first event data of the supply chain process and obtains the first attribute of the supply chain process that is stored therein; the first computer sending a first message to the second computer, the first message having the first attribute therein;
the second computer obtains the second attribute of the supply chain process utilizing the first attribute in response to the first message, and sends a second message to the first computer in response to the first message, the second message having the second attribute therein;
the first computer makes the first determination to either maintain the first course of action in the supply chain process or to change the first course of action in the supply chain process utilizing the first event data and the first and second attributes;
the first computer generates the first record having the first event data, the first and second attributes, and the first determination;
the first computer sends a third message having the first record therein to the second computer, and sends a fourth message having the first record therein to the distributed ledger computer;
the second computer stores the first record therein in response to the third message; and the distributed ledger computer adding the first record to the first block and broadcasts the first block to the plurality of nodes of the distributed ledger to validate and store the first block on the distributed ledger, in response to the fourth message.

8. The system of claim 7, wherein:
the computing system further comprises third and fourth computers that operably communicate with the second computer;
the third computer displays the first record, and receives the input data that indicates a second determination relating to the first course of action of the supply chain process, and sends a fifth message having the second determination therein to the second computer;
the fourth computer operably communicating with an external data source, the fourth computer obtaining a third attribute of the supply chain process from the external data source;
the fourth computer sends a sixth message having the third attribute therein to the second computer;
the second computer generates a second record having the first event data, the first, second and third attributes, and the first and second determinations, and stores the second record therein;
the second computer sends a seventh message having the third record therein to the distributed ledger; and
the distributed ledger computer adds the second record to a second block and broadcasts the second block to the plurality of nodes of the distributed ledger to validate and store the second block on the distributed ledger.

9. The system of claim 1, wherein:
the computing system comprises a first computer operably communicating with the distributed ledger computer;
the first computer captures the first event data of the supply chain process, and obtains the first and second attributes of the supply chain process that are stored therein;
the first computer makes the first determination to either maintain the first course of action in the supply chain process or to change the first course of action in the supply chain process utilizing the processed event data;
the first computer generates the first record having the first event data, the first and second attributes, and the first determination, and stores the first record therein;
the first computer sends a first message having the first record therein to the distributed ledger computer; and
the distributed ledger computer adds the first record to a first block and broadcasts the first block to the plurality of nodes of the distributed ledger to validate and store the first block on the distributed ledger, in response to the first message.

10. The system of claim 9, wherein:
the computing system further comprises second and third computers that operably communicate with the first computer;
the second computer displays the first record, and receives the input data that indicates a second determination relating to the first course of action of the supply chain process, and sends a second message having the second determination therein to the first computer;
the third computer operably communicating with an external data source, the third computer obtains a third attribute of the supply chain process from the external data source;
the third computer sends a third message having the third attribute therein to the first computer;
the first computer generates a second record having the first event data, the first, second and third attributes, and the first and second determinations, and stores the second record therein;
the first computer sends a fourth message having the second record therein to the distributed ledger computer; and
the distributed ledger computer adds the second record to a second block and broadcasts the second block to the plurality of nodes of the distributed ledger to validate and store the second block on the distributed ledger.

11. The system of claim 9, wherein:
the computing system further comprises a second computer that operably communicates with the first computer;
the second computer displays the first record, and receives the input data that indicates a second determination relating to the first course of action of the supply chain process, and sends a second message having the second determination therein to the first computer;
the first computer further operably communicating with an external data source, the first computer obtains a third attribute of the supply chain process from the external data source;
the first computer generates a second record having the first event data, the first, second and third attributes, and the first and second determinations, and storing the second record therein;
the first computer sends a fourth message having the second record therein to the distributed ledger computer; and the distributed ledger computer adds the second record to a second block and broadcasts the second block to the plurality of nodes of the distributed ledger to validate and store the second block on the distributed ledger.

12. The system of claim 9, wherein:
the first computer displays the first record, and receives the input data that indicates a second determination relating to the first course of action of the supply chain process;
the first computer further operably communicating with an external data source, the first computer obtains a third attribute of the supply chain process from the external data source;
the first computer generates a second record having the first event data, the first, second and third attributes, and the first and second determinations, and storing the third record therein;
the first computer sends a fourth message having the second record therein to the distributed ledger computer; and
the distributed ledger computer adds the second record to a second block and broadcasts the second block to the plurality of nodes of the distributed ledger to validate and store the second block on the distributed ledger.

13. A system for supply chain event management, comprising:
a first computer capturing an occurrence of a first event defined by first event data of a supply chain process from a network-connected device, and obtaining first and second attributes of the supply chain process that are stored therein on the network-connected device, wherein the first and second attributes are specific the occurrence of the first event,
wherein the first event data comprises raw event data including sensor data of an autonomous vehicle while the autonomous vehicle operates, and wherein the raw event data is converted into processed event data by enhancing the raw event data with one or more attributes of the supply chain process, wherein the processed event data is converted into meta event data by enhancing the processed event data with one or more attributes of the supply chain process,
wherein the first computer transforms each of the raw event data, the processed event data, and the meta data as input data formatted for input into a decision-making program and that defines one or more patterns of the supply chain process;
the decision-making program, executing on the first computer and upon receiving the formatted input data, making a first determination to either maintain a first course of action in the supply chain process or to change the first course of action in the supply chain process utilizing the one or more patterns defined by the first processed event data; and
wherein the first computer hashes an original event data value of least one of the raw event data, the processed event data, or the meta event data, in a blockchain format, to create a hash event data value;
wherein the first computer uploads the first event data and the hash event data value to a distributed ledger, wherein the first event data and the hash event data is stored on the distributed ledger in the blockchain format as a first record, and wherein the first record comprises one or more of the raw event data, the processed event data, or the meta event data and is classified on the distributed ledger as different types of event data,
the first computer adding the first record to a first block and broadcasting the first block to a plurality of nodes of the distributed ledger to validate and store the first block on the distributed ledger.

14. The system of claim 13, wherein:
the first computer operably communicating with an external data source, the first computer obtaining a third attribute of the supply chain process from the external data source;
the first computer generating a second record having the first event data, the first, second and third attributes, and the first and second determinations, and storing the second record therein; and
the first computer adding the second record to a second block and broadcasting the second block to the plurality of nodes of the distributed ledger to validate and store the second block on the distributed ledger.

15. A system for supply chain event management, comprising:
a computing system that operably communicates with a first distributed ledger computer and a second distributed ledger computer, the first distributed ledger computer being a node of a first distributed ledger, the second distributed ledger computer being a node of a second distributed ledger;
the computing system capturing an occurrence of a first event defined by first event data of a supply chain process from a first network connected device, and obtaining a first attribute of the supply chain process that is stored therein on the first network connected device;
the computing system obtaining a second attribute of the supply chain process from a second network connected device utilizing the first attribute, wherein the first attribute and the second attribute are specific the occurrence of the first event,
wherein the first event data comprises raw event data including sensor data of an autonomous vehicle while the autonomous vehicle operates, and wherein the raw event data is converted into processed event data by enhancing the raw event data with one or more attributes of the supply chain process, wherein the processed event data is converted into meta event data by enhancing the processed event data with one or more attributes of the supply chain process,
the computing system transforming each of the raw event data, the processed event data, and the meta data as input data formatted for input a decision-making program and that defines one or more patterns of the supply chain process;
the decision-making program, executing on the computing system and upon receiving the formatted input data, making a first determination to either maintain a first course of action in the supply chain process or to change the first course of action in the supply chain process utilizing the one or more patterns defined by the processed event data;
the computing system calculating a hash value by hashing an original event data value of least one of the raw event data, the processed event data, or the meta event data, in a blockchain format, to create a hash event data value;
the computing system uploading the first event data and the hash event data value to the first distributed ledger and the second distributed ledger, wherein the first event data and the hash event data is stored on the first distributed ledger and the second distributed ledger in the blockchain format as a first record, and wherein the first record comprises one or more of the raw event data, the processed event data, or the meta event data and is classified on the distributed ledger as different types of event data;

the first distributed ledger computer adding the hash value to a first block and broadcasting the first block to a plurality of nodes of the first distributed ledger to validate and store the first block on the first distributed ledger; and the second distributed ledger computer adding the hash value to a second block and broadcasting the second block to a plurality of nodes of the second distributed ledger to validate and store the second block on the second distributed ledger.

16. The system of claim 15, wherein;

the computing system comprises first and second computers operably communicating with one another; the second computer operably communicating with the first and second distributed ledger computers;

the first computer capturing the first event data of the supply chain process, and obtaining the first attribute of the supply chain process that is stored therein; the first computer sending a first message to the second computer, the first message having the first attribute therein;

the second computer obtaining the second attribute of the supply chain process utilizing the first attribute in response to the first message, and sending a second message to the first computer in response to the first message, the second message having the second attribute therein;

the first computer making the first determination to either maintain the first course of action in the supply chain process or to change the first course of action in the supply chain process utilizing the first event data and the first and second attributes;

the first computer generating the first record having the first event data, the first and second attributes, and the first determination;

the first computer further calculating the hash value of the first record;

the first computer sending a third message having the hash value to the first distributed ledger computer, and a fourth message having the hash value to the second distributed ledger computer;

the first distributed ledger computer adding the hash value to the first block and broadcasting the first block to the plurality of nodes of the first distributed ledger to validate and store the first block on the first distributed ledger in response to the third message; and the second distributed ledger computer adding the hash value to the second block and broadcasting the second block to the plurality of nodes of the second distributed ledger to validate and store the second block on the second distributed ledger in response to the fourth message.

\* \* \* \* \*